United States Patent
Bowman

(10) Patent No.: US 7,963,080 B1
(45) Date of Patent: Jun. 21, 2011

(54) COMPOSITE PRE-FORMED CONSTRUCTION ARTICLES

(75) Inventor: Jay Bowman, Florence, KY (US)

(73) Assignee: NOVA Chemicals Inc., Moon Township, PA (US)

(*) Notice: Subject to any disclaimer, the term of this patent is extended or adjusted under 35 U.S.C. 154(b) by 0 days.

(21) Appl. No.: 13/034,939

(22) Filed: Feb. 25, 2011

Related U.S. Application Data

(63) Continuation of application No. 11/361,189, filed on Feb. 24, 2006.

(60) Provisional application No. 60/656,596, filed on Feb. 25, 2005, provisional application No. 60/664,120, filed on Mar. 22, 2005, provisional application No. 60/728,839, filed on Oct. 21, 2005.

(51) Int. Cl.
*E04C 1/00* (2006.01)
*E04B 1/18* (2006.01)

(52) U.S. Cl. ....... 52/414; 52/309.1; 52/309.2; 52/309.4; 52/309.7; 52/309.13; 52/309.16

(58) Field of Classification Search ...... 52/309.1–309.4, 52/309.7, 309.16, 309.13, 481.1, 414
See application file for complete search history.

(56) References Cited

U.S. PATENT DOCUMENTS

| | | |
|---|---|---|
| 2,983,692 A | 5/1961 | D'Alelio |
| 3,023,175 A | 2/1962 | Rodman, Jr. |
| 3,788,020 A | 1/1974 | Gregori |
| 4,094,110 A | 6/1978 | Dickens et al. |
| 4,157,640 A | 6/1979 | Joannes |
| 4,223,501 A | 9/1980 | DeLozier |
| 4,241,555 A | 12/1980 | Dickens et al. |
| 4,250,674 A | 2/1981 | Feist |
| 4,267,135 A | 5/1981 | Stroud et al. |
| 4,268,236 A | 5/1981 | Peille |
| 4,303,756 A | 12/1981 | Kajimura et al. |
| 4,303,757 A | 12/1981 | Kajimura et al. |
| 4,332,754 A | 6/1982 | Meunier et al. |
| 4,348,164 A | 9/1982 | Fujii et al. |
| 4,354,810 A | 10/1982 | Stidham |

(Continued)

FOREIGN PATENT DOCUMENTS

DE 203 16 376 2/2004

(Continued)

OTHER PUBLICATIONS

ELFI Wall System, http://elfiwallsystem.com/index.htm, 2003.

(Continued)

*Primary Examiner* — Brian E Glessner
*Assistant Examiner* — Omar Hijaz
(74) *Attorney, Agent, or Firm* — Gary F. Matz

(57) ABSTRACT

A composite building panel that includes a central body, substantially parallelepipedic in shape, containing an expanded polymer matrix, having opposite faces, a top surface, and a bottom surface; at least one embedded framing stud longitudinally extending across the central body between the opposite faces, having a first end embedded in the expanded polymer matrix, a second end extending away from the bottom surface of the central body, and one or more expansion holes in the embedded studs between the first end of the embedded stud and bottom surface through which the polymer matrix expands. A concrete layer can optionally cover a portion of the top surface and/or bottom surface. The building panel can be positioned perpendicular to a structural wall and/or foundation to provide a floor panel. The second end of the framing studs can be embedded in a second central body to provide an insulated concrete form.

18 Claims, 28 Drawing Sheets

U.S. PATENT DOCUMENTS

| | | |
|---|---|---|
| 4,376,741 A | 3/1983 | Stenzel |
| 4,379,107 A | 4/1983 | Berner |
| 4,382,759 A | 5/1983 | Vassalli |
| 4,399,086 A | 8/1983 | Walter |
| 4,412,961 A | 11/1983 | DiBiasi et al. |
| 4,435,345 A | 3/1984 | Colombo |
| 4,447,382 A | 5/1984 | Spurlock et al. |
| 4,485,059 A | 11/1984 | Krutchen et al. |
| 4,486,369 A | 12/1984 | Schafler et al. |
| 4,487,731 A | 12/1984 | Kobayashi |
| 4,489,023 A | 12/1984 | Proksa |
| 4,492,664 A | 1/1985 | Bruno |
| 4,498,660 A | 2/1985 | Brema et al. |
| 4,504,429 A | 3/1985 | Griffiths |
| 4,507,255 A | 3/1985 | Shizawa |
| 4,518,550 A | 5/1985 | Miettinen et al. |
| 4,530,806 A | 7/1985 | Melchior |
| 4,551,958 A | 11/1985 | Reneault et al. |
| 4,559,003 A | 12/1985 | Poncet |
| 4,564,487 A | 1/1986 | Bennett |
| 4,567,008 A | 1/1986 | Griffiths |
| 4,572,865 A | 2/1986 | Gluck et al. |
| 4,581,186 A | 4/1986 | Larson |
| 4,585,603 A | 4/1986 | Furuta et al. |
| 4,607,061 A | 8/1986 | Schmidt |
| 4,641,468 A | 2/1987 | Slater |
| 4,653,718 A | 3/1987 | Dickens |
| 4,666,393 A | 5/1987 | Kumasaka et al. |
| 4,685,872 A | 8/1987 | Erlenbach |
| 4,756,860 A | 7/1988 | Hooper et al. |
| 4,761,256 A | 8/1988 | Hardenbrook et al. |
| 4,783,287 A | 11/1988 | Eichberger et al. |
| 4,832,885 A | 5/1989 | Gross |
| 4,884,382 A | 12/1989 | Horobin |
| 4,885,888 A | 12/1989 | Young |
| 4,889,310 A | 12/1989 | Boeshart |
| 4,911,628 A | 3/1990 | Heilmayr et al. |
| 4,953,334 A | 9/1990 | Dickens |
| 4,956,133 A | 9/1990 | Payne |
| 4,972,646 A | 11/1990 | Miller et al. |
| 4,981,427 A | 1/1991 | Prignitz |
| 5,067,298 A | 11/1991 | Petersen |
| 5,087,185 A | 2/1992 | Yada et al. |
| 5,140,794 A | 8/1992 | Miller |
| 5,187,905 A | 2/1993 | Pourtau et al. |
| 5,229,138 A | 7/1993 | Carotti |
| 5,333,429 A | 8/1994 | Cretti |
| 5,375,988 A | 12/1994 | Klahre |
| 5,388,975 A | 2/1995 | Proksa et al. |
| 5,390,459 A | 2/1995 | Mensen |
| 5,411,389 A | 5/1995 | Kellerhof et al. |
| 5,414,972 A | 5/1995 | Ruiz et al. |
| 5,454,199 A | 10/1995 | Blom et al. |
| 5,459,971 A | 10/1995 | Sparilman |
| 5,474,722 A | 12/1995 | Woodham |
| 5,505,599 A | 4/1996 | Kemerer et al. |
| 5,512,222 A | 4/1996 | Sabol et al. |
| 5,524,400 A | 6/1996 | Schmechel |
| 5,566,518 A | 10/1996 | Martin et al. |
| 5,568,710 A | 10/1996 | Smith et al. |
| 5,570,552 A | 11/1996 | Nehring |
| 5,582,840 A | 12/1996 | Pauw et al. |
| 5,587,182 A | 12/1996 | Sulzbach et al. |
| 5,620,710 A | 4/1997 | Florentini et al. |
| 5,625,989 A | 5/1997 | Brubaker et al. |
| 5,629,027 A | 5/1997 | Florentini et al. |
| 5,639,483 A | 6/1997 | Florentini et al. |
| 5,657,600 A | 8/1997 | Mensen |
| 5,665,286 A | 9/1997 | Sulzbach et al. |
| 5,665,287 A | 9/1997 | Florentini et al. |
| 5,701,710 A | 12/1997 | Teemeling |
| 5,709,060 A | 1/1998 | Vaughan et al. |
| 5,749,960 A | 5/1998 | Belyayev |
| 5,771,648 A | 6/1998 | Miller et al. |
| 5,784,850 A | 7/1998 | Elderson |
| 5,787,665 A | 8/1998 | Carlin et al. |
| 5,792,481 A | 8/1998 | Cretti |
| 5,798,064 A | 8/1998 | Peterson |
| 5,804,113 A | 9/1998 | Blackwell et al. |
| 5,809,725 A | 9/1998 | Cretti |
| 5,822,940 A | 10/1998 | Carlin et al. |
| 5,844,015 A | 12/1998 | Steilen et al. |
| 5,852,907 A | 12/1998 | Tobin et al. |
| 5,890,337 A | 4/1999 | Boeshart |
| 5,896,714 A | 4/1999 | Cymbala et al. |
| 5,945,048 A | 8/1999 | Ensinger |
| 5,966,885 A | 10/1999 | Chatelain |
| 6,021,618 A | 2/2000 | Elderson |
| 6,036,898 A | 3/2000 | Sulzbach et al. |
| 6,045,350 A | 4/2000 | Cretti |
| 6,098,367 A | 8/2000 | Fridman et al. |
| 6,119,418 A | 9/2000 | Johnson |
| 6,127,439 A | 10/2000 | Berghmans et al. |
| 6,147,133 A | 11/2000 | Sulzbach et al. |
| 6,160,027 A | 12/2000 | Crevecoeur et al. |
| 6,167,624 B1 | 1/2001 | Lanahan et al. |
| 6,170,220 B1 | 1/2001 | Moore, Jr. |
| 6,178,711 B1 | 1/2001 | Laird et al. |
| 6,202,375 B1 | 3/2001 | Kleinschmidt |
| 6,202,669 B1 | 3/2001 | Lewit et al. |
| 6,226,943 B1 | 5/2001 | Grinshpun et al. |
| 6,230,462 B1 | 5/2001 | Beliveau |
| 6,235,367 B1 | 5/2001 | Holmes et al. |
| 6,242,540 B1 | 6/2001 | Crevecoeur et al. |
| 6,250,024 B1 | 6/2001 | Sculthorpe et al. |
| 6,264,734 B1 | 7/2001 | Dickens |
| 6,272,749 B1 | 8/2001 | Boeshart et al. |
| 6,298,622 B1 | 10/2001 | Cretti |
| 6,301,854 B1 | 10/2001 | Daudet et al. |
| 6,314,694 B1 | 11/2001 | Cooper et al. |
| 6,314,697 B1 | 11/2001 | Moore, Jr. |
| 6,318,040 B1 | 11/2001 | Moore, Jr. |
| 6,322,651 B1 | 11/2001 | Phelps |
| 6,336,301 B1 | 1/2002 | Moore, Jr. |
| 6,350,308 B1 | 2/2002 | Dickens |
| 6,378,260 B1 | 4/2002 | Williamson et al. |
| 6,385,942 B1 | 5/2002 | Grossman et al. |
| 6,412,243 B1 | 7/2002 | Sutelan |
| 6,418,687 B1 | 7/2002 | Cox |
| 6,438,918 B2 | 8/2002 | Moore, Jr. |
| 6,444,073 B1 | 9/2002 | Reeves et al. |
| 6,481,178 B2 | 11/2002 | Moore, Jr. |
| 6,494,012 B2 | 12/2002 | Seng |
| 6,530,185 B1 | 3/2003 | Scott et al. |
| 6,531,077 B1 | 3/2003 | Flarup-Knudsen |
| 6,537,054 B2 | 3/2003 | Kitahama et al. |
| 6,647,686 B2 | 11/2003 | Dunn et al. |
| 6,655,944 B2 | 12/2003 | Massarotto et al. |
| 6,662,503 B2 | 12/2003 | Cowell et al. |
| 6,701,684 B2 | 3/2004 | Stadter |
| 6,708,460 B1 | 3/2004 | Elderson |
| 6,820,384 B1 | 11/2004 | Pfeiffer |
| 6,833,095 B2 | 12/2004 | Sulzbach et al. |
| 6,854,230 B2 | 2/2005 | Starke |
| 7,032,357 B2 | 4/2006 | Cooper et al. |
| 2001/0009683 A1 | 7/2001 | Kitahama et al. |
| 2002/0026760 A1 | 3/2002 | Moore, Jr. |
| 2002/0117769 A1 | 8/2002 | Arch et al. |
| 2002/0139066 A1 | 10/2002 | Szymanski et al. |
| 2002/0184846 A1 | 12/2002 | Crowder |
| 2003/0029106 A1 | 2/2003 | Cooper et al. |
| 2003/0079420 A1 | 5/2003 | Klassen et al. |
| 2003/0079438 A1 | 5/2003 | Stephens et al. |
| 2003/0085483 A1 | 5/2003 | Kroeger |
| 2003/0172607 A1 | 9/2003 | Brandes |
| 2004/0017652 A1 | 1/2004 | Billington et al. |
| 2004/0065034 A1 | 4/2004 | Messenger et al. |
| 2004/0065973 A1 | 4/2004 | Ebbing et al. |
| 2004/0096642 A1 | 5/2004 | Maruyama et al. |
| 2004/0216415 A1 | 11/2004 | Pfeiffer et al. |

FOREIGN PATENT DOCUMENTS

| | | |
|---|---|---|
| EP | 0 459 924 A1 | 12/1991 |
| EP | 0 464 008 B1 | 2/1995 |
| EP | 0 693 597 B1 | 1/1996 |
| GB | 2 365 456 A | 2/2002 |
| WO | 02/20916 A1 | 3/2002 |
| WO | 02/35020 A2 | 5/2002 |
| WO | 2004009929 A1 | 1/2004 |
| WO | 2004101905 A1 | 11/2004 |

OTHER PUBLICATIONS

Stoam Industries, Product Brochure, at least earlier than Feb. 24, 2006.

Plastbau Technology-Insul-Deck, "Lightweight Forming System for Concrete Floors and Roofs", Product Brochure, Cat. No. 5M02,2002.

Sicilferro, "Tecnova-Tecnologie Costruttive", Product Catalog, at least earlier than Feb. 24, 2006.

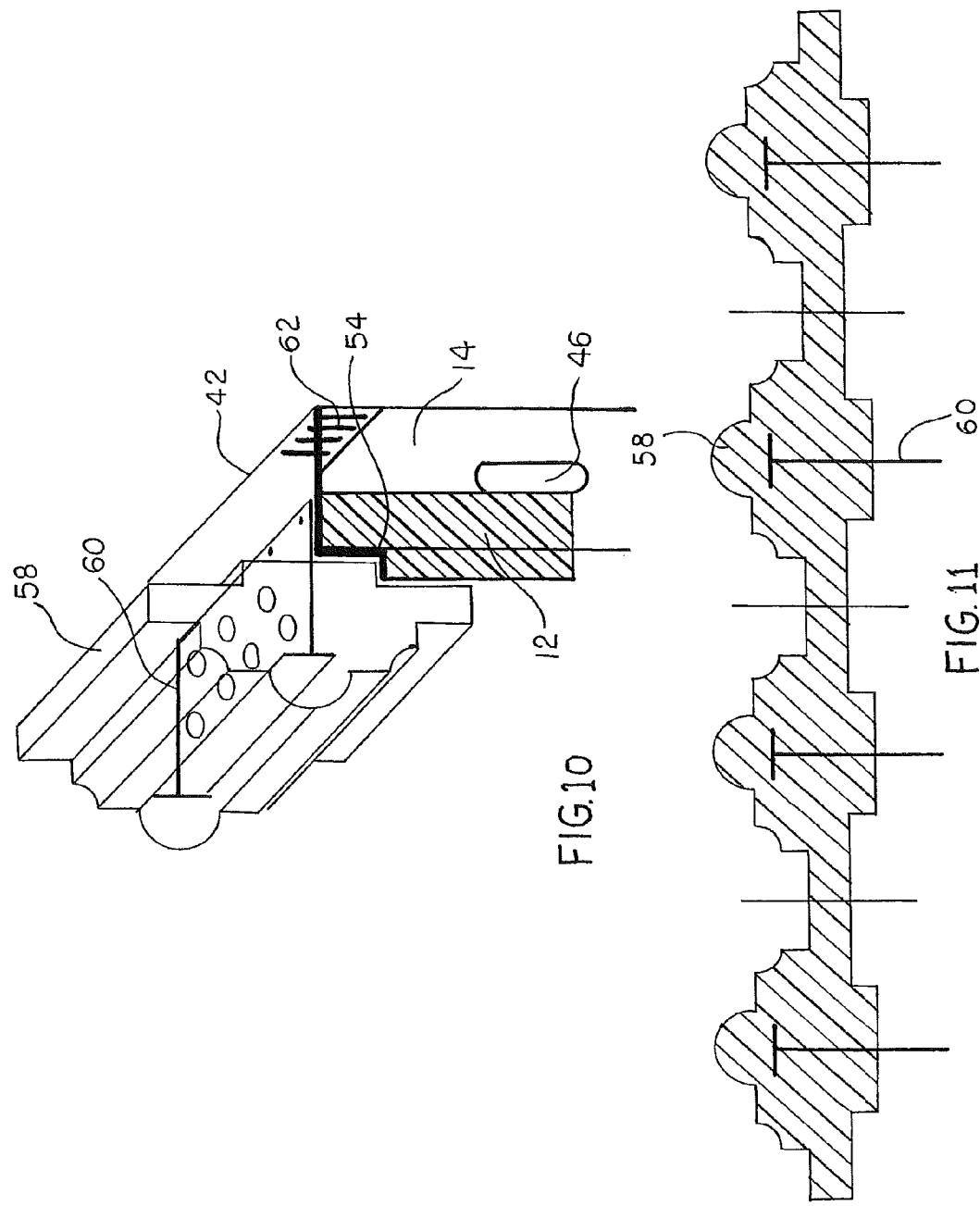

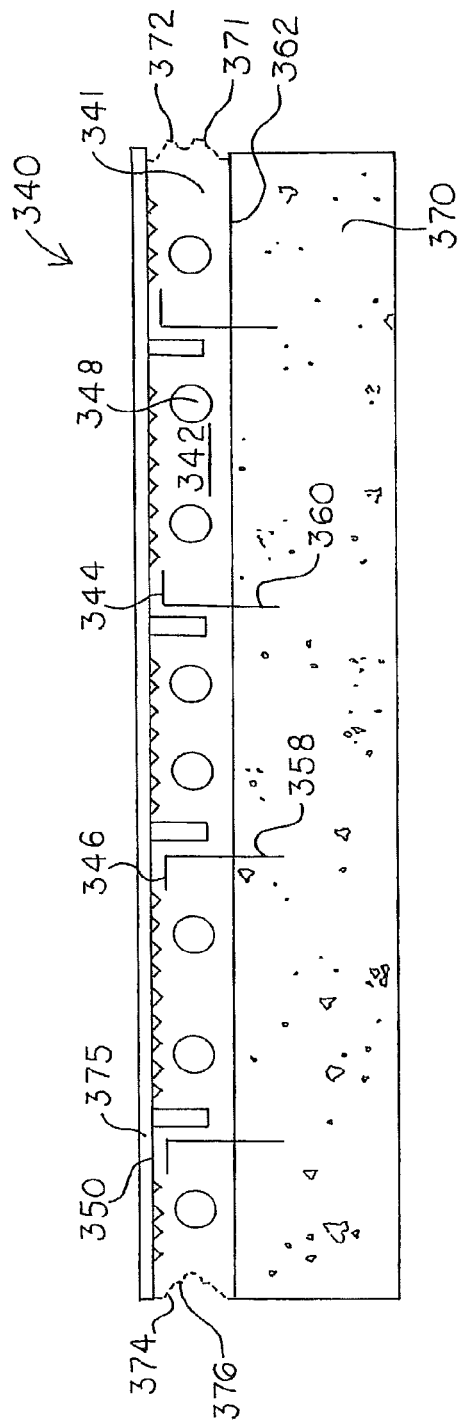
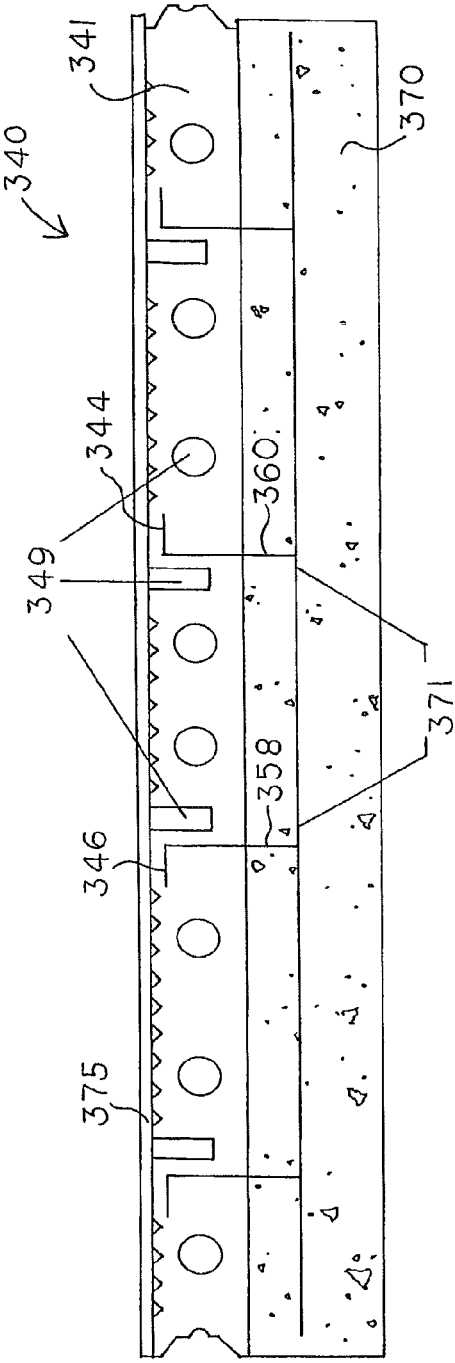
FIG. 20
FIG. 21

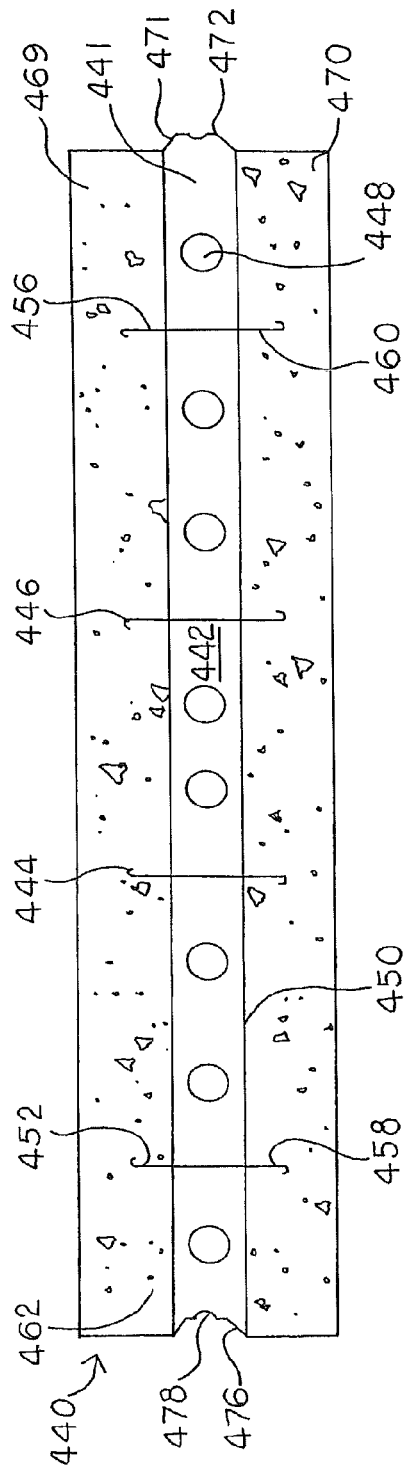
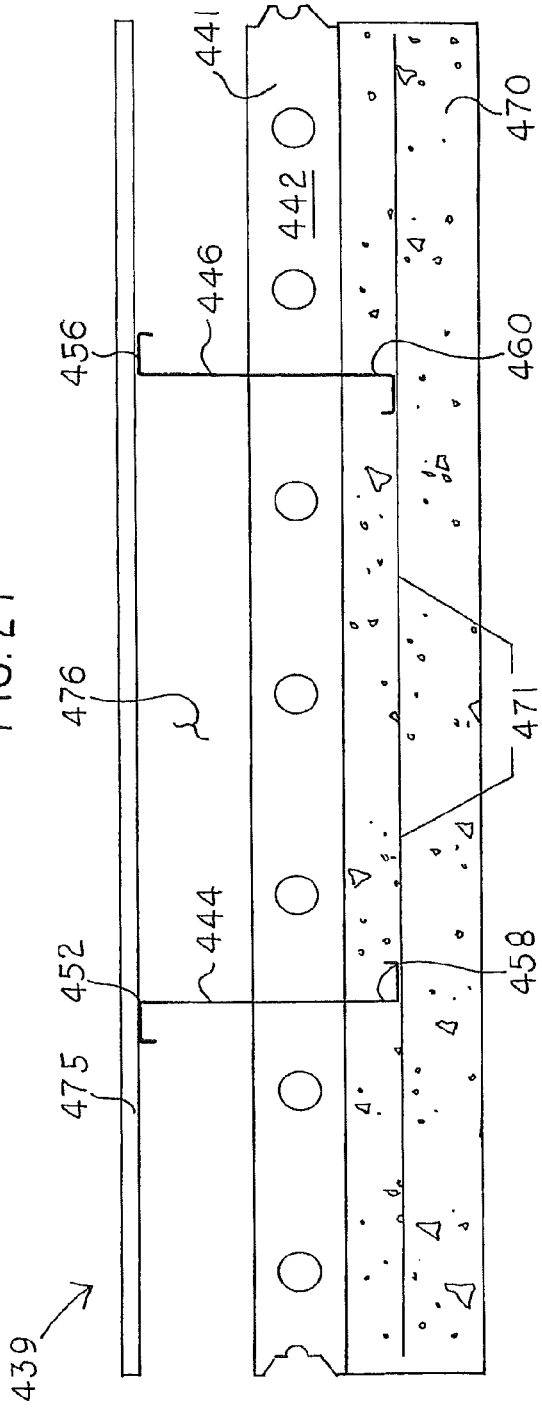
FIG. 24
FIG. 25

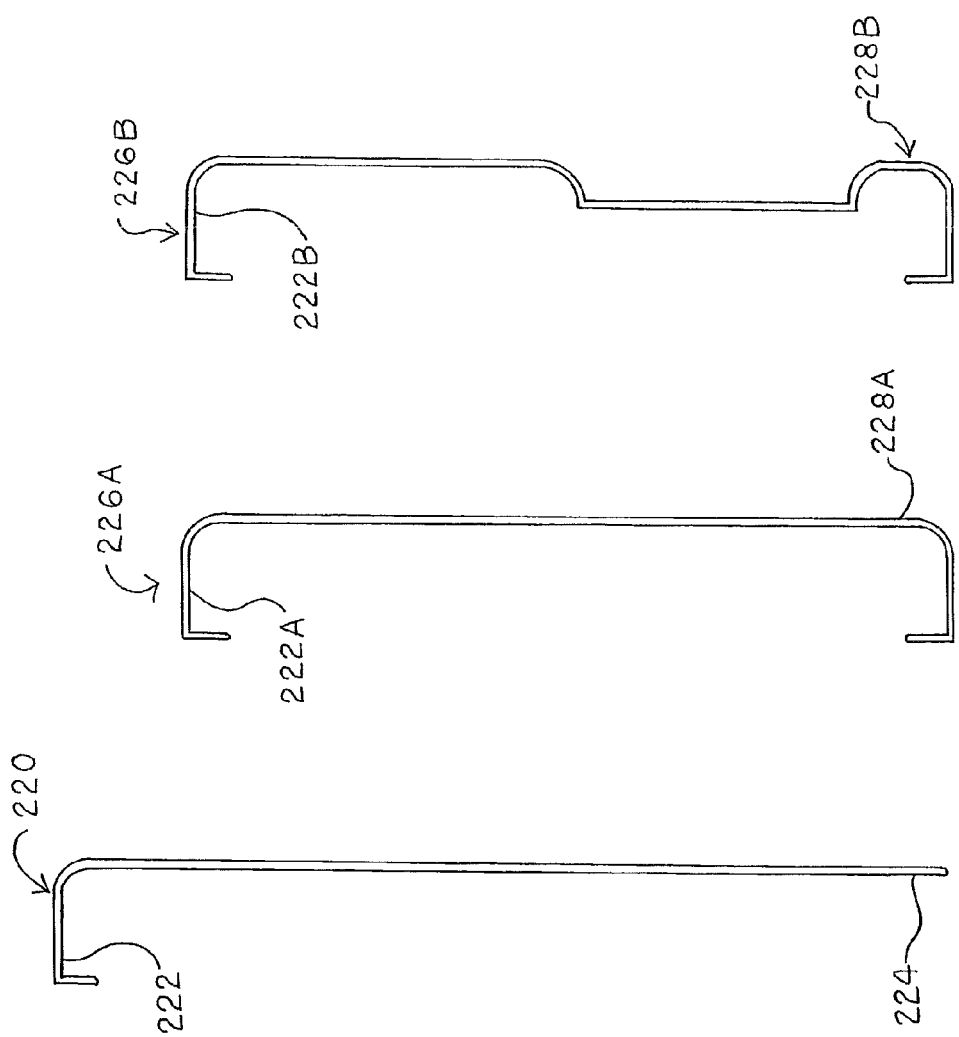

COMPOSITE PRE-FORMED CONSTRUCTION ARTICLES

REFERENCE TO RELATED APPLICATION

This application is a continuation of U.S. application Ser. No. 11/361,189 filed Feb. 24, 2006 entitled "Composite pre-formed construction articles", which claims the benefit of priority of U.S. Provisional Application Ser. Nos. 60/656,596 filed Feb. 25, 2005 and 60/664,120 filed Mar. 22, 2005, both entitled "Composite Pre-Formed Building Panels" and U.S. Provisional Application Ser. No. 60/728,839 filed Oct. 21, 2005 entitled "Composite Pre-Formed Insulated Concrete Forms," which are all herein incorporated by reference in their entirety.

BACKGROUND OF THE INVENTION

1. Field of the Invention

The present invention is directed to pre-formed building and construction panels that include one or more reinforcing structural elements embedded in a foamed thermoplastic matrix as well as insulated concrete forms with internal blocking and bracing elements.

2. Description of the Prior Art

It is known to use construction elements made of expanded plastics, for example expanded polystyrene, in forms of boards or section members of suitable shape and size. These members provide thermal and sound insulation functions and have long been accepted by the building industry.

It is also known that, in order to confer adequate self-supporting properties to such construction elements, one or more reinforcing section bars of a suitable shape must be incorporated into the mass of expanded plastics.

U.S. Pat. Nos. 5,787,665 and 5,822,940 discloses a molded composite wall panels for building construction that includes a regular tetragonal body of polymer foam and at least one light metal gauge hollow stud in the body. The edges of the studs are even with a surface of the polymer foam so drywall can be attached thereto.

U.S. Pat. No. 6,098,367 discloses a constructive system applied to buildings to form walls by means of modular foldable frames that allow for the placement of blocks or plates. The frames with the resistant channels, rods, blocks or plates, resist better strong winds and seismic movements.

U.S. Pat. No. 6,167,624 discloses a method for producing a polymeric foamed material panel including the steps of providing a polymeric foamed material, cutting the polymeric foamed material until reaching a preconfiguration cut point, cutting subsequently from the preconfiguration cut point a brace-receiving configuration in the polymeric foamed material, and sliding a brace member into the brace-receiving configuration to produce a polymeric foamed material panel.

U.S. Pat. No. 6,235,367 discloses a molded construction product, having one or more walls and an inner core section, including a composition matrix having a resin system, a catalytic agent, and filler compounds for forming the walls; a foam core system for forming the inner core section, a curing agent and a drying agent. A structural reinforcement support system is provided for reinforcing the structural integrity of the composition. A locking system is provided for joining one or more of the molded products.

EP 0 459 924 discloses a self-supporting construction element made of expanded plastics material, specifically a floor element, which includes a substantially parallelepipedic central body in which a reinforcing section bar, made of a thin metal sheet shaped as an I-beam, is integrated during the molding step.

U.S. Pat. No. 5,333,429 discloses a composite panel with a structural load-bearing wooden framework formed by a substantially parallelepiped body of expanded synthetic material. The panels have a plurality of longitudinal channels extending for the whole height of the panel. A series of channels uniformly spaced and staggered are open on the adjacent face of the panel and have a T-shaped cross section. In these open channels fit T-shaped cross section wooden posts, the stem portion of which emerges out of the open channels and project from the surface of the panel.

WO 2002/035020 discloses a composite construction element that includes a body made of expanded plastics material and a slab-shaped coating element associated to the body. The slab-shaped coating element includes a plurality of substantially adjoining and substantially U-shaped adjacent sections provided with respective means for mechanically clinching the slab-shaped element to the expanded plastics material.

While the construction elements described above have on the one hand a light weight, a comparative ease of installation and a low cost, on the other hand their application in the art and flexibility of use have been restrained heretofore by their poor fire-resisting properties and/or the propensity for mold to grow on finished surfaces attached thereto.

This inadequate resistance to fire is essentially related to the fact that construction elements made of expanded plastics show an insufficient capability to securely hold outer covering layers, such as the plaster layers used for the outer surface finish or contain the expanded polymer body, in flammable molten or liquid form, that occurs from the heat generated from a fire.

When exposed to fire, in fact, the expanded plastics soon shrink into a shapeless mass of reduced volume, which can flow and burn, and in some cases with the ensuing separation of the outer covering layers and rapid collapse of the whole structure.

In addition, an undesirable separation of the outer covering layers may be caused in some instances by a premature "aging" of the plastics surface to which these coverings adhere, a separation which may be further fostered by exposure to heat sources, dusts, fumes, vapors, or chemical substances coming from a source close to the construction elements.

U.S. Pat. No. 6,298,622 and WO 2004/101905 disclose an approach to overcoming the above-described problem by using a self-supporting construction element of expanded plastics for use as floor elements and walls of buildings. The construction elements include a central body, substantially parallelepipedic in shape and having two opposite faces; at least one reinforcing section bar transversally extending across the central body between the faces thereof and embedded in the expanded plastics; a lath for supporting at least one layer of a suitable covering material, associated to a fin of the reinforcing section bar lying flush with and substantially parallel to at least one of the faces of the construction element. However, moisture buildup between the lath and construction element can lead to mold and mildew growth and the ability to easily run electrical lines without cutting into the construction elements have limited the desirability of this approach.

Concrete walls in building construction are most often produced by first setting up two parallel form walls and pouring concrete into the space between the forms. After the concrete hardens, the builder then removes the forms, leaving the cured concrete wall.

This prior art technique has drawbacks. Formation of the concrete walls is inefficient because of the time required to erect the forms, wait until the concrete cures, and take down the forms. This prior art technique, therefore, is an expensive, labor-intensive process.

Accordingly, techniques have developed for forming modular concrete walls, which use a foam insulating material. The modular form walls are set up parallel to each other and connecting components hold the two form walls in place relative to each other while concrete is poured there between. The form walls, however, remain in place after the concrete cures. That is, the form walls, which are constructed of foam insulating material, are a permanent part of the building after the concrete cures. The concrete walls made using this technique can be stacked on top of each other many stories high to form all of a building's walls. In addition to the efficiency gained by retaining the form walls as part of the permanent structure, the materials of the form walls often provide adequate insulation for the building.

Although the prior art includes many proposed variations to achieve improvements with this technique, drawbacks still exist for each design. The connecting components used in the prior art to hold the walls are constructed of (1) plastic foam, (2) high density plastic, or (3) a metal bridge, which is a non-structural support, i.e., once the concrete cures, the connecting components serve no function. Even so, these members provide thermal and sound insulation functions and have long been accepted by the building industry.

Thus, current insulated concrete form technology requires the use of small molded foam blocks normally 12 to 24 inches in height with a standard length of four feet. The large amount of horizontal and vertical joints that require bracing to correctly position the blocks during a concrete pour, restricts their use to shorter wall lengths and lower wall heights. Wall penetrations such as windows and doors require skillfully prepared and engineered forming to withstand the pressures exerted upon them during concrete placement. Plaster finishing crews have difficulty hanging drywall on such systems due to the problem of locating molded in furring strips. The metal or plastic furring strips in current designs are non-continuous in nature and are normally embedded within the foam faces. The characteristics present in current block forming systems require skilled labor, long lay-out times, engineered blocking and shoring and non-traditional finishing skills. This results in a more expensive wall that is not suitable for larger wall construction applications. The highly skilled labor force that is required to place, block, shore and apply finishes in a block system seriously restricts the use of such systems when compared to traditional concrete construction techniques.

One approach to solving the problem of straight and true walls on larger layouts has been to design larger blocks. Current existing manufacturing technology has limited this increase to 24 inches in height and eight feet in length. Other systems create hot wire cut opposing foamed plastic panels mechanically linked together in a secondary operation utilizing metal or plastic connectors. These panels are normally 48 inches in width and 8 feet in height and do not contain continuous furring strips.

However, none of the approaches described above adequately address the problems of form blowout at higher wall heights due to pressure exerted by the poured concrete, fast and easy construction with an unskilled labor force, and ease of finishing the walls with readily ascertainable attachment points.

Thus there is a need in the art for composite pre-formed building panels and insulated concrete forms with internal blocking and bracing elements that overcome the above-described problems.

SUMMARY OF THE INVENTION

The present invention provides a composite building panel that includes:
  a central body, substantially parallelepipedic in shape, that contains an expanded polymer matrix, having opposite faces, a top surface, and an opposing bottom surface;
  at least one embedded framing stud longitudinally extending across the central body between the opposite faces, having a first end embedded in the expanded polymer matrix, a second end extending away from the bottom surface of the central body, and one or more expansion holes located in the embedded studs between the first end of the embedded studs and the bottom surface of the central body, where, the central body contains a polymer matrix that expands through the expansion holes; and
  a concrete layer covering at least a portion of the top surface and/or bottom surface.

The present invention also provides a composite floor panel that includes:
  a central body, substantially parallelepipedic in shape, containing an expanded polymer matrix, having opposite faces, a top surface, and an opposing bottom surface; and
  one or more embedded floor joists longitudinally extending across the central body between the opposite faces, having a first end embedded in the expanded polymer matrix having a first transverse member extending from the first end generally contacting or extending above the top surface, a second end extending away from the bottom surface of the central body having a second transverse member extending from the second end, and one or more expansion holes located in the embedded studs between the first end of the embedded studs and the bottom surface of the central body;
  where, the central body contains a polymer matrix that expands through the expansion holes;
  where the space defined by the bottom surface of the central body and the second ends of the embedded joists is adapted for accommodating utility lines; and
  where the composite floor panel is positioned generally perpendicular to a structural wall and/or foundation.

The present invention further provides an insulated concrete form that includes:
  a first body, substantially parallelepipedic in shape, that includes an expanded polymer matrix, having opposite faces, a first surface, and an opposing second surface;
  a second body, substantially parallelepipedic in shape, that includes an expanded polymer matrix, having opposite faces, a first surface, an opposing second surface; and
  one or more embedded studs longitudinally extending across the first body and the second body between the first surfaces of each body, having a first end embedded in the expanded polymer matrix of the first body, and a second end embedded in the expanded polymer matrix of the second body, one or more expansion holes located in the portion of the embedded studs embedded in the first body and the second body;
  where, the first body and the second body contain a polymer matrix that expands through the expansion holes; and the space defined between the first surfaces of the first body and the second body is capable of accepting concrete poured therein.

The present invention additionally provides an insulated concrete form system that includes a plurality of the above described insulated concrete forms where at least one of an outer lip or an inner lip of each insulated concrete form forms a joint with another insulated concrete form.

The present invention is further directed to buildings that contain one or more of the above-described insulated building panels, floor panels, insulated concrete forms and insulated concrete form systems.

The present invention is additionally directed to a method of constructing a building that includes:
assembling the composite building panels described above on a generally flat surface, and
lifting a first end of the composite building panel while a second end remains stationary resulting in orienting the building panel to form a wall of the building.

The present invention is also directed to a building constructed according to the above-described method.

DESCRIPTION OF THE DRAWINGS

FIG. 10 shows a partial top perspective view of a molding attached to a pre-formed building panel according to the invention;

FIG. 11 shows a cross-sectional view of the molding in FIG. 10;

FIG. 20 shows a cross-sectional view of a concrete composite pre-formed building panel system according to the invention;

FIG. 21 shows a cross-sectional view of a concrete composite pre-formed building panel system according to the invention;

FIG. 24 shows a cross-sectional view of a concrete composite pre-formed building panel system according to the invention;

FIG. 25 shows a cross-sectional view of a concrete composite pre-formed building panel system according to the invention;

FIGS. 26, 27, and 28 show a cross-sectional view of metal studs that can be used in the pre-formed building panels according to the invention;

DETAILED DESCRIPTION OF THE INVENTION

Figure 1:
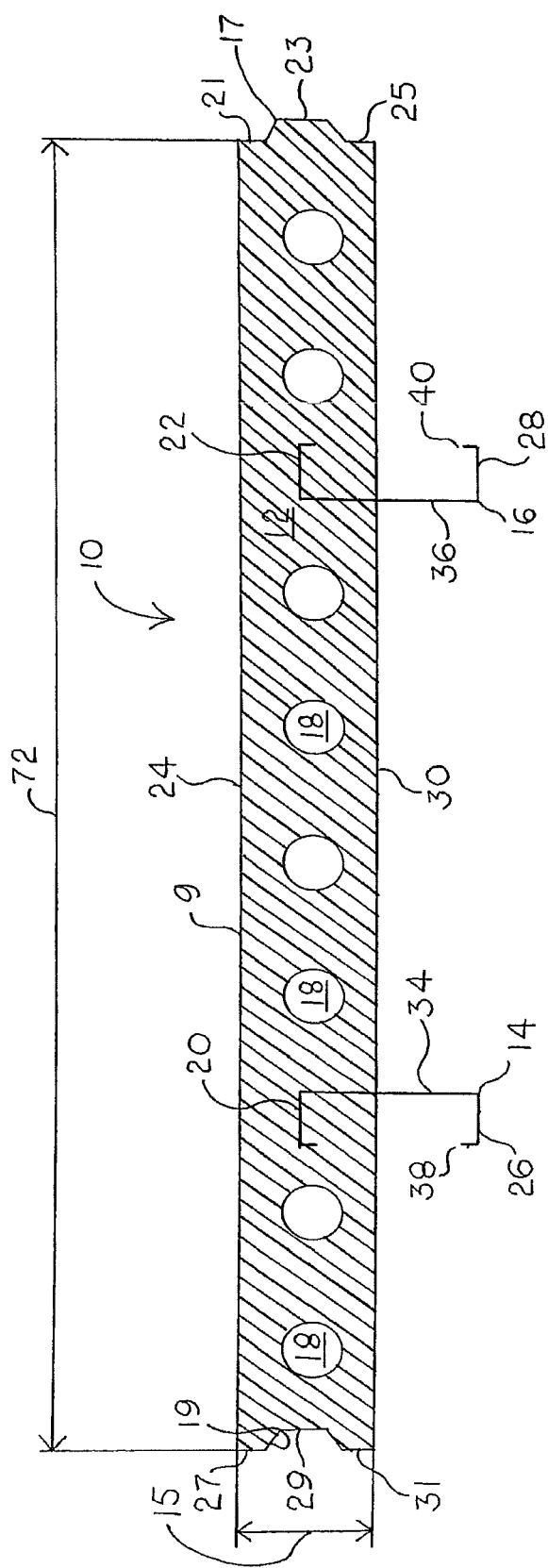
FIG. 1 shows a cross-sectional view of a pre-formed building panel according to the invention.
Figure 2:
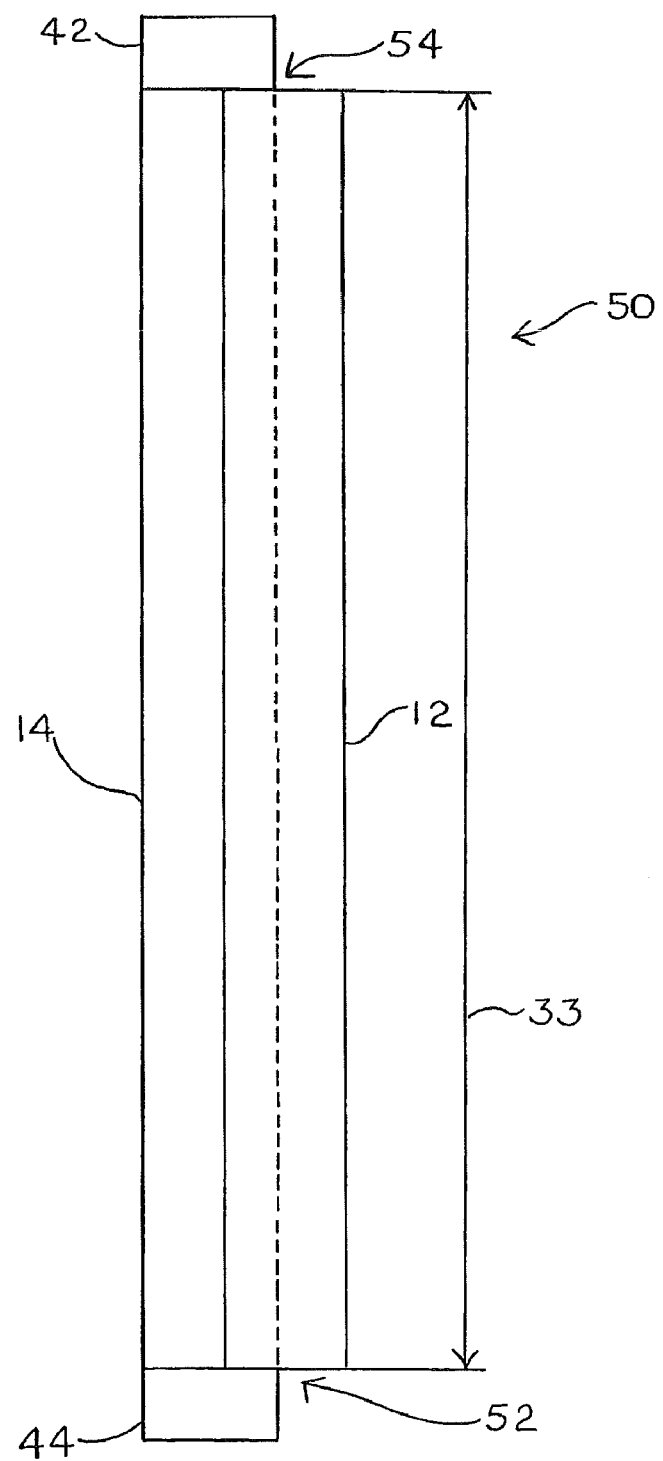
FIG. 2 shows a side elevation view of a pre-formed building panel according to the invention.

For the purpose of the description hereinafter, the terms "upper," "lower," "inner", "outer", "right," "left," "vertical," "horizontal," "top," "bottom," and derivatives thereof, shall relate to the invention as oriented in the drawing Figures. However, it is to be understood that the invention may assume alternate variations and step sequences except where expressly specified to the contrary. It is also to be understood that the specific devices and processes, illustrated in the attached drawings and described in the following specification, is an exemplary embodiment of the present invention. Hence, specific dimensions and other physical characteristics related to the embodiment disclosed herein are not to be considered as limiting the invention. In describing the embodiments of the present invention, reference will be made herein to the drawings in which like numerals refer to like features of the invention.

Other than where otherwise indicated, all numbers or expressions referring to quantities, distances, or measurements, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective measurement methods.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "expandable polymer matrix" refers to a polymeric material in particulate or bead form that is impregnated with a blowing agent such that when the particulates and/or beads are placed in a mold and heat is applied thereto, evaporation of the blowing agent (as described below) effects the formation of a cellular structure and/or an expanding cellular structure in the particulates and/or beads and the outer surfaces of the particulates and/or beads fuse together to form a continuous mass of polymeric material conforming to the shape of the mold.

As used herein, the term "polymer" is meant to encompass, without limitation, homopolymers, copolymers and graft copolymers.

As used herein, the terms "(meth)acrylic" and "(meth)acrylate" are meant to include both acrylic and methacrylic acid derivatives, such as the corresponding alkyl esters often referred to as acrylates and (meth)acrylates, which the term "(meth)acrylate" is meant to encompass.

The present invention provides pre-formed building panels that include one or more reinforcing structural elements or bars running longitudinally, which are partially exposed, with the remainder of the reinforcing structural element(s) partially encapsulated in an expanded polymer matrix, which acts as a thermal break. The reinforcing structural elements can be flanged lengthwise on either side to provide attachment points for external objects to the panel. Perforations in the reinforcing structural elements which are encapsulated in the expanded polymer matrix allow for fusion perpendicularly. Perforations in the exposed portion of the reinforcing structural element provide attachment points for lateral bracing and utility installation. A tongue and groove connection point design provides for panel abutment, weep holes and attachment points for external objects. Recessed areas on opposing panel ends provide an area of member-to-member connection with "C" channels running along the top and bottom of the structural member. Longitudinal holes through the expanded polymer matrix are variable in diameter and location and provide areas for placement of utilities, lightening the structure and channels for venting of gasses. Panel manufacture is accomplished through the use of a semi-continuous or continuous molding process allowing for variable panel lengths.

The embedded framing studs or floor joists used in the invention can be made of any suitable material. Suitable materials are those that add strength, stability and structural integrity to the pre-formed building panels. Such materials provide embedded framing studs meeting the requirements of applicable test methods known in the art, as non-limiting examples ASTM A 36/A 36M-05, ASTM A 1011/A 1011M-05a, ASTM A 1008/A 1008M-05b, and ASTM A 1003/A 1003M-05 for various types of steel.

Suitable materials include, but are not limited to metals, construction grade plastics, composite materials, ceramics, combinations thereof, and the like. Suitable metals include, but are not limited to, aluminum, steel, stainless steel, tungsten, molybdenum, iron and alloys and combinations of such metals. In a particular embodiment of the invention, the metal bars, studs, joists and/or members are made of a light gauge metal.

Suitable construction grade plastics include, but are not limited to reinforced thermoplastics, thermoset resins, and reinforced thermoset resins. Thermoplastics include polymers and polymer foams made up of materials that can be repeatedly softened by heating and hardened again on cooling. Suitable thermoplastic polymers include, but are not limited to homopolymers and copolymers of styrene, homopolymers and copolymers of $C_2$ to $C_{20}$ olefins, $C_4$ to $C_{20}$ dienes, polyesters, polyamides, homopolymers and copolymers of $C_2$ to $C_{20}$ (meth)acrylate esters, polyetherimides, polycarbonates, polyphenylethers, polyvinylchlorides, polyurethanes, and combinations thereof.

Suitable thermoset resins are resins that when heated to their cure point, undergo a chemical cross-linking reaction causing them to solidify and hold their shape rigidly, even at elevated temperatures. Suitable thermoset resins include, but are not limited to alkyd resins, epoxy resins, diallyl phthalate resins, melamine resins, phenolic resins, polyester resins, urethane resins, and urea, which can be crosslinked by reaction, as non-limiting examples, with diols, triols, polyols, and/or formaldehyde.

Reinforcing materials and/or fillers that can be incorporated into the thermoplastics and/or thermoset resins include, but are not limited to carbon fibers, aramid fibers, glass fibers, metal fibers, woven fabric or structures of the mentioned fibers, fiberglass, carbon black, graphite, clays, calcium carbonate, titanium dioxide, woven fabric or structures of the above-referenced fibers, and combinations thereof.

A non-limiting example of construction grade plastics are thermosetting polyester or vinyl ester resin systems reinforced with fiberglass that meet the requirements of required test methods known in the art, non-limiting examples being ASTM D790, ASTM D695, ASTM D3039 and ASTM D638.

The thermoplastics and thermoset resins can optionally include other additives, as a non-limiting example ultraviolet (UV) stabilizers, heat stabilizers, flame retardants, structural enhancements, biocides, and combinations thereof.

The embedded framing studs or embedded floor joists (reinforcing embedded bars) can have a thickness of at least 0.4 mm, in some cases at least 0.5 mm, in other cases at least 0.75 mm, in some instances at least 1 mm, in other instances at least 1.25 mm and in some circumstances at least 1.5 mm and can have a thickness of up to 10 mm, in some cases up to 8 mm, in other cases up to 6 mm, in some instances up to 4 mm and in other cases up to 2 mm. The thickness of the embedded framing studs or embedded floor joists will depend on the intended use of the pre-formed building panel.

In an embodiment of the invention, the embedded reinforcing bars, studs, joists and/or members have holes or openings along their length to facilitate fusion of the expanded plastic material and to reduce any thermal bridging effects in the reinforcing bars, studs, joists and/or members.

The expanded polymer matrix makes up the expanded polymer body described herein below. The expanded polymer matrix is typically molded from expandable thermoplastic particles. These expandable thermoplastic particles are made from any suitable thermoplastic homopolymer or copolymer. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer as described above with one or more other monomers, non-limiting examples being divinylbenzene, conjugated dienes (non-limiting examples being butadiene, isoprene, 1,3- and 2,4-hexadiene), alkyl methacrylates, alkyl acrylates, acrylonitrile, and maleic anhydride, wherein the vinyl aromatic monomer is present in at least 50% by weight of the copolymer. In an embodiment of the invention, styrenic polymers are used, particularly polystyrene. However, other suitable polymers can be used, such as polyolefins (e.g. polyethylene, polypropylene), polycarbonates, polyphenylene oxides, and mixtures thereof.

In a particular embodiment of the invention, the expandable thermoplastic particles are expandable polystyrene (EPS) particles. These particles can be in the form of beads, granules, or other particles convenient for the expansion and molding operations. Particles polymerized in an aqueous suspension process are essentially spherical and are useful for molding the expanded polymer body described herein below. These particles can be screened so that their size ranges from about 0.008 inches (0.2 mm) to about 0.1 inches (2.5 mm).

The expandable thermoplastic particles can be impregnated using any conventional method with a suitable blowing agent. As a non-limiting example, the impregnation can be achieved by adding the blowing agent to the aqueous suspension during the polymerization of the polymer, or alternatively by re-suspending the polymer particles in an aqueous medium and then incorporating the blowing agent as taught in U.S. Pat. No. 2,983,692. Any gaseous material or material which will produce gases on heating can be used as the blowing agent. Conventional blowing agents include aliphatic hydrocarbons containing 4 to 6 carbon atoms in the molecule, such as butanes, pentanes, hexanes, and the halogenated hydrocarbons, e.g. CFC's and HCFC'S, which boil at a temperature below the softening point of the polymer chosen. Mixtures of these aliphatic hydrocarbon blowing agents can also be used.

Alternatively, water can be blended with these aliphatic hydrocarbons blowing agents or water can be used as the sole blowing agent as taught in U.S. Pat. Nos. 6,127,439; 6,160,027; and 6,242,540 in these patents, water-retaining agents are used. The weight percentage of water for use as the blowing agent can range from 1 to 20%. The texts of U.S. Pat. Nos. 6,127,439, 6,160,027 and 6,242,540 are incorporated herein by reference.

The impregnated thermoplastic particles are generally pre-expanded to a density of at least 0.5 lb/ft$^3$ (0.008 g/cc), in some cases at least 1 lb/ft$^3$ (0.016 g/cc), in other cases at least 1.25 lb/ft$^3$ (0.02 g/cc), in some situations at least 1.5 lb/ft$^3$ (0.024 g/cc), in other situations at least 2 lb/ft$^3$ (0.032 g/cc), and in some instances at least about 3 lb/ft$^3$ (0.048 g/cc). Also, the density of the impregnated pre-expanded particles can be up to 35 lb/ft$^3$ (0.56 g/cc), in some cases up to 30 lb/ft$^3$ (0.48 g/cc), and in other cases up to 25 lb/ft$^3$ (0.4 g/cc). The density of the impregnated pre-expanded particles can be any value or range between any of the values recited above. The pre-expansion step is conventionally carried out by heating the impregnated beads via any conventional heating medium, such as steam, hot air, hot water, or radiant heat. One generally accepted method for accomplishing the pre-expansion of impregnated thermoplastic particles is taught in U.S. Pat. No. 3,023,175.

The impregnated thermoplastic particles can be foamed cellular polymer particles as taught in U.S. patent application Ser. No. 10/021,716, the teachings of which are incorporated herein by reference. The foamed cellular particles can be polystyrene that are pre-expanded and contain a volatile blowing agent at a level of less than 6.0 weight percent, in some cases ranging from about 2.0 wt % to about 5.0 wt %, and in other cases ranging from about 2.5 wt % to about 3.5 wt % based on the weight of the polymer.

An interpolymer of a polyolefin and in situ polymerized vinyl aromatic monomers that can be included in the expandable thermoplastic resin according to the invention is disclosed in U.S. Pat. Nos. 4,303,756 and 4,303,757 and U.S. Application Publication 2004/0152795, the relevant portions of which are herein incorporated by reference. A non-limiting example of interpolymers that can be used in the present invention include those available under the trade name ARCEL®, available from NOVA Chemicals Inc., Pittsburgh, Pa. and PIOCELAN®, available from Sekisui Plastics Co., Ltd., Tokyo, Japan.

The expanded polymer matrix can include customary ingredients and additives, such as pigments, dyes, colorants, plasticizers, mold release agents, stabilizers, ultraviolet light absorbers, mold prevention agents, antioxidants, and so on. Typical pigments include, without limitation, inorganic pigments such as carbon black, graphite, expandable graphite, zinc oxide, titanium dioxide, and iron oxide, as well as organic pigments such as quinacridone reds and violets and copper phthalocyanine blues and greens.

In a particular embodiment of the invention the pigment is carbon black, a non-limiting example of such a material being EPS SILVER®, available from NOVA Chemicals Inc.

In another particular embodiment of the invention the pigment is graphite, a non-limiting example of such a material being NEOPOR®, available from BASF Aktiengesellschaft Corp., Ludwigshafen am Rhein, Germany.

When materials such as carbon black and/or graphite are included in the polymer particles, improved insulating properties, as exemplified by higher R values for materials containing carbon black or graphite (as determined using ASTM-C578), are provided. As such, the R value of the expanded polymer particles containing carbon black and/or graphite or materials made from such polymer particles are at least 5% higher than observed for particles or resulting articles that do not contain carbon black and/or graphite.

The pre-expanded particles or "pre-puff" are heated in a closed mold in the semi-continuous or continuous molding process described below to form the pre-formed building panels according to the invention.

The expanded polymer body used in the invention include holes, conduits or chases that molded into and extend along the length of the expanded polymer body. In an embodiment of the invention, the holes, conduits or chases are used for providing access, ways for utilities, such as wiring, plumbing and exhaust through the walls, ceilings, floors and roofs constructed according to the present invention.

In another embodiment of the invention, the wall units, floor units and expanded polymer panels or central body have a male "tongue" edge and a female "groove" edge that facilitates a "tongue and groove" union of two matching wall units, floor units and expanded polymer panels. The tongue and groove union can be non-linear and can provide for a weep hole and/or larger opening to accommodate plumbing lines.

Typically the tongue and groove union provides a flat surface at the union to allow for easy application of sealing tape to seal the union or joint.

An embodiment of the present invention provides wall units and wall systems. As shown in FIG. 1, wall unit 10 includes expanded polymer body 12 (central body), left facing embedded metal studs 14, and right facing embedded metal studs 16 (reinforcing embed bars). Expanded polymer body 12 includes openings 18 that traverse all or part of the length of expanded polymer body 12. The embedded metal studs 14 and 16 have embedded ends 20 and 22 respectively that do not touch outer surface 24 of expanded polymer body 12. The embedded metal studs 14 and 16 also have exposed ends 26 and 28 respectively that extend from inner surface 30 of expanded polymer body 12.

Expanded polymer body 12 can have a thickness 5, measured as the distance from inner surface 30 to outer surface 24 of at least 2, in some cases at least 2.5, and in other cases at least 3 cm and can be up to 10, in some cases up to 8, and in other cases up to 6 cm from inner surface 30 of expanded polymer body 12. Embedded ends 26 and 28 can extend any of the distances or can range between any of the distances recited above from inner surface 30.

Exposed ends 26 and 28 extend at least 1, in some cases at least 2, and in other cases at least 3 cm away from inner surface 30 of expanded polymer body 12. Also, Exposed ends 26 and 28 can extend up to 60, in some cases up to 40, and in other cases up to 20 cm away from inner surface 30 of expanded polymer body 12. In many cases exposed ends 26 and 28 extend from polymer body 12 a distance sufficient to allow utilities to be run along inner surface 30 as described herein. Exposed ends 26 and 28 can extend any of the distances or can range between any of the distances recited above from inner surface 30.

Embedded ends 20 and 22 extend at least 1, in some cases at least 2, and in other cases at least 3 cm into expanded polymer body 12 away from inner surface 30. Also, Embedded ends 20 and 22 can extend up to 10, in some cases up to 8, and in other cases up to 6 cm away from inner surface 30 into expanded polymer body 12. In many cases, embedded ends 20 and 22 extend a distance into expanded polymer body 12 such that embedded ends 20 and 22 do not contact outer surface 24. The depth defined between outer surface 24 and embedded ends 20 and 22 define a thermal break. Embedded ends 26 and 28 can extend any of the distances or can range between any of the distances recited above from inner surface 30 into polymer body 12.

In another embodiment of the invention, embedded ends 20 and 22 can extend from 1/10 to 9/10, in some cases 1/3 to 2/3 and in other cases 1/4 to 3/4 of the thickness of expanded polymer body 12 into expanded polymer body 12.

In an embodiment of the invention, embedded metal studs 14 and 16 have a cross-sectional shape that includes embedding lengths 34 and 36, embedded ends 20 and 22, and exposed ends 26 and 28. The orientation of embedded metal studs 14 and 16 is referenced by the direction of open ends 38 and 40. In an embodiment of the invention, open ends 38 and 40 are oriented away from each other. In this embodiment, wall unit 10 has greater rigidity and is easier to handle without bending.

The spacing between each of embedded metal studs 14 and 16 is typically adapted to be consistent with local construction codes or methods, but can be modified to suit special needs. As such, the spacing between the metal studs can be at least 10, in some instances at least 25 and in some cases at least 30 cm and can be up to 110, in some cases up to 100, in other cases up to 75, and in some instances up to 60 cm measured from a midpoint of exposed end 26 to a midpoint of exposed end 28. The spacing between embedded metal studs 14 and 16 can be any distance or range between any of the distances recited above.

Openings 18 can have various cross-sectional shapes, non-limiting examples being round, oval, elliptical, square, rectangular, triangular, hexagonal or octagonal. The cross-sectional size of openings 18 can be uniform or they can vary independently of each other with regard to size and location relative to inner surface 30 and outer surface 24. The spacing between each opening 18 can be at least 5 and in some cases at least 10 cm and can be up to 110, in some cases up to 100, in other cases up to 75, and in some instances up to 60 cm measured from a midpoint of one opening 18 to an adjacent opening 18. The spacing between openings 18 can independently be any distance or range between any of the distances recited above.

The cross-sectional area of openings 18 can also vary independently one from another or they can be uniform. The cross-sectional area of openings 18 is limited by the dimensions of expanded polymer body 12, as openings 18 will fit within the dimensions of expanded polymer body 12. The cross-sectional area of openings 18 can independently be at least 1, in some cases at least 5, and in other cases at least 9 cm$^2$ and can be up to 130, in some cases up to 100, in other cases up to 75 cm$^2$. The cross-sectional area of openings 18 can independently be any value or range between any of the values recited above.

As shown in FIG. 1, expanded polymer body 12 can extend for a distance with alternating embedded metal studs 14 and 16 placed therein. The length of wall unit 10 can be any length that allows for safe handling and minimal damage to wall unit 10. The length of wall unit 10, defined as the distance from receiving end 27 to male terminal end 21, can typically be at least 1, in some cases at least 1.5, and in other cases at least 2 m and can be up to 25, in some cases up to 20, in other cases up to 15, in some instances up to 10 and in other instances up to 5 m. The length of wall unit 10 can be any value or can range between any of the values recited above. In some embodiments of the invention, each end of wall unit 10 is terminated with an embedded metal stud.

The height of wall unit 10 can be any height that allows for safe handling and minimal damage to wall unit 10. The height of wall unit 10 is determined by the length of embedded metal studs 14 and 16. The height of wall unit 10 can be at least 1 and in some cases at least 1.5 m and can be up to 3 M and in some cases up to 2.5 m. In some instances, in order to add stability to wall unit 10, reinforcing cross-members (not shown) can be attached to embedded metal studs 14 and 16. The height of wall unit 10 can be any value or can range between any of the values recited above.

As shown in FIG. 1, expanded polymer body 12 has a finite length 72 and has a male terminal end 21 that includes forward edge 23 and trailing edge 25 and a receiving end 27 which includes recessed section 29 and extended section 31, which is adapted to receive forward edge 23, and trailing edge 25. Typically, lengths of wall units 10 are interconnected by inserting a forward edge 23 from a first wall unit 10 into a recessed section 29 a second wall unit 10. In this manner, a larger wall section containing any number of wall units can be assembled and/or arrayed.

Wall unit 10 is typically part of an overall wall system 21 as shown in FIGS. 3-11. A bottom end of embedded metal studs 14 and 16 are seated in and attached to a bottom track 44 and a top slip track 42. This configuration leads to the formation of bottom channel 52 and top channel 54. Channels 52 and 54 can be filled with correspondingly shaped expanded polymer material, or alternatively with a molding shaped to fit in channels 52 or 54.

As a non-limiting example molding 58 can be inserted into top channel 54 and attached to top slip track 42 by inserting fasteners 60 into holes 62 in top slip track 62 as shown in FIGS. 10 and 11. Molding 58 provides a thermal break to the exposed metal track.

Channels 52 and 54 provide an advantageous feature of the present invention as the channels at the ends of the panels expose the embedded metal studs 14 and 16 on both sides. This feature over comes a basic structural problem in the prior art by providing a positive mechanical connection to both sides of the embedded metal studs when top slip track 42 and bottom track 44 are installed.

Referring to FIGS. 3, 5, and 7-9, embedded metal studs 14 and 16 can have utility holes 46 spaced along their length. Utility holes 46 are useful for accommodating utilities such as wiring for electricity, telephone, cable television, speakers, and other electronic devices, gas lines and water lines (as shown particularly in FIG. 9). Utility holes 46 can have various cross-sectional shapes, non-limiting examples being round, oval, elliptical, square, rectangular, triangular, hexagonal or octagonal. The cross-sectional area of Utility holes 46 can also vary independently one from another or they can be uniform. The cross-sectional area of utility holes 46 is limited by the dimensions of embedded metal studs 14 and 16, as utility holes 46 will fit within their dimensions and not significantly detract from their structural integrity and strength. The cross-sectional area of utility holes 46 can independently be at least 1, in some cases at least 2, and in other cases at least 5 cm$^2$ and can be up to 30, in some cases up to 25, in other cases up to 20 cm$^2$. The cross-sectional area of openings 18 can independently be any value or range between any of the values recited above.

In an embodiment of the invention, utility holes 46 can have a flanged and in many cases a rolled flange surface to provided added strength to the embedded metal studs. The flanged holes allow for the use of lighter gauge materials to achieve the same structural properties.

A wall system 21 is shown in FIGS. 5-8, where three wall units are connected. Where the ends of two wall units meet to form a corner, an outside corner attachment 47 secures the ends of the two wall units together. Also, additional metal studs 49 can be included to add strength to the formed corners. Thus the wall system includes interconnecting bottom 44 and top 42 slip tracks and end embedded metal studs 51 secured together at corner attachment units that extend along the height of each wall unit.

Openings for windows and doors are provided by framing the ends of the opening with two or more embedded metal studs placed adjacent to each other (shown as 53). Upper member 55 and lower member 57 are connected to the embedded metal studs to form a framed opening. The openings are adapted to readily accept pre-manufactured windows and doors.

The strength and integrity of wall system 21 can be enhanced by including spanner bars 61 that are arranged to pass through openings, such as utility holes 46 in embedded metal studs 14 and 16. Spanner bars 61 are attached to embedded metal studs 14 and 16 and are arranged, as shown, in a generally perpendicular relationship to metal studs 14 and 16, although spanner bars 61 can be arranged to form any suitable angle with embedded metal studs 14 and 16 that enhances the strength and integrity or wall system 21. Spanner bars and metal studs that can be incorporated in the invention include those available under the trade name TRADEREADY® SPAZZER® available from Dietrich Industries, Inc., Pittsburgh, Pa. as well as those disclosed in U.S. Pat. Nos. 5,784, 850 and 6,021,618, the relevant portions of which are herein incorporated by reference.

The various metal structural parts in wall system 21 can be secured or attached to one another by way of welds 71 and/or screws 73.

Particular advantages of the present wall units and wall systems include the ability to easily run utilities prior to attaching a finish surface to the exposed ends of the embedded metal studs. The exposed metal studs facilitate field structural framing changes and additions and leave the structural portions of the assembly exposed for local building officials to inspect the framing.

Figure 9:
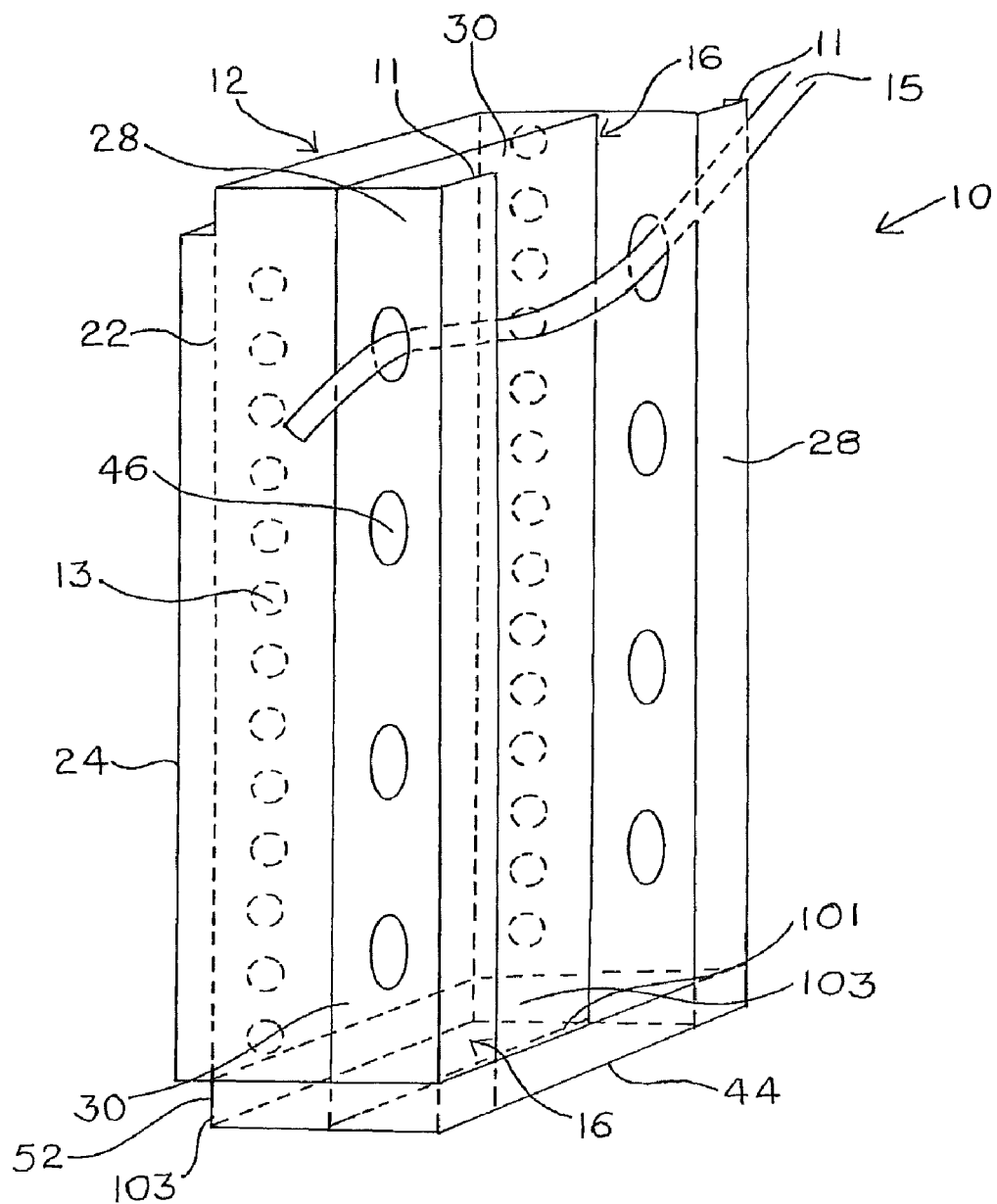
FIG. 9 shows a perspective view of a wall system according to the invention.

Referring to FIG. 9, in an embodiment of the invention, wall unit 10 includes expanded polymer body 12 (central body), right facing embedded metal studs 16 (reinforcing embed bars), which include flanges 11 and have utility holes 46 located in an exposed portion of embedded studs 16, expansion holes 13 in an embedded portion of embedded studs 16 and embedded end 22, which, does not touch outer surface 24 of expanded polymer body 12. The embedded metal studs 16 also have exposed end 28 respectively that extends from inner surface 30 of expanded polymer body 12.

Expansion holes 13 are useful in that as expanded polymer body 12 is molded, the polymer matrix expands through expansion holes 13 and the expanding polymer fuses. This allows the polymer matrix to encase and hold embedded studs 16 by way of the fusion in the expanding polymer. In an embodiment of the invention, expansion holes 13 can have a flanged and in many cases a rolled flange surface to provided added strength to the embedded metal studs.

A utility space defined by inner surface 30 of expanded polymer body 12 and flanges 11 adapted for accommodating utilities is provided. Typically, flanges 11 have a finish surface (as described herein) attached to them, a side of which further defines the utility space.

In an embodiment of the invention, the utility space is adapted and dimensioned to receive standard and/or pre-manufactured components, such as windows, doors and medicine cabinets as well as customized cabinets and shelving.

In an embodiment of the invention, utility holes 46 are adapted to allow utilities (as shown, electrical line 15) to be run in a transverse direction relative to embedded studs 16.

The utilities can be one or more selected from water lines (either potable, or as a non-limiting example hot water lines for radiant heating), waste lines, chases, telephone lines, cable television lines, computer lines, fiber optic cables, satellite dish communication lines, antenna lines, electrical lines, ductwork, and gas lines.

In a particular embodiment of the invention, wall unit 10 is attached to bottom track 44. In this embodiment, bottom track 44 is adapted to hold a volume at least equivalent to the volume of the expanded polymer matrix in expanded polymer body 12, in liquid or molten form. In some instances, this volume can be defined by bottom 101 and sides 103 of bottom track 44 and the portions of embedded studs 16 within the space defined by bottom track 44.

Non-limiting examples of suitable finish surfaces include wood, rigid plastics, wood paneling, concrete panels, cement panels, drywall, sheetrock, particle board, rigid plastic panels, a metal lath, combinations thereof or any other suitable material having decorating and/or structural functions.

Further, the air space between the inner surface of the expanded polymer body and the finish surface allows for improved air circulation, which can minimize or prevent mildew. Additionally, because the metal studs are not in direct contact with the outer surface, thermal bridging via the highly conductive embedded metal studs is avoided and insulation properties are improved.

The present invention also provides floor units and floor systems that include composite floor panels. The floor panels generally include a central body, substantially parallelepipedic in shape, containing an expanded polymer matrix, having opposite faces, a top surface, and an opposing bottom surface; and two or more embedded floor joists longitudinally extending across the central body between the opposite faces, having a first end embedded in the expanded polymer matrix, having a first transverse member extending from the first end generally contacting or extending above the top surface, a second end extending away from the bottom surface of the central body having a second transverse member extending from the second end, and one or more expansion holes located in the embedded floor joists between the first end of the embedded floor joists and the bottom surface of the central body. The central body contains a polymer matrix as described above that expands through the expansion holes. The embedded floor joists include one or more utility holes located in the embedded joists between the bottom surface of the central body and the second end of the embedded joists and the space defined by the bottom surface of the central body and the second ends of the embedded floor joists is adapted for accommodating utility lines. The composite floor panel is positioned generally perpendicular to a structural wall and/or foundation.

Figure 12:
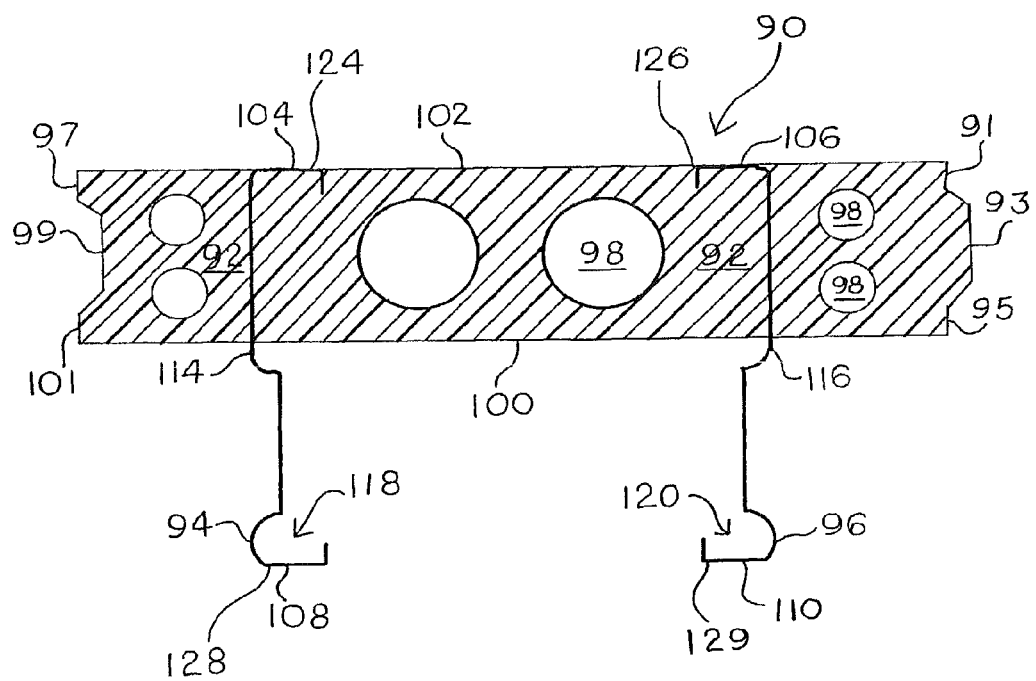
FIG. 12 shows a cross-sectional view of a pre-formed building panel according to the invention.

As shown in FIG. 12, floor unit 90 includes expandable polymer panel 92 (central body) and embedded metal joists 94 and 96 (reinforcing embedded bars). Expandable polymer panel 92 includes openings 98 that traverse all or part of the length of expanded polymer panel 92. The embedded metal joists 94 and 96 have embedded ends 104 and 106 respectively that are in contact with top surface 102 of expanded polymer panel 92. The embedded metal joists 94 and 96 also have exposed ends 108 and 110 respectively that extend from bottom surface 100 of expanded polymer panel 92.

Embedded metal joists 94 and 96 include first transverse members 124 and 126 respectively extending from embedded ends 104 and 106 respectively, which are generally in contact with top surface 102 and exposed ends 108 and 110 include second transverse members 128 and 129 respectively, which extend from exposed ends 108 and 110 respectively. The space defined by bottom surface 100 of expanded polymer panel 92 and the exposed ends 108 and 110 and second transverse members 128 and 129 of embedded metal joists 94 and 96 can be oriented to accept ductwork placed between embedded metal joists 94 and 96 adjacent bottom surface 100.

Expanded polymer panel 92 can have a thickness, measured as the distance from top surface 102 to bottom surface 100 similar in dimensions to that described above regarding expanded polymer body 12.

Exposed ends 108 and 110 extend at least 1, in some cases at least 2, and in other cases at least 3 cm away from bottom surface 100 of expanded polymer panel 92. Also, Exposed ends 108 and 110 can extend up to 60, in some cases up to 40, and in other cases up to 20 cm away from bottom surface 100 of expanded polymer panel 92. Exposed ends 108 and 110 can extend any of the distances or can range between any of the distances recited above from bottom surface 100.

In an embodiment of the invention, embedded metal joists 94 and 96 have a cross-sectional shape that includes embedding lengths 114 and 116, embedded ends 104 and 106, and exposed ends 108 and 110. The orientation of embedded metal joists 94 and 96 is referenced by the direction of open ends 118 and 120. In an embodiment of the invention, open ends 118 and 120 are oriented toward each other. In this embodiment, floor unit 90 is adapted to accept ductwork. As a non-limiting example, a HVAC duct can be installed along the length of embedded metal joists 94 and 96.

As used herein, the term "ductwork" refers to any tube, pipe, channel or other enclosure through which air can flow from a source to a receiving space; non-limiting examples being air flowing from heating and/or air-conditioning equipment to a room, make-up air flowing from a room to heating and/or air-conditioning equipment, fresh air flowing to an enclosed space, and/or waste air flowing from an enclosed space to a location outside of the enclosed space. In some embodiments, ductwork includes generally rectangular metal tubes that are located below and extend generally adjacent to a floor.

The spacing between each of embedded metal joists 94 and 96 can be as described regarding embedded metal studs 14 and 16 in wall unit 10.

Openings 98 can have various cross-sectional shapes, and similar spacing and cross-sectional area as described regarding openings 18 in expanded polymer body 12.

As shown in FIG. 12, expanded polymer panel 92 can extend for a distance with alternating embedded metal joists 94 and 96 placed therein. The length of floor unit 90 can be any length that allows for safe handling and minimal damage to floor unit 90. The length of floor unit 90 can be as described regarding the length of wall unit 10. In some embodiments, an end of floor unit 90 can be terminated with an embedded metal joist.

As shown in FIG. 12, expanded polymer panel 92 has a finite length and has a male terminal end 91 that includes forward edge 93 and trailing edge 95 and a receiving end 97 which includes recessed section 99 and extended section 101, which is adapted to receive forward edge 93, and trailing edge 95. Typically, lengths of floor units 90 are interconnected by inserting a forward edge 93 from a first floor unit 90 into a recessed section 99 from a second floor unit 90. In this manner, a larger floor section containing any number of floor units can be assembled and/or arrayed.

The width of floor unit 90 can be any width that allows for safe handling and minimal damage to floor unit 90. The width of floor unit 90 is determined by the length of embedded metal joists 94 and 96. The width of floor unit 90 can be at least 1 and in some cases at least 1.5 m and can be up to 3 m and in some cases up to 2.5 m. In some instances, in order to add stability to floor unit 90, reinforcing cross-members (not shown) can be attached to embedded metal joists 94 and 96. The width of floor unit 90 can be any value or can range between any of the values recited above.

Floor unit 90 is typically part of an overall floor system that includes a plurality of the composite floor panels described herein, where the male ends include a tongue edge and the female ends include a groove arrayed such that a tongue and/or groove of each panel is in sufficient contact with a corresponding tongue and/or groove of another panel to form a plane. The established plane extends laterally from a foundation and/or a structural wall.

In the present floor system, ductwork can be attached to the reinforcing metal bars of at least one composite floor panel.

Additionally, a flooring material can be attached to or in contact with one or more of the first transverse members of the composite floor panels. Any suitable flooring material can be used in the invention. Suitable flooring materials are materials that can be attached to the transverse members and cover at least a portion of the expanded polymer panel. Suitable flooring materials include, but are not limited to plywood, wood planks, tongue and grooved wood floor sections, sheet metal, sheets of structural plastics, stone, ceramic, cement, concrete, and combinations thereof.

Generally, the floor system forms a plane that extends laterally from a foundation and/or a structural wall.

Figure 13:
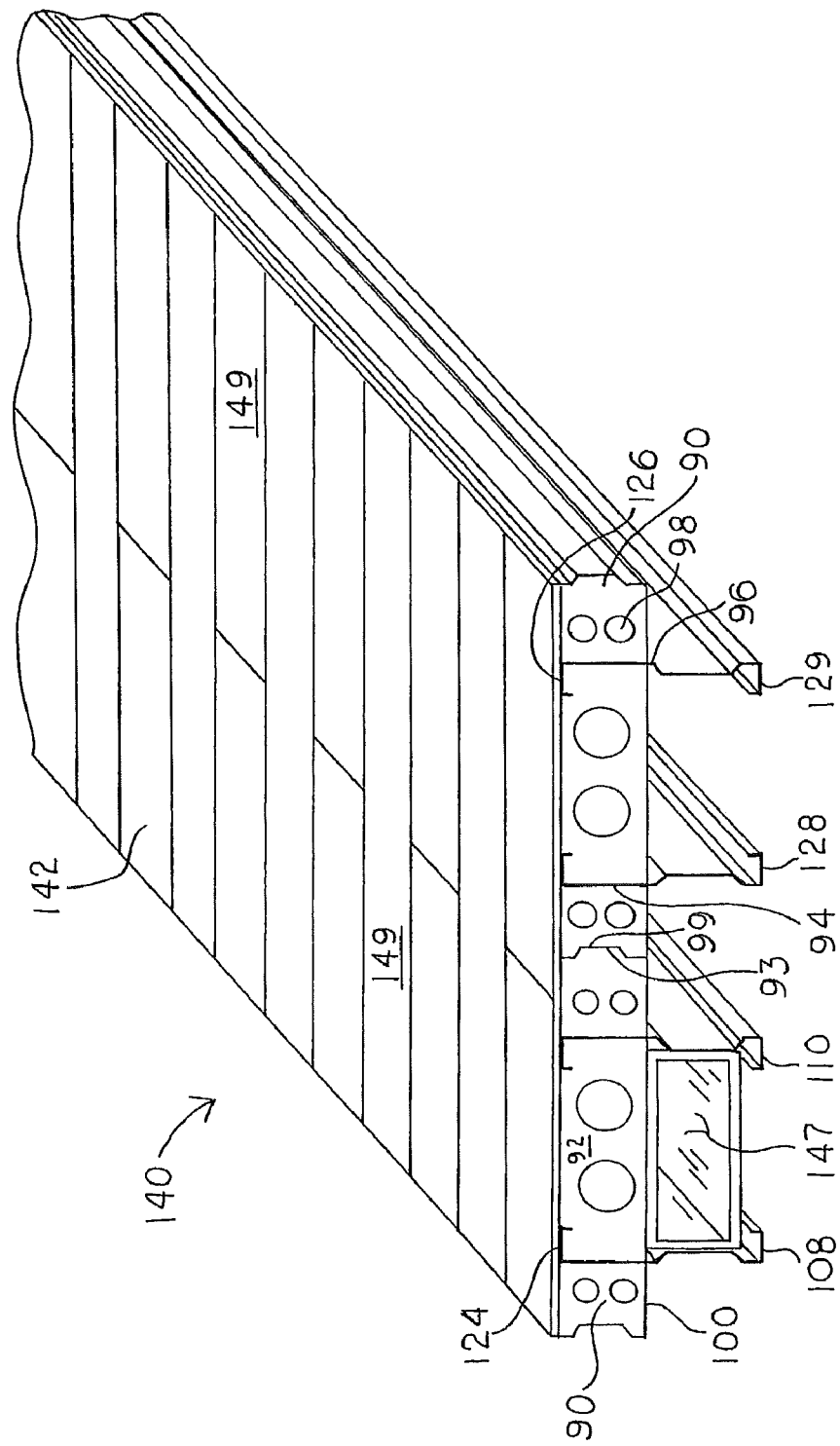
FIG. 13 shows a perspective view of a floor system according to the invention.
Figure 14:
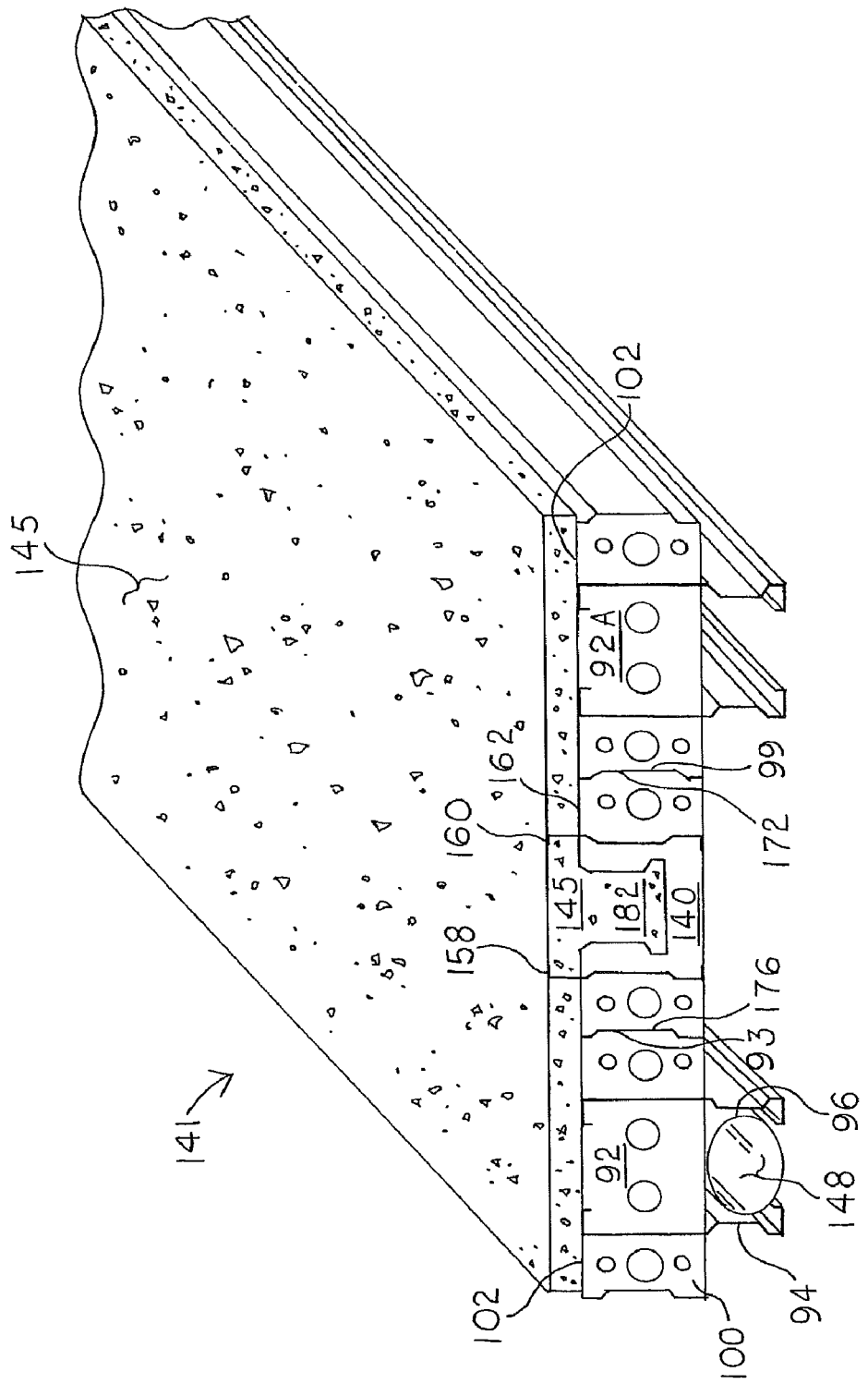
FIG. 14 shows a perspective view of a floor system according to the invention.

FIGS. 13 and 14 show floor systems 140 and 141 respectively. Floor system 140 is established by contacting forward edge 93 with recessed section 99 to form a continuous floor 142. Like features of the individual floor panels are labeled as indicated above. As described above, various shaped types of ductwork can be secured in the space defined by bottom surface 100 of expanded polymer panel 92 and the exposed ends 108 and 110 and second transverse members 128 and 129 of embedded metal joists 94 and 96. As non-limiting examples, rectangular ventilation duct 147 is shown in FIG. 13 and circular air duct 148 is shown in FIG. 14. As shown in the embodiment of FIG. 13, tongue and groove wood flooring 149 is placed over floor units 90 and attached to first transverse members 124 and 126. In an alternative embodiment (not shown) a plywood, plastic, particle board or other suitable sub-floor can be attached to first transverse members 124 and 126 and tongue and groove wood flooring 149 attached thereto.

Figure 3:
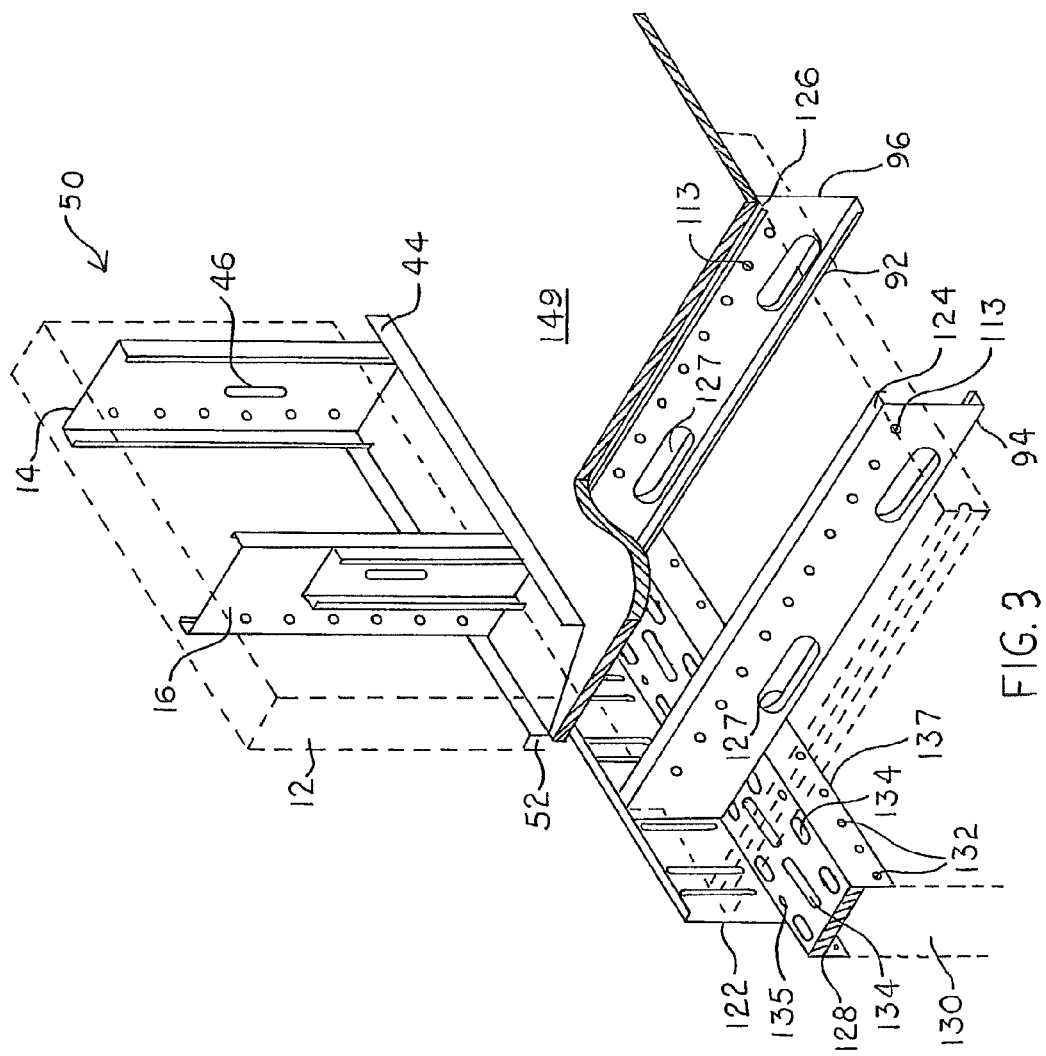
FIG. 3 shows a perspective view of a construction method according to the invention.

As shown in FIG. 3, an end of embedded metal joists 94 and 96 are seated in and attached to a joist rim 122 and a second joist rim is attached to the other end of embedded metal joists 94 and 96. A floor base 149, typically plywood, particle board or other supporting surface or flooring material, can be attached to first transverse members 124 and/or 126.

Referring to FIG. 3, embedded metal joists 94 and 96 have utility holes 127 spaced along their length. Utility holes 127 are useful for accommodating wiring for electricity, telephone, cable television, speakers, and other electronic devices. Utility holes 127 can have various cross-sectional shapes, non-limiting examples being round, oval, elliptical, square, rectangular, triangular, hexagonal or octagonal. The cross-sectional area of Utility holes 127 can also vary independently one from another or they can be uniform. The cross-sectional area of utility holes 127 is limited by the dimensions of embedded metal joists 94 and 96, as utility holes 127 will fit within their dimensions and not significantly detract from their structural integrity and strength. The cross-sectional area of utility holes 127 can independently be at least 1, in some cases at least 2, and in other cases at least 5 cm$^2$ and can be up to 30, in some cases up to 25, in other cases up to 20 cm$^2$. The cross-sectional area of utility holes 127 can independently be any value or range between any of the values recited above.

Expansion holes 113, as mentioned above are useful in that as expanded polymer body 92 is molded, the polymer matrix expands through expansion holes 113 and the expanding polymer fuses. This allows the polymer matrix to encase and hold embedded studs 94 and 96 by way of the fusion in the expanding polymer. In an embodiment of the invention, expansion holes 113 can have a flanged and in many cases a rolled flange surface to provided added strength to the embedded metal studs.

In an embodiment of the invention, the floor system can be placed on a foundation. However, because foundations are rarely perfectly level, a level track can be attached to the foundation prior to placement of the floor system. The level track includes a top surface having a length and two side rails extending from opposing edges of the top surface, where the width of the top surface is greater than a width of the foundation and the length of the top surface is generally about the same as the length of the foundation. The level track is generally attached to the foundation by placing the level track over the foundation with the side rails generally contacting the sides of the foundation, situating the top surface such that it conforms to level and permanently attaching the level track to the foundation. A rim joist can be used to aid in attaching the top surface to an end of the plurality of composite floor panels.

Figure 4:
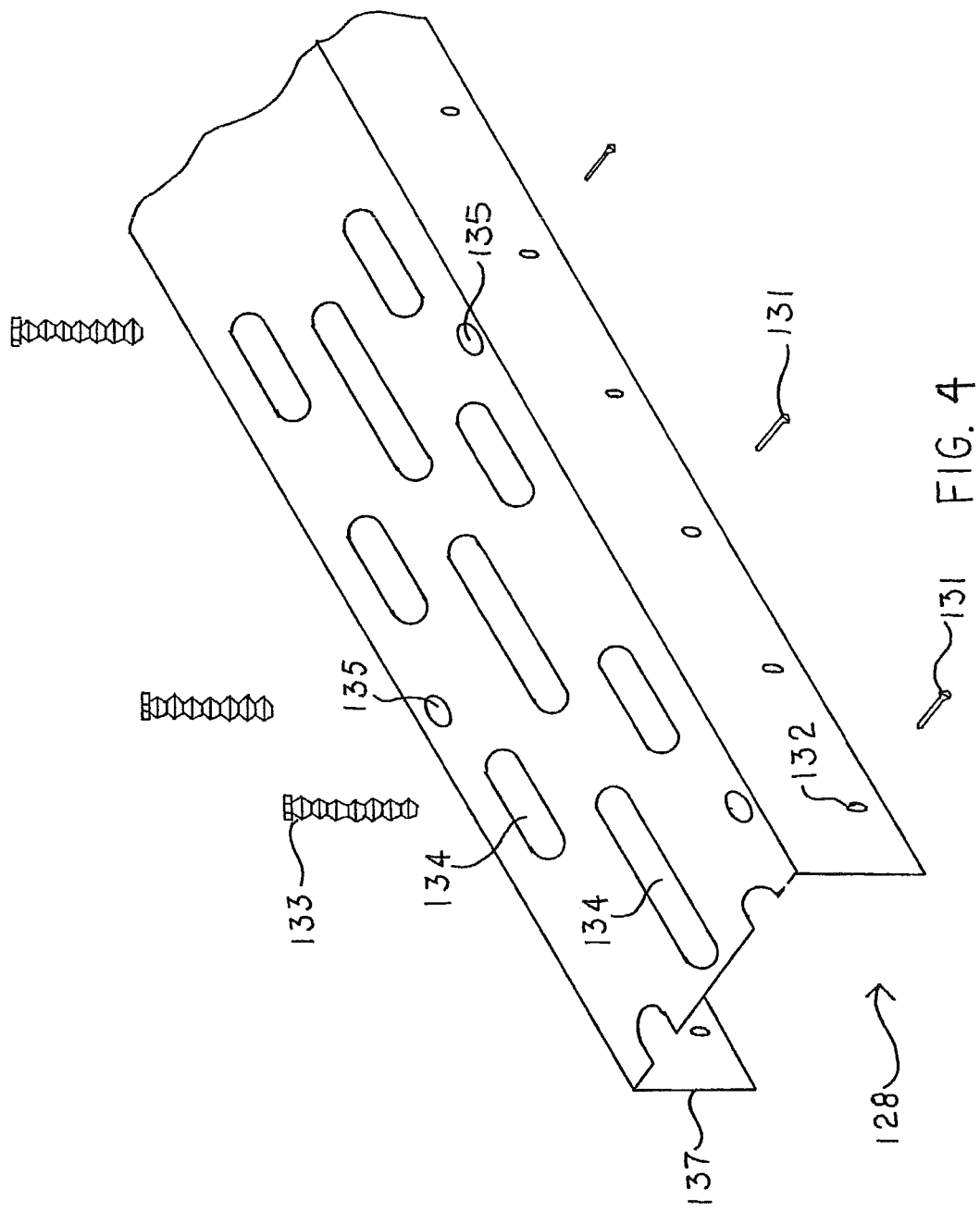
FIG. 4 shows a partial perspective view of a level track according to the invention.
Figure 5:
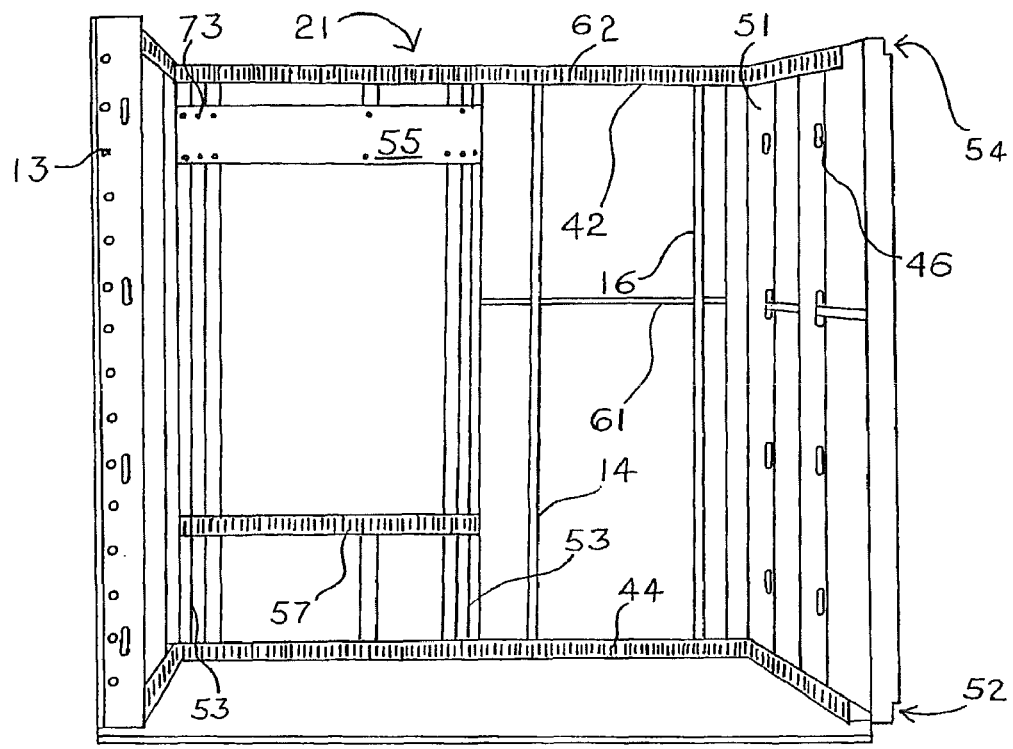
FIG. 5 shows a rear elevation view of a wall system according to the invention.
Figure 6:
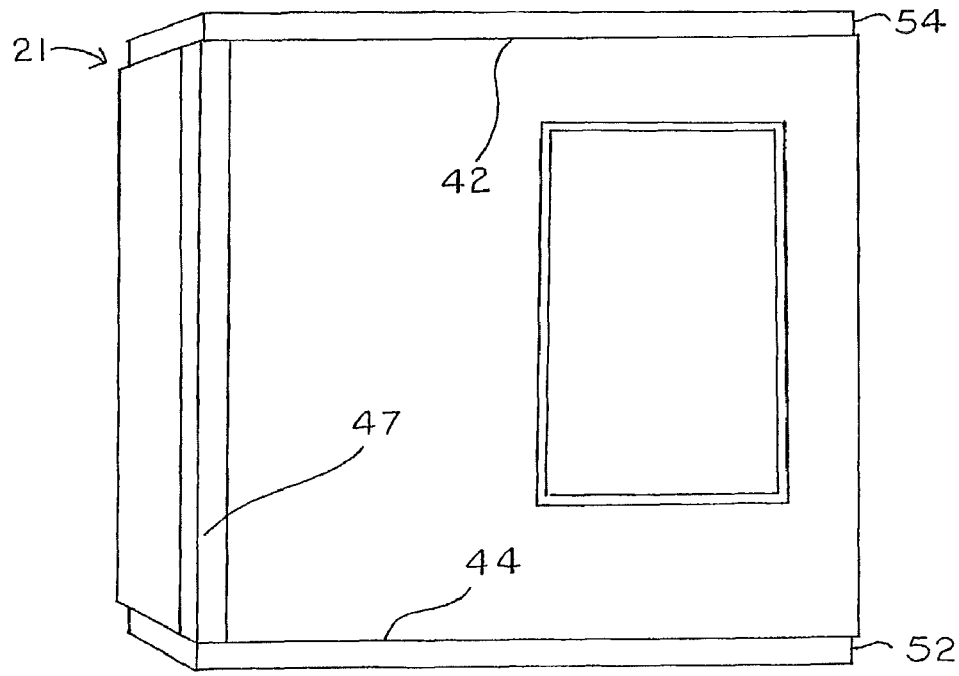
FIG. 6 shows a front perspective view of a wall system according to the invention.
Figure 7:
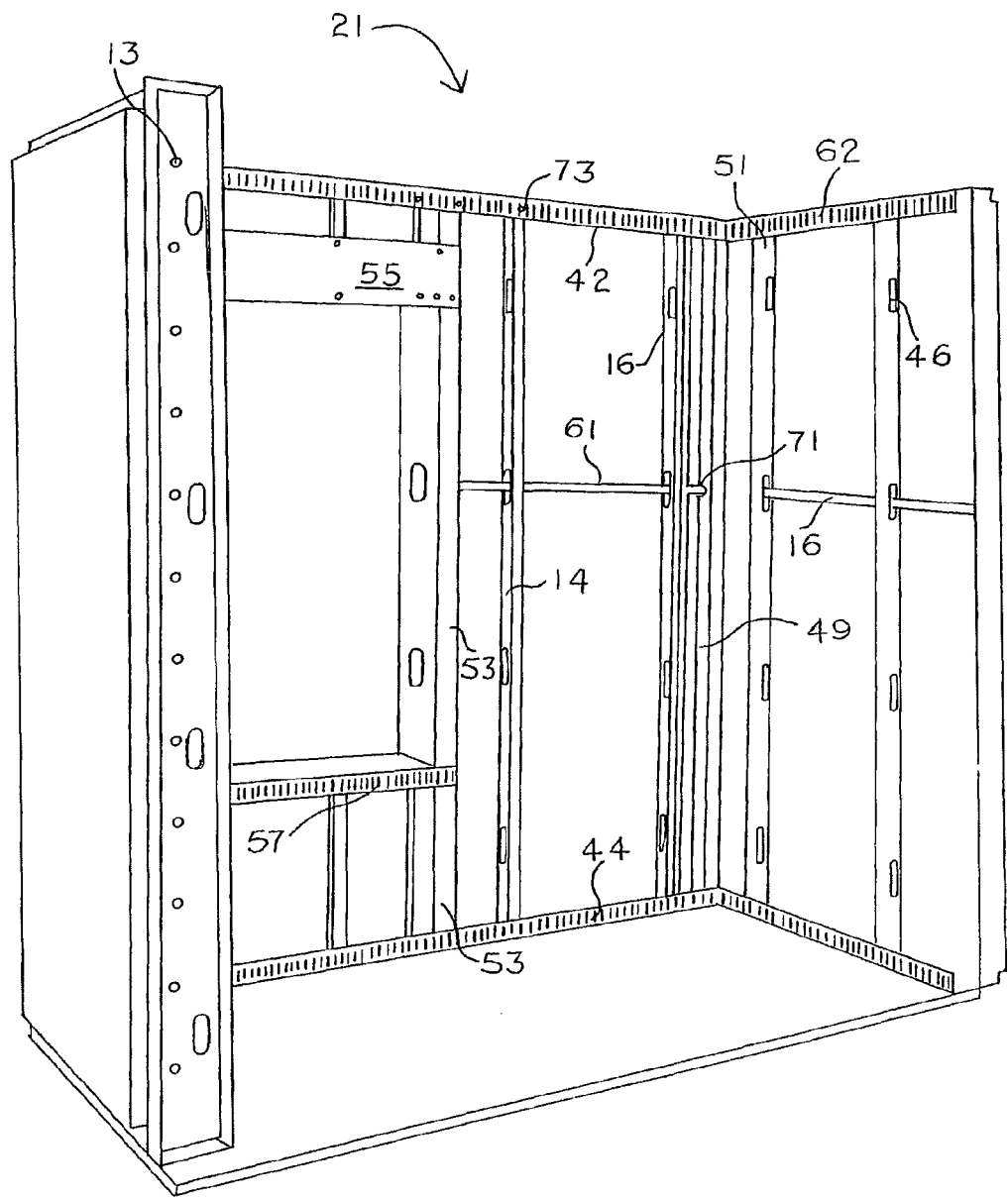
FIG. 7 shows a rear side perspective view of a wall system according to the invention.
Figure 8:
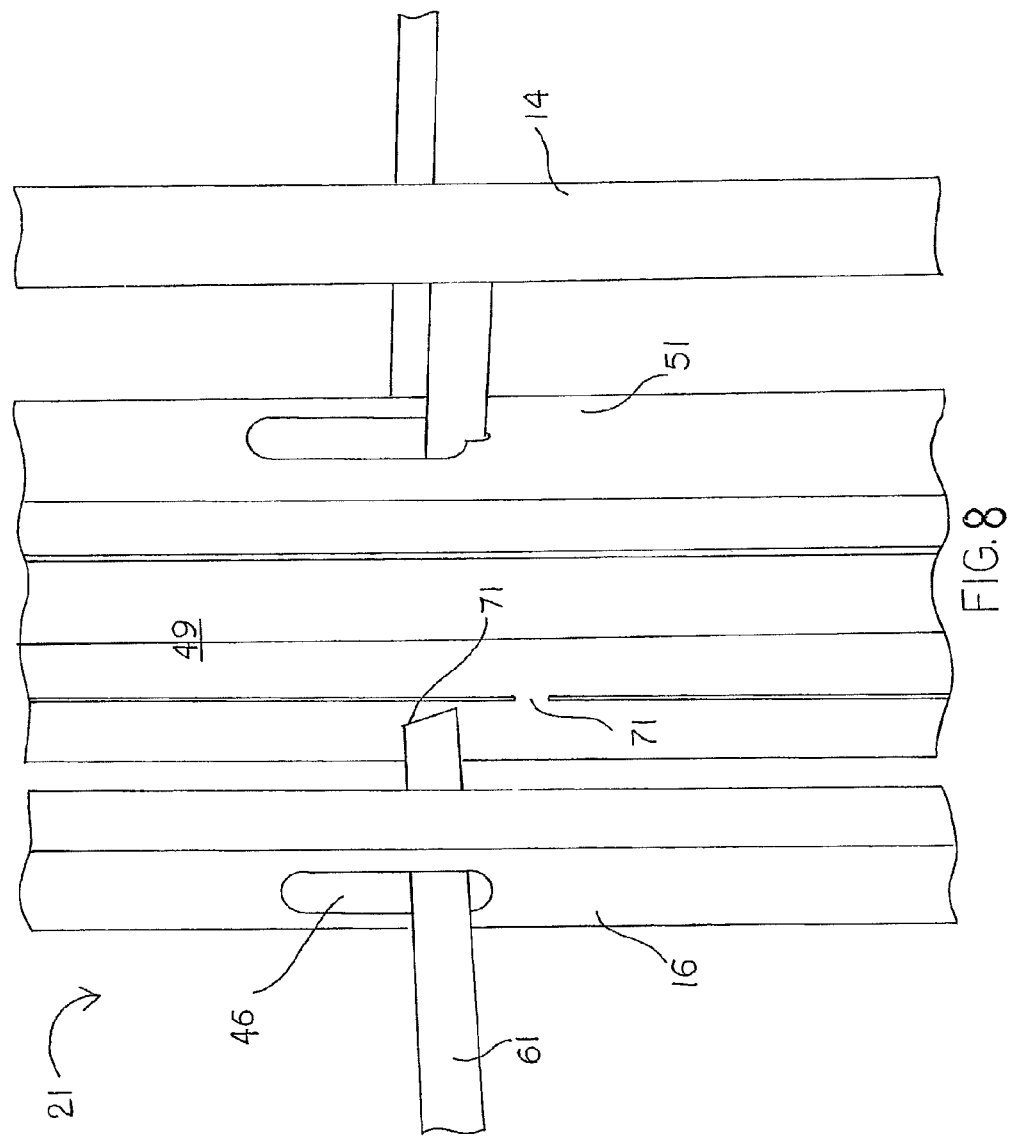
FIG. 8 shows an expanded perspective view of a portion of the wall system of FIG. 7.

More particularly, a level track 128 can be attached to foundation 130 prior to placement of the floor system (see FIGS. 3 and 4). Level track 128 can be placed on foundation 128 and leveled. The level is made permanent by fastening level track 128 to foundation 130 by using fasteners 131 (nails shown, although screws or other suitable devices can be used) via fastening holes 132. Screws 133 can also be used to attach level track 128 to foundation 130 via screw holes 135. Some of screw holes 135 can be used in conjunction with screws 133 to attach a bottom lip of joist rim 122 to level track 128. Screws 133 can also maintain the level position of level track 128 until a more permanent positioning is achieved. Alternatively or additionally mortar can be applied via mortar holes 134 to fill the space between level track 128 and the top of foundation 130. After level track 128 has been attached and/or the mortar has sufficiently set, the flooring system can be fastened to the foundation.

Level track 128 includes side rails 137, which are adapted to extend over a portion of foundation 130. The width of level track 128 is the transverse distance of a top portion of level track 128 from one side rail 137 to the other. The width of level track 128 is typically slightly larger than the width of foundation 130. The width of level track 128 can be at least 10 cm, in some cases at least 15 cm, in other cases at least 20 cm and in some instances at least 21 cm. Also, the width of level track 128 can be up to 40 cm, in some cases up to 35 cm, and in other cases up to 30 cm. The width of level track 128 can be any value or range between any of the values recited above.

The length of side rail 137 is the distance it extends from a top portion of level track 128 and is sufficient in length to allow for proper leveling of level track 128 and attachment to foundation 130 via fasteners 131 and fastening holes 132. The length of side rail 137 can be at least 4 cm, in some cases at least 5 cm, and in other cases at least 7 cm. Also, the length of side rail 137 can be up to 20 cm, in some cases up to 15 cm, and in other cases up to 12 cm. The length of side rail 137 can be any value or range between any of the values recited above.

Figure 15:
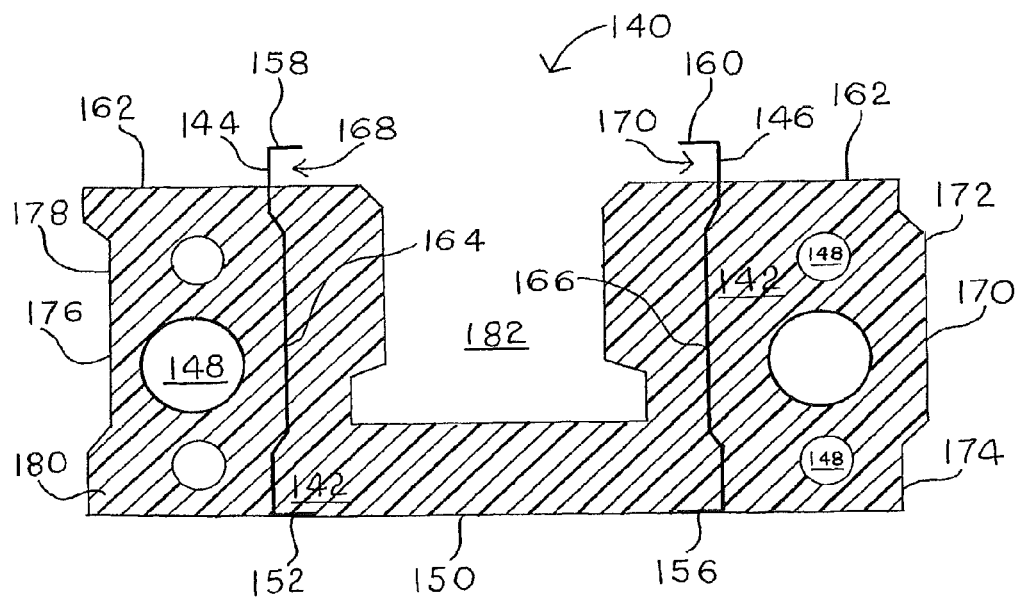
FIG. 15 shows a cross-sectional view of a pre-formed building panel according to the invention.

An embodiment of the invention relates to a floor or tilt up insulated panel that is adapted to act as a concrete I-beam form. As shown in FIG. 15, I-beam panel 140 includes expanded polymer form 142 (central body) and embedded metal members 144 and 146 (embedded reinforcing bars). Expanded polymer form 142 includes openings 148 that traverse all or part of the length of expanded polymer form 142. The embedded metal members 144 and 146 have embedded ends 152 and 156 respectively that are in contact with inner face 150 of expanded polymer form 142. The embedded metal members 144 and 146 also have exposed ends 158 and 160 respectively that extend from outer face 162 of expanded polymer form 142.

Expanded polymer form 142 can have a thickness, measured as the distance from inner face 150 to outer face 162 similar in dimensions to that described above regarding expanded polymer body 12.

Exposed ends 158 and 160 extend at least 1, in some cases at least 2, and in other cases at least 3 cm away outer face 162 of expanded polymer form 142. Also, Exposed ends 158 and 160 can extend up to 60, in some cases up to 40, and in other cases up to 20 cm away from outer face 162 of expanded polymer form 142. Exposed ends 158 and 160 can extend any of the distances or can range between any of the distances recited above from outer face 100.

In an embodiment of the invention, embedded metal members 144 and 146 have a cross-sectional shape that includes embedding lengths 164 and 166, embedded ends 152 and 156, and exposed ends 158 and 160. The orientation of embedded metal members 144 and 146 is referenced by the direction of open ends 168 and 170. In an embodiment of the invention, open ends 168 and 170 are oriented toward each other. In this embodiment, I-beam panel 140 is adapted to be imbedded in concrete that can be applied to outer face 162.

The spacing between each of embedded metal members 144 and 146 can be as described regarding embedded metal studs 14 and 16 in wall unit 10.

Openings 148 can have various cross-sectional shapes, and similar spacing and cross-sectional area as described regarding openings 18 in expanded polymer body 12.

As shown in FIG. 15, expanded polymer panel 140 has a finite length and has a male terminal end 170 that includes forward edge 172 and trailing edge 174 and a receiving end 176 which includes recessed section 178, which is adapted to receive forward edge 172, and protruding edge 180. Typically, lengths of I-beam panels 140 are interconnected by inserting a forward edge 172 from a first I-beam panel 140 into a recessed section 178 of a second I-beam panel. In this manner, a larger roof, ceiling, floor or wall section containing any number of I-beam panels can be assembled and/or arrayed. The width of I-beam panel 140, measured as the distance from protruding edge 180 to trailing edge 174 can typically be at least 20, in some cases at least 30, and in other cases at least 35 cm and can be up to 150, in some cases up to 135, and in other cases up to 125 cm. The width of I-beam panel 140 can be any value or can range between any of the values recited above.

I-beam panel 140 includes I-beam channel 182. The present I-beam panel is advantageous when compared to prior art systems in that the connection between adjacent panels in the prior art is provided along the thin section of expanded polymer below I-beam channel 182. The resulting thin edge is prone to damage and/or breakage during shipment and handling. The I-beam panel of the present invention eliminates this problem by molding in the I-beam channel, eliminating the exposure of a thin edge section to potential damage.

In an embodiment of the invention, rebar or other concrete reinforcing rods can be placed in I-beam channel 182 in order to strengthen and reinforce a concrete I-beam formed within I-beam channel 182.

Figure 16:
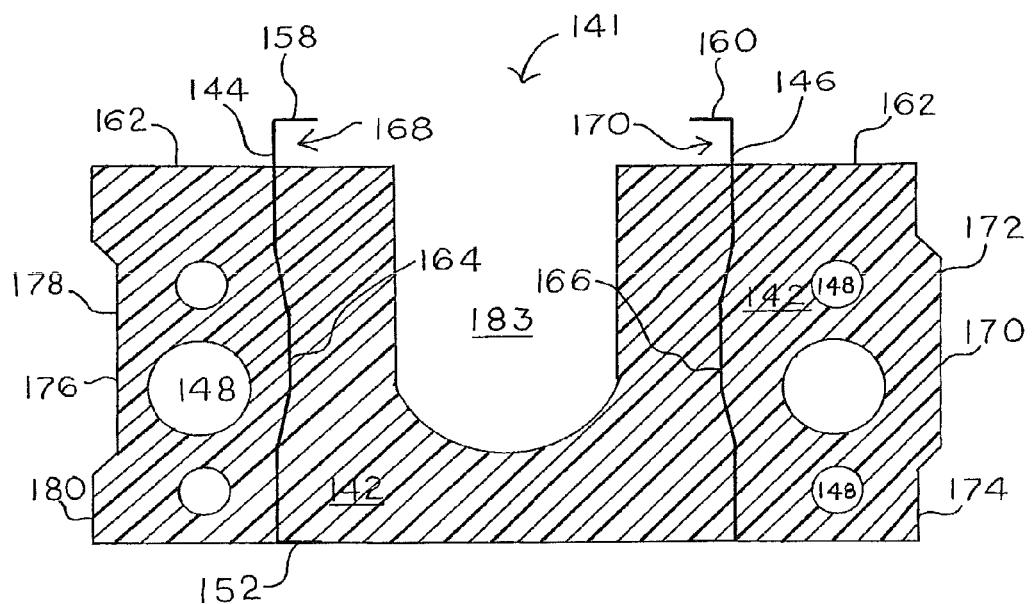
FIG. 16 shows a cross-sectional view of a pre-formed building panel according to the invention.

In another embodiment of the invention shown in FIG. 16, instead of I-beam channel 182, I-beam panel 141 includes channel 183. Channel 183 is adapted to accept round ductwork or other mechanical and utility parts and devices and/or can be filled with concrete as described above.

Figure 17:
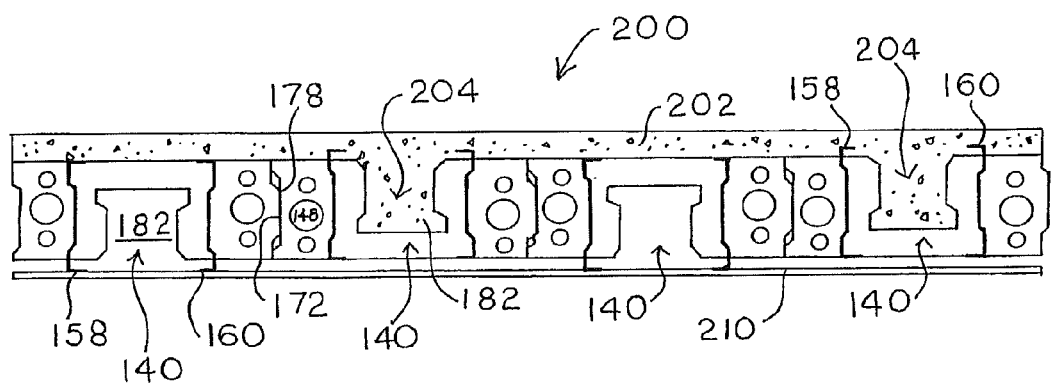
FIG. 17 shows a cross-sectional view of a concrete composite pre-formed building panel system according to the invention.
Figure 18:
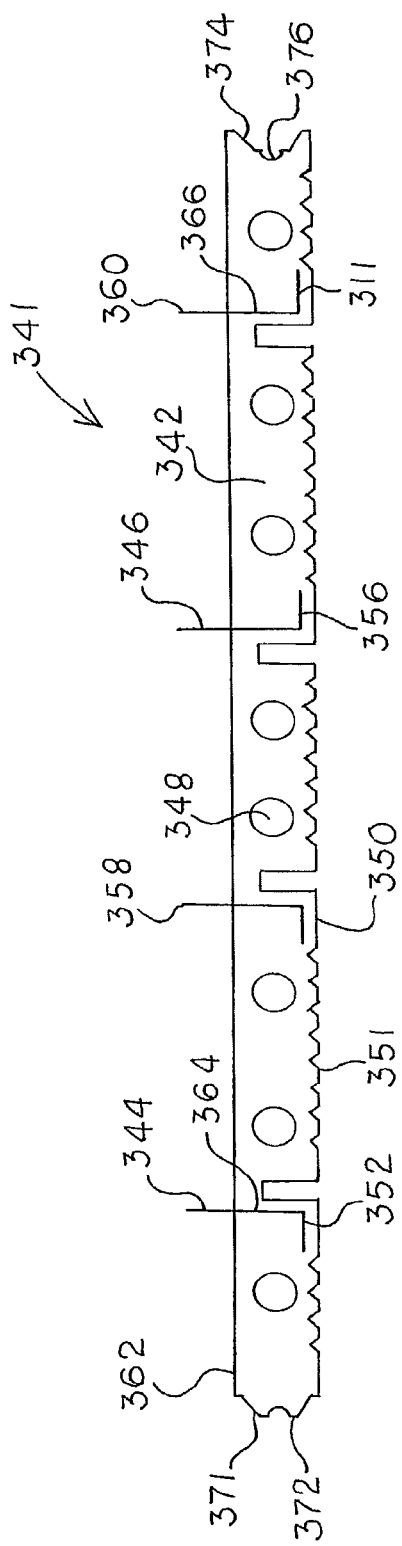
FIG. 18 shows a cross-sectional view of a pre-formed building panel according to the invention.
Figure 22:
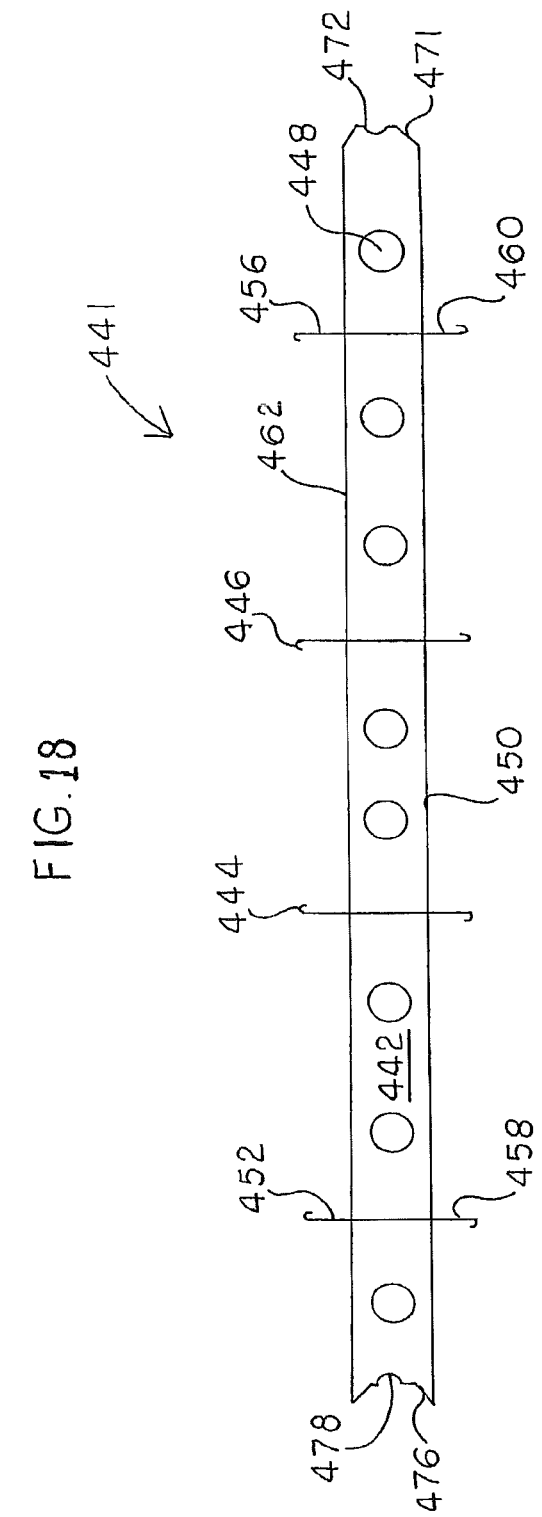
FIG. 22 shows a cross-sectional view of a pre-formed building panel according to the invention.
Figure 19:
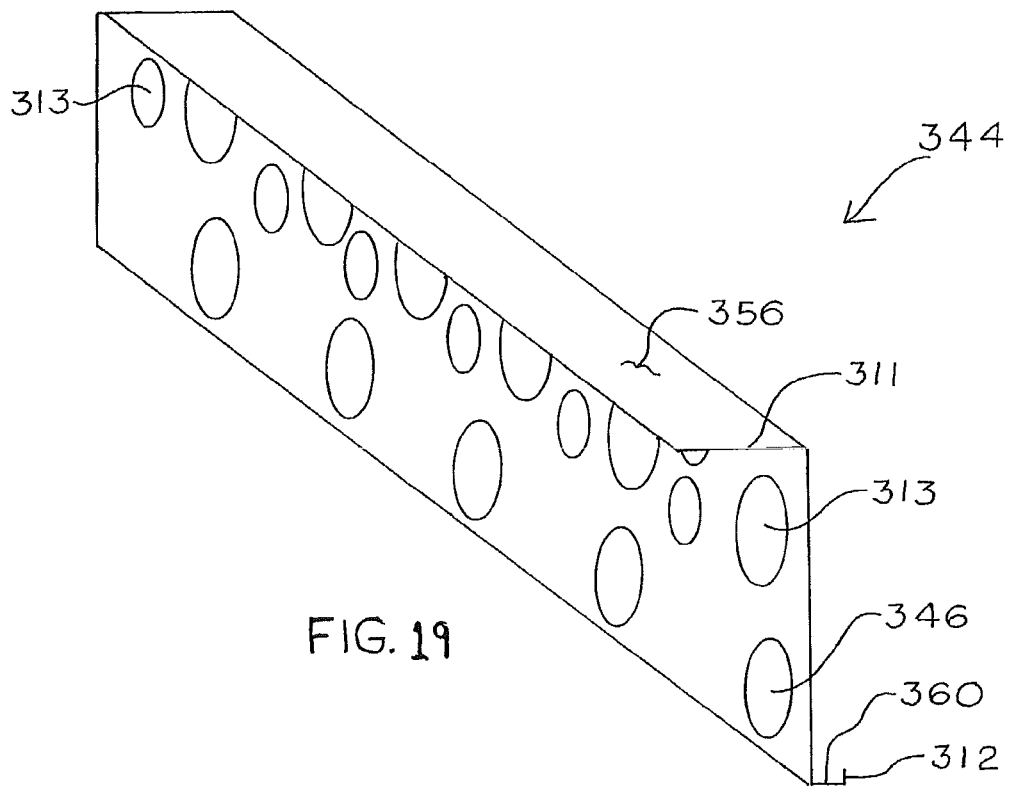
FIG. 19 shows a perspective view of a metal stud used in the invention.
Figure 23:
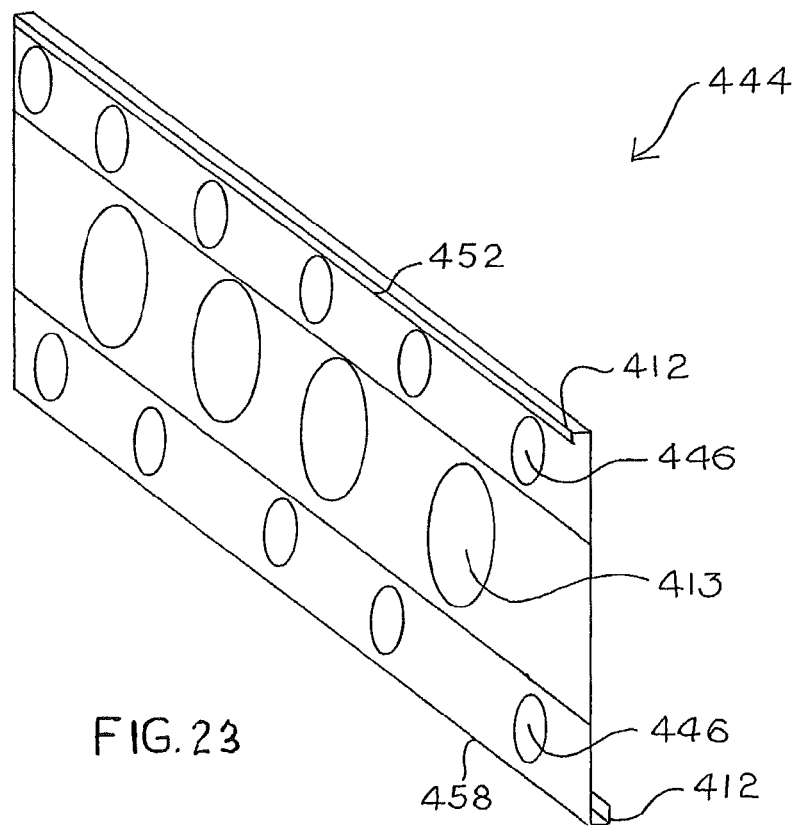
FIG. 23 shows a perspective view of a metal stud used in the invention.

An example of an I-beam system 200 according to the invention is shown in FIG. 17, where four I-beam panels 140 are connected by inserting a forward edge 172 from a first I-beam panel 140 into a recessed section 178 of a second I-beam panel. Concrete is poured, finished and set to form a concrete layer 202 that includes concrete I-beams 204, which are formed in I-beam channels 182. The embodiment shown in FIG. 17 is an alternating embodiment, where the direction of I-beam channel 182 of each I-beam panel 140 alternately faces toward concrete layer 202 and includes concrete I-beam 204 or faces away from concrete layer 202 and I-beam channel 182 does not contain concrete. In an embodiment of the invention, the facing away I-beam panel can be I-beam panel 141. Alternatively, every I-beam panel 140 could face concrete layer 202 and include concrete I-beam 204.

In the embodiment shown, exposed ends 158 and 160 are either embedded in concrete layer 202 or are exposed. The exposed ends 158 and 160 are available as attachment points for a finish surface 210, which can include wood, rigid plastics, wood paneling, concrete panels, cement panels, drywall, sheetrock, particle board, rigid plastic panels, or any other suitable material having decorating and/or structural functions or other construction substrates 210. The attachment is typically accomplished through the use of screws, nails, adhesive or other fasteners known in the art.

In an embodiment of the invention, I-beam system 200 is assembled on a flat surface and a first end is lifted while a second end remains stationary resulting in orienting I-beam system 200 generally perpendicular to the flat surface. This is often referred to as "tilting a wall" in the art and in this embodiment of the invention, I-beam system 200 is referred to as a "tilt-wall."

In another embodiment of the invention, I-beam system 200 can be used as a roof on a structure or a floor in a structure.

Embodiments of the present invention provide a composite building panel that includes a central body, substantially parallelepipedic in shape, containing an expanded polymer matrix as described above, having opposite faces, a top surface, and an opposing bottom surface; at least one reinforcing embedded stud longitudinally extending across the central body between the opposite faces, having a first end embedded in the expanded polymer matrix, a second end extending away from the bottom surface of the central body, and one or more expansion holes located in the embedded stud between the first end of the embedded stud and the bottom surface of the central body, where the central body contains a polymer matrix that expands through the expansion holes; and a concrete layer covers at least a portion of the top surface and/or bottom surface.

A particular embodiment relates to a tilt up insulated panel that is adapted for use as a wall or ceiling panel. As shown in FIGS. 18-21, one-sided wall panel 340 includes a reinforced body 341 that includes expanded polymer form 342 (central body) and embedded metal members 344 and 346 (embedded reinforcing bars). Expanded polymer form 342 can include openings 348 that traverse all or part of the length of expanded polymer form 342. The embedded metal members 344 and 346 have embedded ends 352 and 356 respectively that are not in contact with inner face 350 of expanded polymer form 342. The embedded metal members 344 and 346 also have exposed ends 358 and 360 respectively that extend from outer face 362 of expanded polymer form 342.

Expanded polymer form 342 can have a thickness, measured as the distance from inner face 350 to outer face 362 similar in dimensions to that described above regarding expanded polymer body 12.

Exposed ends 358 and 360 extend at least 1, in some cases at least 2, and in other cases at least 3 cm away outer face 362 of expanded polymer form 342. Also, Exposed ends 358 and 360 can extend up to 60, in some cases up to 40, and in other cases up to 20 cm away from outer face 362 of expanded polymer form 342. Exposed ends 358 and 360 can extend any of the distances or can range between any of the distances recited above from outer face 362.

In an embodiment of the invention, embedded metal members 344 and 346 have a cross-sectional shape that includes embedding lengths 364 and 366, embedded ends 352 and 356, and exposed ends 358 and 360. The orientation of embedded metal members 344 and 346 is referenced by the direction of embedded ends 352 and 356. In a particular embodiment of the invention, embedded ends 352 and 356 are oriented away from each other. In this embodiment, one-sided wall panel 340 is adapted so that exposed ends 358 and 360 of embedded metal members 344 and 346 are imbedded in concrete 370 that is applied to outer face 362.

The spacing between each of embedded metal members 344 and 346 can be as described regarding embedded metal studs 14 and 16 in wall unit 10.

In an embodiment of the invention, one-sided wall panel 340 includes expanded polymer body 342 (central body), embedded metal members 344 and 346 (reinforcing embedded bars), which include flanges 311, cornered ends 312, utility holes 346 located in an exposed portion of embedded metal members 344 and 346, expansion holes 313 in an embedded portion of embedded metal members 344 and 346, and embedded ends 344 and 346, which do not touch inner face 350.

In an embodiment of the invention, inner face 350 can have a corrugated surface 351, which can be molded in or cut in, which enhances air flow between inner face 350 and any surface attached thereto.

Expansion holes 313 are useful in that as expanded polymer body 342 is molded, the polymer matrix expands through expansion holes 313 and the expanding polymer fuses. This allows the polymer matrix to encase and hold embedded metal members 344 and 346 by way of fusion in the expanding polymer. In an embodiment of the invention, expansion holes 313 can have a flanged and in many cases a rolled flange surface to provided added strength to the embedded metal members.

Openings 348 can have various cross-sectional shapes, and similar spacing and cross-sectional area as described regarding openings 18 in expanded polymer body 12.

Reinforced body 341 has a finite length and has a male terminal end 371 that includes forward edge 372 and a receiving end 374, which includes recessed section 376, which is adapted to receive forward edge 372. Typically, lengths of one-sided wall panel 340 are interconnected by inserting a forward edge 372 from a first one-sided wall panel 340 into a recessed section 378 of a second one-sided wall panel. In this manner, a larger wall or ceiling section containing any number of one-sided wall panels can be assembled and/or arrayed. The width of one-sided wall panel 340, measured as the distance from protruding edge 380 to trailing edge 374 can typically be at least 20, in some cases at least 30, and in other cases at least 35 cm and can be up to 150, in some cases up to 135, and in other cases up to 125 cm. The width of one-sided wall panel 340 can be any value or can range between any of the values recited above.

Example of a one-sided wall panel 340 according to the invention is shown in FIGS. 20 and 21, where four embedded metal members 344 and 346 are used. Concrete is poured, finished and set to form a concrete layer 370 that encases exposed ends 358 and 360 of embedded metal members 344 and 346.

The embedded ends 350 and 356 of embedded metal members 344 and 346 are available as attachment points for a finish surface 375 such as wood, rigid plastics, wood paneling, concrete panels, cement panels, drywall, sheetrock, particle board, rigid plastic panels, or any other suitable material having decorating and/or structural functions or other construction substrates as shown in FIGS. 20 and 21). The attachment is typically accomplished through the use of screws, nails, adhesive or other fasteners known in the art.

In an embodiment of the invention, one-sided wall panel 340 is assembled on a flat surface and a first end is lifted while a second end remains stationary resulting in orienting one-sided wall panel 340 generally perpendicular to the flat surface. This is often referred to as "tilting a wall" in the art and in this embodiment of the invention, one-sided wall panel 340 is referred to as a "tilt-up wall."

In embodiments of the tilt-up walls described herein, the exposed ends of the embedded metal members can act as a chair for the proper placement of reinforcing wire mesh and/or rebar or other reinforcing rods to the center of a concrete layer, poured, finished and set to encase the exposed ends.

In embodiments of the tilt-up walls described herein shown in FIG. 21, the exposed ends 358 and 360 of the embedded metal members 344 and 346 can act as a chair for the proper placement of reinforcing wire mesh 371 and/or rebar or other reinforcing rods to the center of a concrete layer 370, poured, finished and set to encase the exposed ends Another particular embodiment provides a composite building panel where a first concrete layer covers at least a portion of the top surface and encases at least one first end of an embedded stud and a second concrete layer covers at least a portion of the bottom surface and encases at least one second end of an embedded stud.

This particular embodiment of the invention can provide a second tilt up insulated panel that is adapted for use as a wall or ceiling panel. As shown in FIGS. 22-25, two-sided wall panel 440 includes a reinforced body 441 that includes expanded polymer form 442 (central body) and embedded metal members 444 and 446 (embedded reinforcing bars). Expanded polymer form 442 can include openings 448 that traverse all or part of the length of expanded polymer form 442. The embedded metal members 444 and 446 have a first exposed end 452 and second exposed end 456 respectively that extend from first face 462 of expanded polymer form 442. The embedded metal members 444 and 446 also have second exposed ends 458 and 460 respectively that extend from second face 450 of expanded polymer form 442.

Expanded polymer form 442 can have a thickness, measured as the distance from second face 450 to first face 462 similar in dimensions to that described above regarding expanded polymer body 12.

The exposed ends can extend at least 1, in some cases at least 2, and in other cases at least 3 cm away either face 450 or face 462 of expanded polymer form 442. Also, The exposed ends can extend up to 60, in some cases up to 40, and in other cases up to 20 cm away from either face of expanded polymer form 442. The exposed ends can extend any of the distances or can range between any of the distances recited above from either face of expanded polymer form 442.

In an embodiment of the invention, exposed ends 452, 456, 458, and 460 are imbedded in first concrete layer 469 and second concrete layer 470 that are applied to faces 450 and 462.

The spacing between each of embedded metal members 444 and 446 can be as described regarding embedded metal studs 14 and 16 in wall unit 10.

In an embodiment of the invention, two-sided wall panel 440 includes expanded polymer body 442 (central body), embedded metal members 444 and 446 (reinforcing embedded bars), with cornered ends 412, utility holes 446 located in an exposed portion of embedded metal members 444 and 446, and expansion holes 413 in an embedded portion of embedded metal members 444 and 446.

Expansion holes 413 are useful in that as expanded polymer body 442 is molded, the polymer matrix expands through expansion holes 413 and the expanding polymer fuses. This allows the polymer matrix to encase and hold embedded metal members 444 and 446 by way of fusion in the expanding polymer. In an embodiment of the invention, expansion holes 413 can have a flanged and in many cases a rolled flange surface to provided added strength to the embedded metal members.

Openings 448 can have various cross-sectional shapes, and similar spacing and cross-sectional area as described regarding openings 18 in expanded polymer body 12.

Reinforced body 441 has a finite length and has a male terminal end 471 that includes forward edge 472 and a receiving end 476 which includes recessed section 478, which is adapted to receive forward edge 472. Typically, lengths of two-sided wall panel 440 are interconnected by inserting a forward edge 472 from a first two-sided wall panel 440 into a recessed section 478 of a second two-sided wall panel. In this manner, a larger wall, floor, roof or ceiling section containing any number of two-sided wall panels can be assembled and/or arrayed. The width of one-sided wall panel 440, measured as the distance from forward edge 472 to recessed section 478 can typically be at least 20, in some cases at least 30, and in other cases at least 35 cm and can be up to 150, in some cases up to 135, and in other cases up to 125 cm. The width of two-sided wall panel 440 can be any value or can range between any of the values recited above.

An example of a two-sided wall panel 440 according to the invention is shown in FIG. 24, where four embedded metal members 444 and 446 are used. Concrete is poured, finished and set to form concrete layers 469 and 470 that encases exposed ends 452, 456, 458, and 460 of the embedded metal members.

Alternatively, as shown in FIG. 25, one or both of exposed ends 452 and 456 and/or 458 and 460 are available as attachment points for a finish surface 475 such as wood, rigid plastics, wood paneling, concrete panels, cement panels, drywall, sheetrock, particle board, rigid plastic panels, or any other suitable material having decorating and/or structural functions or other construction substrates. The attachment is typically accomplished through the use of screws, nails, adhesives or other fasteners known in the art. In this embodiment, the space 476 defined by the finished surface 475, exposed ends 452 and 456 and the expanded polymer body 442 can be used to run utilities, insulation and anchors for interior finishes as described above.

The present invention provides a method of constructing a building that includes assembling any of the above-described composite building panels on a generally flat surface, and lifting a first end of the composite building panel while a second end remains stationary resulting in orienting the building panel to form a wall of the building.

In an embodiment of the invention, two-sided wall panel 440 is assembled on a flat surface and a first end is lifted while a second end remains stationary resulting in orienting two-sided wall panel 440 generally perpendicular to the flat surface. This is often referred to as "tilting a wall" in the art and in this embodiment of the invention, two-sided wall panel 440 is referred to as a "tilt-up wall."

In embodiments of the tilt-up walls described herein and shown in FIG. 25, the exposed ends 458 and 460 of the embedded metal members 444 and 446 can act as a chair for the proper placement of reinforcing wire mesh 471 and/or rebar or other reinforcing rods to the center of a concrete layer 470, poured, finished and set to encase the exposed ends.

In an embodiment of the invention, when the exposed ends of the one-sided wall panel and the two sided wall panel are encased in concrete as described above, utility holes 346 and 446 act as sites where the set and hardened concrete fuses through the holes and thereby holds and attaches to the embedded metal members. Additionally, reinforcing rods can be placed through utility holes 346 and 446 connecting embedded metal members, thus further strengthening the formed wall panel.

As used herein, the term "concrete" refers to a hard strong building material made by mixing a cementitious mixture with sufficient water to cause the cementitious mixture to set and bind the entire mass as is known in the art.

In an embodiment of the invention, the concrete can be a so called "light weight concrete" in which light weight aggregate is included with the cementitious mixture. Exemplary light weight concrete compositions that can be used in the present invention are disclosed in U.S. Pat. Nos. 3,021,291, 3,214,393, 3,257,338, 3,272,765, 5,622,556, 5,725,652, 5,580,378, and 6,851,235, JP 9 071 449, WO 98 02 397, WO 00/61519, and WO 01/66485 the relevant portions of which are incorporated herein by reference.

The wall units, floor units, tilt up insulated panels and I-beam panels described herein contain variations that are not meant as limitations. Any of the variations discussed in one embodiment can be used in another embodiment without limitation.

The embodiment of the invention shown in FIG. 14 shows an example of using combinations of the composite panels described herein and combining features of the various panels. This embodiment combines I-beam panel 140 and floor panel 92 (shown as 92 and 92A). In this embodiment, receiving end 176 of I-beam panel 140 accepts forward edge 93 of floor panel 92 and recessed section 99 of floor panel 92A accepts forward edge 172 of I-beam panel 140 to provide tongue and groove connections to establish continuous floor system 141. In this embodiment, circular ductwork 148 is installed along bottom surface 100 of floor panel 92 between embedded metal joists 94 and 96. In this embodiment, the flooring material is concrete layer 145, which covers top surface 102 of floor panels 92 and 92A and outer face 162 of I-beam panel 140. I-beam channel 182 extends from and is open to outer face 162 and is filled with concrete and the thickness of concrete layer 145 is sufficient to encase exposed ends 158 and 160 of I-beam panel 140. The combination shown in this embodiment provides an insulated concrete floor system where utilities can be run under an insulation layer.

In an embodiment of the invention, a lath can be attached to the exposed ends of the metal studs, metal joists or metal members of the wall units, floor units, and expanded polymer panels; i.e. construction elements, of the invention. The lath is capable of supporting a covering layer constituted by a suitable construction material. The lath can include one or more portions extending flush on opposite lateral sides of the construction element, which can be embedded in and anchored also to the concrete used for incorporating and/or joining together one or more adjacent construction elements.

The lath can support one or more covering layers and is typically a stretched metallic lath including a rhomb-shaped mesh having a length-to-height rhomb ratio of about 2:1. The rhomb length can vary between 20 and 60 mm, while the rhomb width can vary between 10 and 30 mm. The stretched metallic lath can have a thickness of from 0.4 to 1.5 mm and, in some cases of from 0.4 to 1.0 mm.

The covering layers can include one or more coating layers of plaster, stucco, cement as it is or, optionally, reinforced with fibers of a suitable material.

Figure 29:
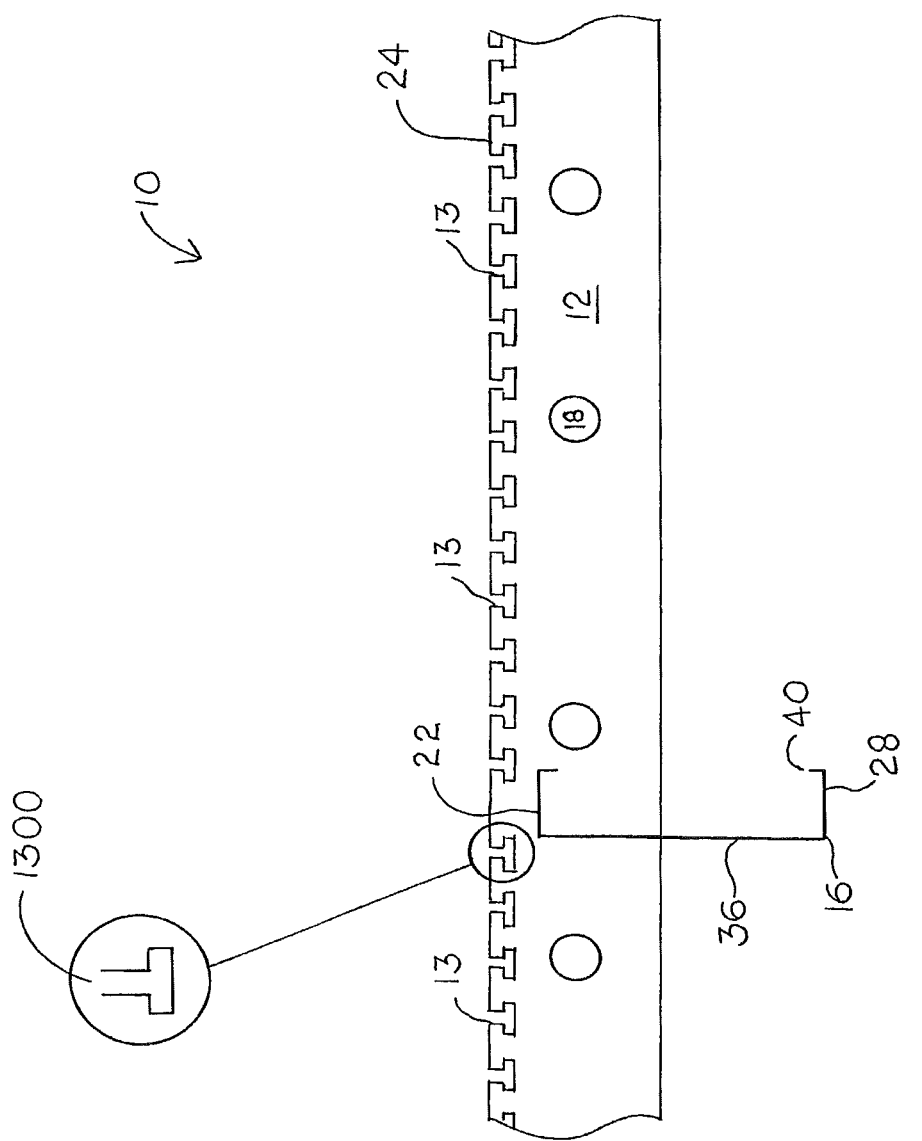
FIG. 29 shows a partial elevation view of a pre-formed building panel according to the invention.

In an embodiment of the invention shown in FIG. 29, outer surface 24 of expanded polymer body 12 can have any desirable type of surface. In some instances, outer surface 24 will be smooth, in other instances grooves can be cut or molded into outer surface 24, in other cases outer surface 24 can have ridges along the surface to facilitate air flow, and in particular cases, as shown in FIG. 29, outer surface 24 can be adapted to accept stucco. In order to facilitate the application of stucco to outer surface 24, T-slots 1300 can be cut into or molded into outer surface 24. Any suitable type of stucco can be used, non-limiting examples including natural material stucco or polymer based stucco. Thus, by including T-slots 1300 in outer surface 24, a stucco-ready panel surface is provided. More particularly, T-slots 1300 provide a mechanical connection for stucco adhesion and no secondary mesh is required. In a particular embodiment of the invention, T-slots 1300 allow for the use of natural material stucco, as this type of stucco is able to breathe and not trap moisture. When stucco is not applied to outer surface 24, T-slots 1300 can be used as water condensation channels or for other finishing techniques.

A particular advantage of the construction panels, wall units, floor units, and expanded polymer panels according to the invention is directed to fire protection and safety. As described above, a portion of the embedded framing studs or embedded floor joists are exposed and can include a web of holes formed along their length. By exposing a section of the web of holes in the embedded framing studs or embedded floor joists, air flow is encouraged and in a fire situation, cooling of the web section of the embedded framing studs or embedded floor joists takes place. This can be very important to prolonging the failure time of a loaded wall section. Typically, in a fire test, an insulated metal stud will fail before a non-insulated stud in the center web area.

Locating spanner bars, as described above, in the exposed web section, the embedded framing studs or embedded floor joists act as a heat sink, helping to dissipate heat from the center web section of the embedded framing studs or embedded floor joists as well as adding to the structural properties of the wall.

The melting properties of the polymer matrix in a fire situation further facilitates the cooling of the embedded framing studs or embedded floor joists web section by melting away from the web as the temperature exceeds 200° F., allowing further air circulation and cooling of the web.

The bottom track of the wall panel, as described above, can be designed to act as a drip and containment pan in a fire event. The bottom track area is designed to contain the solids that melt when the polymer matrix burns. The bottom track is adapted to hold a volume at least equivalent to the volume of the expanded polymer matrix in the expanded polymer body in liquid or molten form. Each track section can be designed to have a holding capacity of from at least 0.2 ft$^3$, in some instances at least 0.25 ft$^3$, in some cases at least 0.3 ft$^3$ and in other cases at least 0.4 ft$^3$ and the holding capacity can be up to 0.75 ft$^3$, in some cases up to 0.65 ft$^3$ and in other cases up to 0.1 ft$^3$ of liquid or molten material. The containment volume in the bottom track can be any value or range between any of the values recited above. The holding capacity of the bottom track is typically designed to contain the solids contained in a typical 48"×96" construction panel.

In lager construction panels, for example those of greater height, the exterior portion of the bottom track can be slotted, allowing for the evacuation of melt materials to the exterior of the building. This design greatly diminishes the interior fire spread and improves the safety of the interior environment of the structure during initial fire spread and rescue operations.

Embodiments of the present invention provide a stay in place insulating concrete forming system that is continuous in nature with length being limited only by transportation and handling limitations. The present insulating concrete forming system includes two opposing foamed plastic faces connected internally and spaced apart by perforated structural metal members. The foamed plastic faces and metal spacing members are aligned within the form to properly position vertically and horizontally concrete reinforcement steel, while allowing for proper concrete flow and finish work attachments. The molded in structural steel members act as internal bracing keeping the forms straight and aligned during concrete placement eliminating the need for most external blocking.

Further, the present invention provides pre-formed insulated concrete forms that include one or more reinforcing structural elements or bars running longitudinally, the end of which are at least partially embedded in oppositely facing expanded polymer bodies. The remainder of the reinforcing structural element(s), the portion between the expanded polymer bodies, are at least partially exposed. The portions of the ends that are encapsulated in the expanded polymer matrix can provide a thermal break from the external environment. The reinforcing structural elements can be flanged lengthwise on either side to provide attachment points for external objects to the panel. Perforations in the reinforcing structural elements in the end portions which are encapsulated in the expanded polymer matrix allow for fusion of the expandable polymer particles perpendicularly. Perforations in the exposed portion of the reinforcing structural element provide attachment points for lateral bracing and/or rebar and allow for uniform concrete flow when concrete is poured into the present insulated concrete form. A tongue and groove or overlapping connection point design provides for panel abutment while maintaining the integrity of the concrete form. Longitudinal holes can run through the expanded polymer matrix and can be variable in diameter and location to provide areas for placement of utilities, lightening the structure and channels for venting of gasses. Panel manufacture is accomplished through the use of a semi-continuous or continuous molding process allowing for variable panel lengths.

The embedded studs used in the invention can be made of any suitable material as described above. In a particular embodiment of the invention, the embedded studs are made of a light gauge metal.

The embedded studs can have a thickness as described above. The thickness of the embedded studs will depend on the intended use of the pre-formed building panel.

In an embodiment of the invention, the embedded studs have holes or openings along their length to facilitate fusion of the expanded plastic material and to reduce any thermal bridging effects in the reinforcing bars, studs, joists and/or members.

In the present invention, the foamed plastic faces can be molded from any suitable expandable plastic material, as described above, on a molding machine capable of inserting the metal members and forming two opposing face panels while maintaining the composite materials in their relative position in a continuous or semi continuous process.

In a particular embodiment of the invention, the expandable thermoplastic particles are expandable polystyrene (EPS) particles. These particles can be in the form of beads, granules, or other particles convenient for the expansion and molding operations as described above.

More particularly, the present insulated concrete form includes a first body, substantially parallelepipedic in shape, containing an expanded polymer matrix, having opposite faces, a first surface, and an opposing second surface; a second body, substantially parallelepipedic in shape, containing an expanded polymer matrix, having opposite faces, a first surface, an opposing second surface; and one or more embedded studs longitudinally extending across the first body and the second body between the first surfaces of each body, having a first end embedded in the expanded polymer matrix of the first body, and a second end embedded in the expansion polymer matrix of the second body. One or more expansion holes are provided in the portion of the embedded stud embedded in the first body and the second body. The first body and the second body include a polymer matrix that expands through the expansion holes. The space defined between the first surfaces of the first body and the second body is capable of accepting concrete poured therein.

Figure 30:
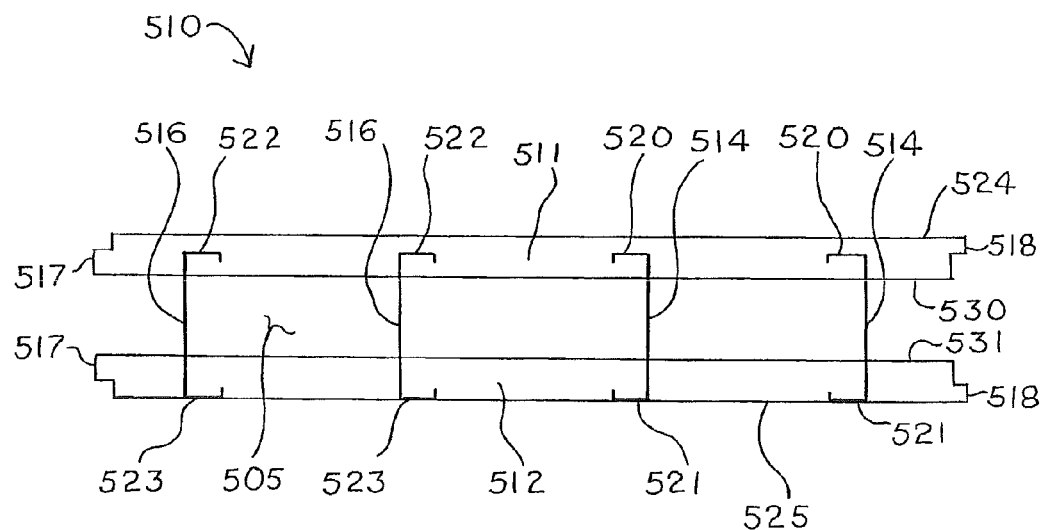
FIG. 30 shows a top plan view of a pre-formed insulated concrete form according to the invention.

An embodiment of the present invention provides insulated concrete forms (ICF) and ICF systems. As shown in FIG. 30, ICF 510 includes first expanded polymer body 511 and second expanded polymer body 512, left facing embedded metal studs 514, and right facing embedded metal studs 516 (reinforcing embed bars). The embedded metal studs 514 and 516 have embedded ends 520 and 522 respectively that do not touch outer surface 524 of first expanded polymer body 511. Embedded metal studs 514 and 516 have embedded ends 521 and 523 respectively that are adjacent to outer surface 525 of second expanded polymer body 512. Space 505 is defined as the space between inner surface 530 of first expanded polymer body 511 and inner surface 531 of second expanded polymer body 512 for the height of ICF 510.

Expanded polymer bodies 511 and 512 can have a thickness, measured as the distance from inner surface 530 or 531 respectively to outer surface 524 or 525 respectively of at least 2, in some cases at least 2.5, and in other cases at least 3 cm and can be up to 10, in some cases up to 8, and in other cases up to 6 cm from inner surface 30 of expanded polymer body 512. The thickness of expanded polymer bodies 511 and 512 can independently be any dimension or range between any of the dimensions recited above.

Embedded ends 520 and 522 extend at least 1, in some cases at least 2, and in other cases at least 3 cm into expanded polymer body 512 away from inner surface 530. Also, Embedded ends 520 and 522 can extend up to 10, in some cases up to 8, and in other cases up to 6 cm away from inner surface 530 into first expanded polymer body 511. Embedded ends 526 and 528 can extend any of the distances or can range between any of the distances recited above from inner surface 530 into polymer body 511.

In another embodiment of the invention, embedded ends 520 and 522 can extend from 1/10 to 9/10, in some cases 1/3 to 2/3 and in other cases 1/4 to 3/4 of the thickness of first expanded polymer body 511 into expanded polymer body 511.

The orientation of embedded metal studs 514 and 516 is referenced by the direction of ends 520, 521, 522, and 523. The ends can be oriented in any direction that suits the strength, attachment objectives or stability of the insulated concrete form.

The spacing between each of embedded metal studs 514 and 516 is typically adapted to be consistent with local construction codes or methods, but can be modified to suit special needs. As such, the spacing between the metal studs can be at least 10, in some instances at least 25 and in some cases at least 30 cm and can be up to 110, in some cases up to 100, in other cases up to 75, and in some instances up to 60 cm. The spacing between embedded metal studs 514 and 516 can be any distance or range between any of the distances recited above.

ICF 510 can extend for a distance with alternating embedded metal studs 514 and 516 placed therein. The length of ICF 510 can be any length that allows for safe handling and minimal damage to ICF 510. The length of ICF 510 can typically be at least 1, in some cases at least 1.5, and in other cases at least 2 m and can be up to 25, in some cases up to 20, in other cases up to 15, in some instances up to 10 and in other instances up to 5 m. The length of ICF 510 can be any value or can range between any of the values recited above. In some embodiments of the invention, each end of ICF 510 is terminated with an embedded metal stud.

The height of ICF 510 can be any height that allows for safe handling, minimal damage, and can withstand the pressure from concrete poured within ICF 510. The height of ICF 510 can be at least 1 and in some cases at least 1.25 m and can be up to 3 M and in some cases up to 2.5 m. In some instances, in order to add stability to ICF unit 510, reinforcing cross-members or rebar (not shown) can be attached to embedded metal studs 514 and 516. The height of ICF 10 can be any value or can range between any of the values recited above.

Space 505, the space between inner surface 530 and inner surface 531 for the height of ICF 510, can be any suitable volume and/or dimensions. Suitable volume and/or dimensions are those where the weight of concrete poured into space 505 is no so high as to cause any part of ICF 510 to fail, i.e., allow concrete to break through ICF 510 such that the volume of concrete is not contained in space 505, but large enough that the poured and set concrete can support whatever is to be built on the resulting ICF concrete wall. Thus, the distance between inner surface 530 and inner surface 531 taken with the height defined above can be at least 5 in some cases at least 10 and in other cases at least 12 cm and can be up to 180, in some cases up to 150 cm and in other cases up to 120 cm. In some instances, in order to add stability to ICF unit 510, reinforcing cross-members or rebar (not shown) can be attached to embedded metal studs 514 and 516. The distance between inner surface 530 and inner surface 531 can be any value or can range between any of the values recited above.

In a particular embodiment of the invention, ICF 510 can be used as a storm wall. In this embodiment, space 505 is filled with concrete as described herein and the distance from inner surface 530 to inner surface 531 can be at least 2 in some cases at least 5 and in other cases at least 10 cm and can be up to 16, in some cases up to 14 cm and in other cases up to 12 cm. In this storm wall embodiment, the distance between inner surface 530 and inner surface 531 can be any value or can range between any of the values recited above.

Storm walls made according to the present invention can be used as any of the other wall panels and tilt-up walls described herein.

As shown in FIG. 30, ICF 510 has a finite length and first body 511 and second body 512 have an inner lip terminus 517 and an outer lip terminus 518. Typically, lengths of ICF 510 are interconnected by inserting an inner lip terminus 517 of one ICF 510 adjacent an outer lip terminus 518 of another ICF 510 to form a continuous ICF. Thus, a larger ICF containing any number of ICF 510 units can be assembled and/or arrayed.

Figure 31:
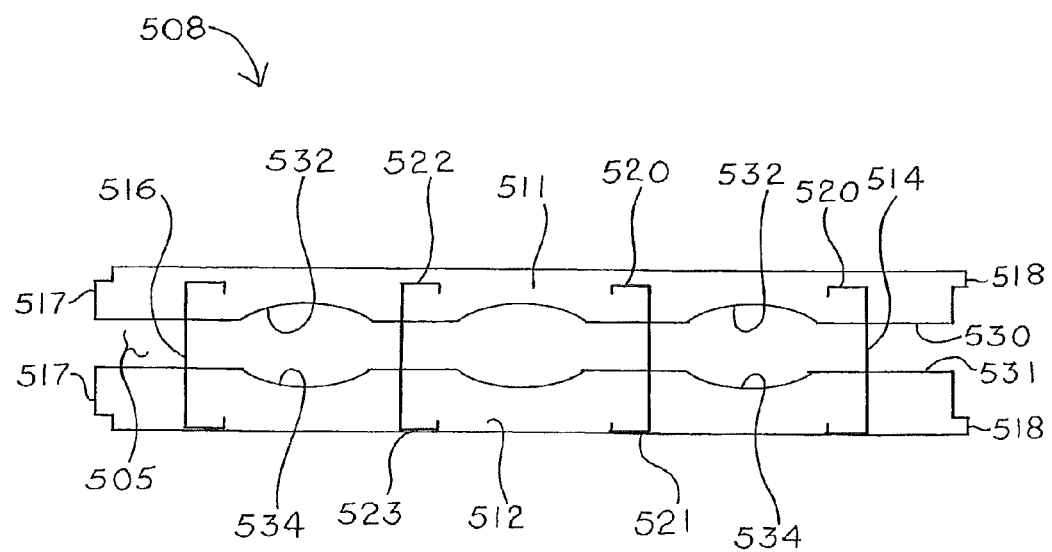
FIG. 31 shows a top plan view of a pre-formed insulated concrete form according to the invention.

An alternative embodiment of the invention is shown in FIG. 31, where ICF 508 is similar to ICF 510 except that inner surface 530 of body 511 and inner surface 531 of body 512 include oppositely opposed inner arching sections 532 and 534 respectively. Inner arching sections 532 and 534 provide a non-linear space within ICF 508, such that concrete poured into ICF 508 will have sections that have a larger cross-sectional width and sections having a smaller cross-sectional width.

Figure 32:
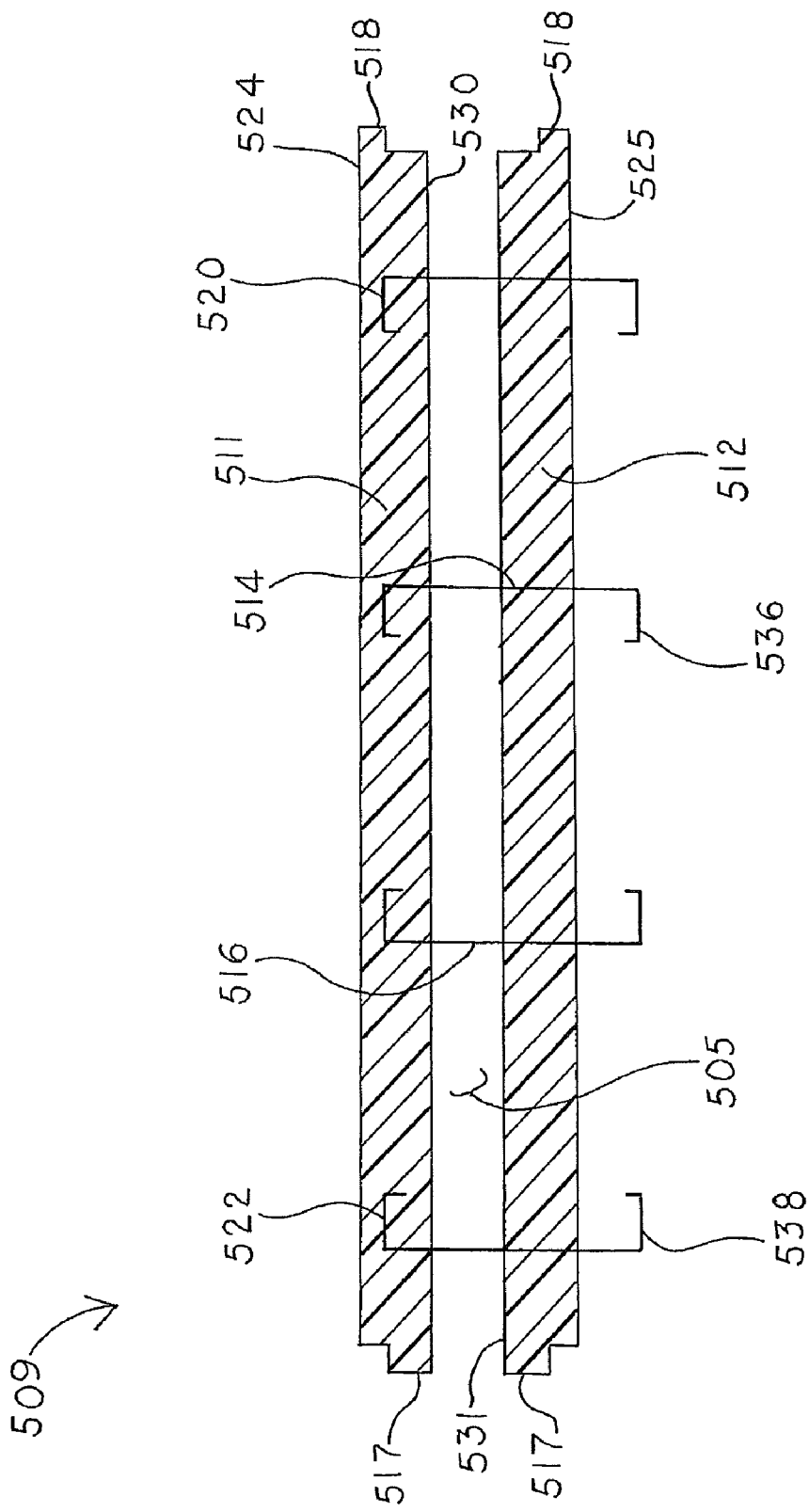
FIG. 32 shows a cross-sectional view of a pre-formed insulated concrete form according to the invention.

In another embodiment of the invention shown in FIG. 32, ICF 509 has exposed ends 536 and 538 instead of embedded ends 521 and 523. Exposed ends 536 and 538 extend at least 1, in some cases at least 2, and in other cases at least 3 cm away from outer surface 525 of second expanded polymer body 512. Exposed ends 536 and 538 can be used to attach finish surfaces, such as drywall, plywood, paneling, etc. as described above to ICF 509. Also, Exposed ends 536 and 538 can extend up to 60, in some cases up to 40, and in other cases up to 20 cm away from outer surface 525 of expanded polymer body 512. Exposed ends 536 and 538 can extend any of the distances or can range between any of the distances recited above from outer surface 525.

Referring to FIG. 32, embedded metal studs 514 and 516 can have utility holes spaced along their length between outer surface 525 and exposed ends 536 and 538. The utility holes (not shown here, but as described and illustrated above) are useful for accommodating utilities such as wiring for electricity, telephone, cable television, speakers, and other electronic devices, gas lines and water lines. The utility holes can have various cross-sectional shapes, non-limiting examples being round, oval, elliptical, square, rectangular, triangular, hexagonal or octagonal. The cross-sectional area of the utility holes can also vary independently one from another or they can be uniform. The cross-sectional area of the utility holes is limited by the dimensions of embedded metal studs 514 and 516, as the utility holes will fit within their dimensions and not significantly detract from their structural integrity and strength. The cross-sectional area of the utility holes can independently be at least 1, in some cases at least 2, and in other cases at least 5 cm$^2$ and can be up to 30, in some cases up to 25, in other cases up to 20 cm$^2$. The cross-sectional area of the utility holes can independently be any value or range between any of the values recited above.

In an embodiment of the invention, the utility holes can have a flanged and in many cases a rolled flange surface to provided added strength to the embedded metal studs.

Figure 33:
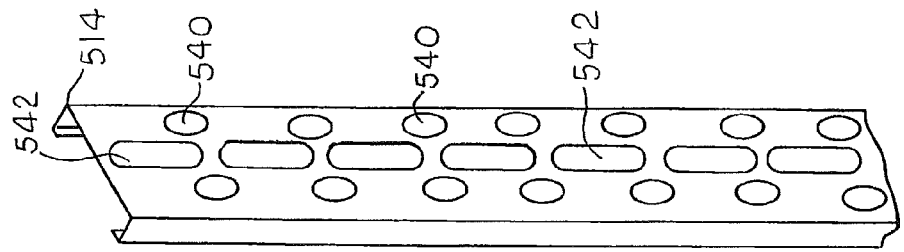
FIG. 33 shows a partial perspective view of an embedded stud used in the invention.
Figure 34:
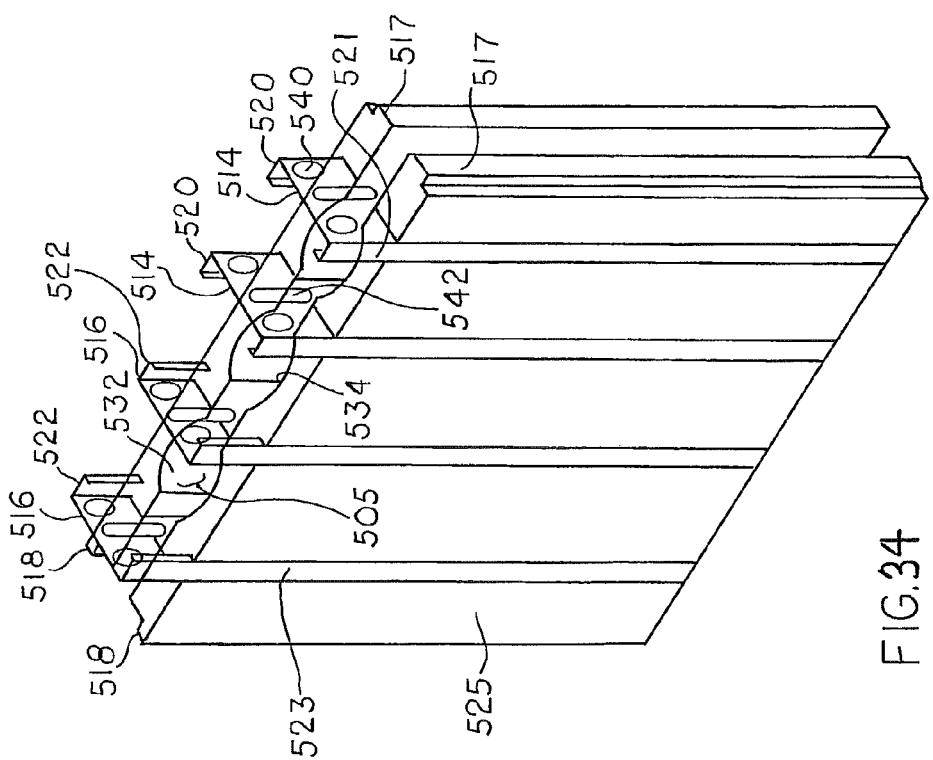
FIG. 34 shows a perspective view of a pre-formed insulated concrete form according to the invention.

FIGS. 33 and 34 show features of the present ICF as they relate to ICF 508 (FIG. 31). A feature of embedded metal studs 514 and 516 is that they can include expansion holes 540 and pour holes 542. As such pour holes 544 can be a punched hole extending along the vertical axis of embedded metal studs 514 and/or 516 that is positioned to allow the free flow of normal concrete and to fix and position horizontal concrete reinforcements. Similarly, expansion holes 540 can be a punched hole of sufficient diameter or slot of sufficient void area to allow the fusion and flow of the polymer matrix through the formed plastic panel.

Figure 35:
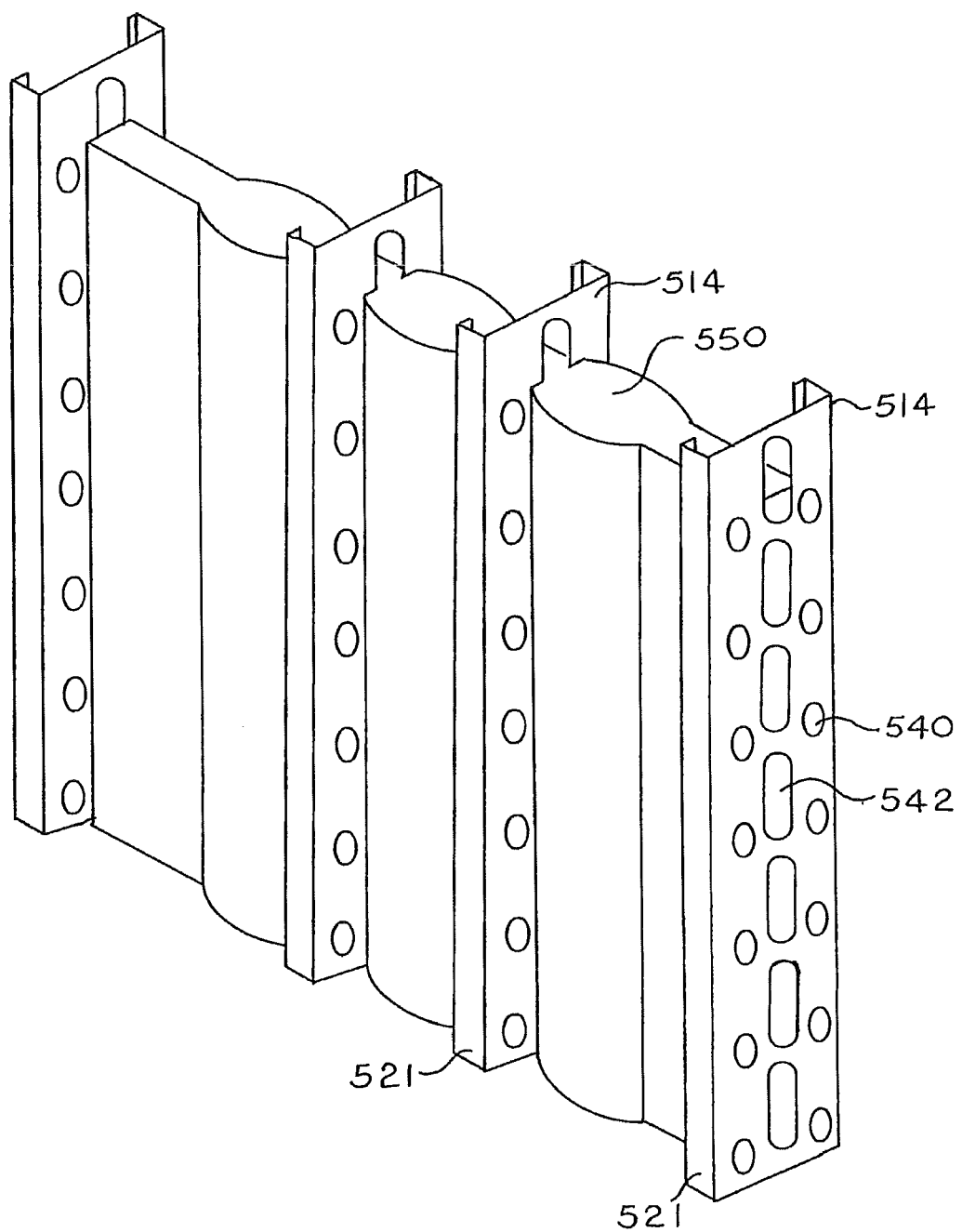
FIG. 35 shows a perspective view of the concrete and embedded stud portion of an insulated concrete form according to the invention.
Figure 36:
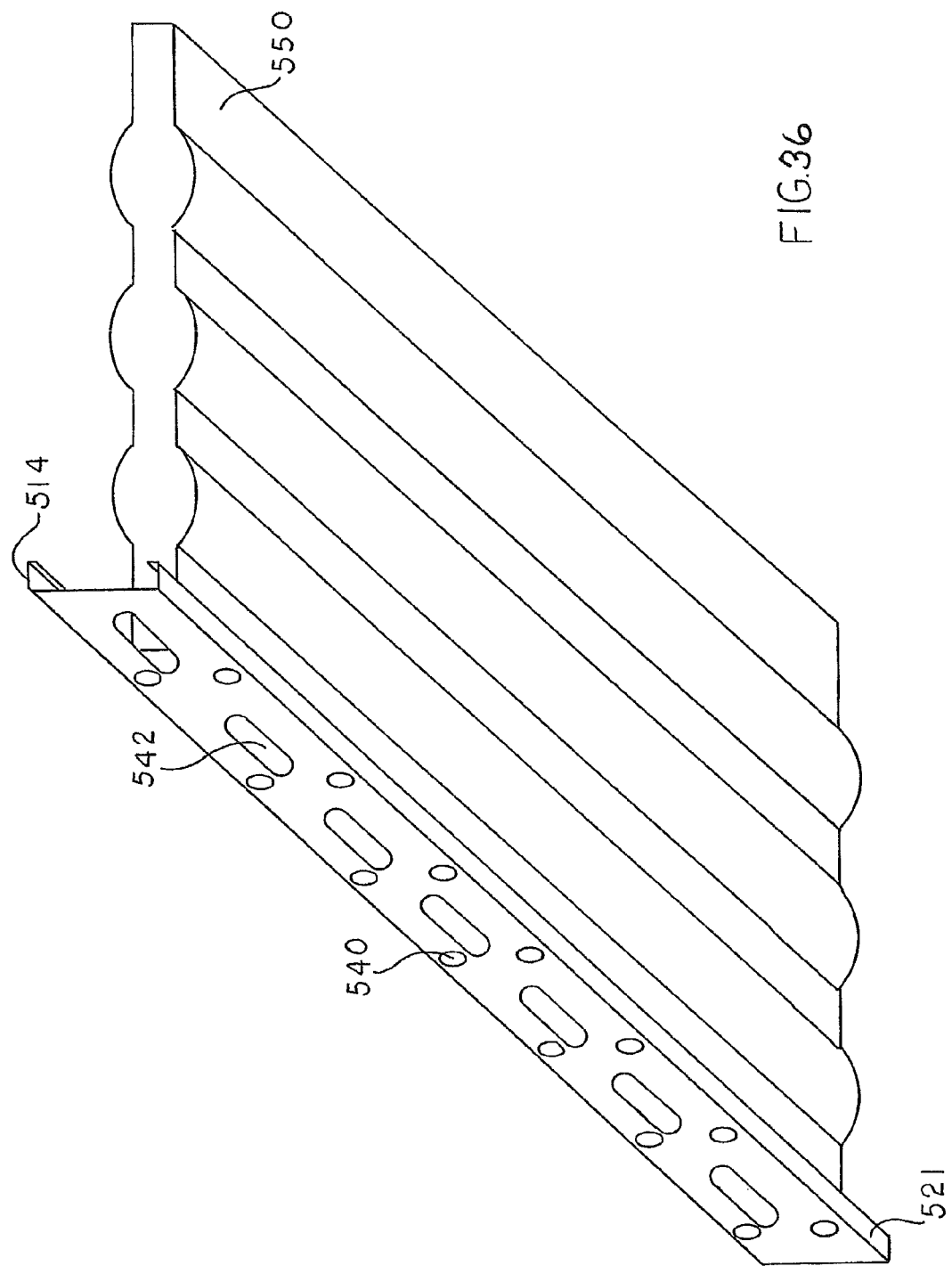
FIG. 36 shows a perspective view of the concrete and a embedded stud portion of an insulated concrete form according to the invention.

The molded in light gauge metal structural members, embedded metal studs 514 and 516, can be continuously or semi continuously formed to create a composite panel of unlimited length. The structural metal members are strategically punched along the outer vertical axis to provide expansion holes 540, which allow for the flow of and fusion of the expandable plastic materials through the metal members. The center vertical axis of the metal member is punched to provide pour holes 542, which permit the free flow of normal concrete and to aid in the fixing and placement of horizontal concrete reinforcement materials. FIGS. 35 and 36 shows the formed and set concrete 550 in relation to embedded metal studs 514 and 516.

Embedded ends 521 and 523 act as continuous furring strips running vertically on predetermined centers to aid in the direct connection of finish materials, top and bottom structural tracks, wall penetrations and roof and floor connection points, such as the level track described herein.

The expandable plastic materials in the composite panel acts as a forming panel when concrete is placed within the form also provides insulation and sound deadening. Further, the expandable plastic materials face of the composite panel acts as a forming panel when concrete is placed within the form and also provides insulation and sound deadening.

The design of the present ICF provides horizontal and vertical concrete pathways created by the two opposing face panels fixed by the light gauge structural members.

When concrete is poured into space 505 of the present ICF, an internal concrete post is formed by the two opposing face panels within the vertical post wall configuration of the panel design. The concrete core created in the form acts as horizontal bracing to the light-gauge structural metal members in the present ICF. In the vertical post wall panel design the concrete core allows for horizontal reinforcement along the axis of the vertical post created between the form face panels.

In the present ICF, the interlocking panel ends formed by inner lip 517 and outer lip 518 are self aligning, self sealing and securely connect one panel side termination to the other panel side termination point, forming a continuous horizontal as well as continuous vertical concrete placement form.

Figure 37:
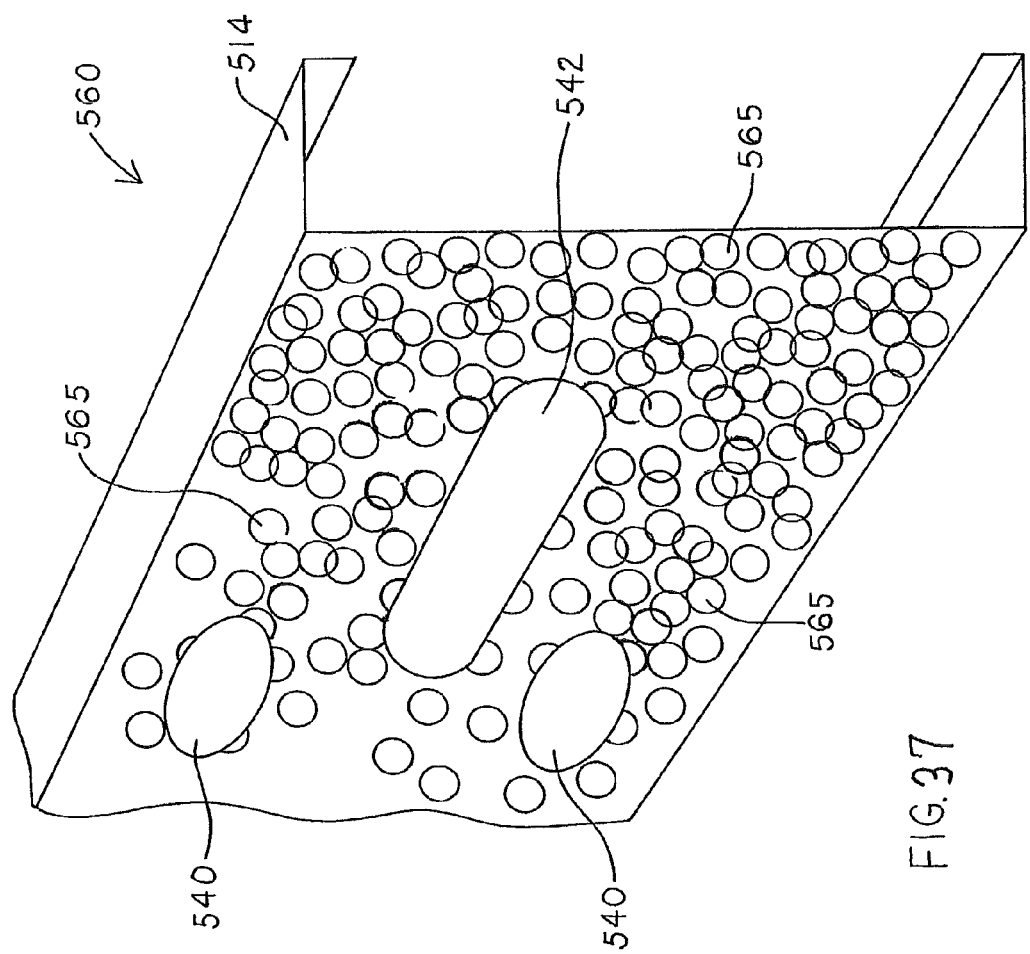
FIG. 37 shows a partial perspective view of a metal stud used in the invention.

FIG. 37 shows an embodiment of the invention where the surface of steel member 560, which can be used as embedded metal studs 514 and/or 516 in the present ICF are dimpled 565 in opposing directions creating a surface that increases concrete adhesion and prevents cracking of the concrete in contact with steel member 560. The dimple effect on the member surface adds to the shear resistance of the steel and concrete composition. The dimpling of the steel surface creates a stronger connection between the foam and the steel member of the plastic foam faces of the panel when molded as a composite structure.

Figure 38:
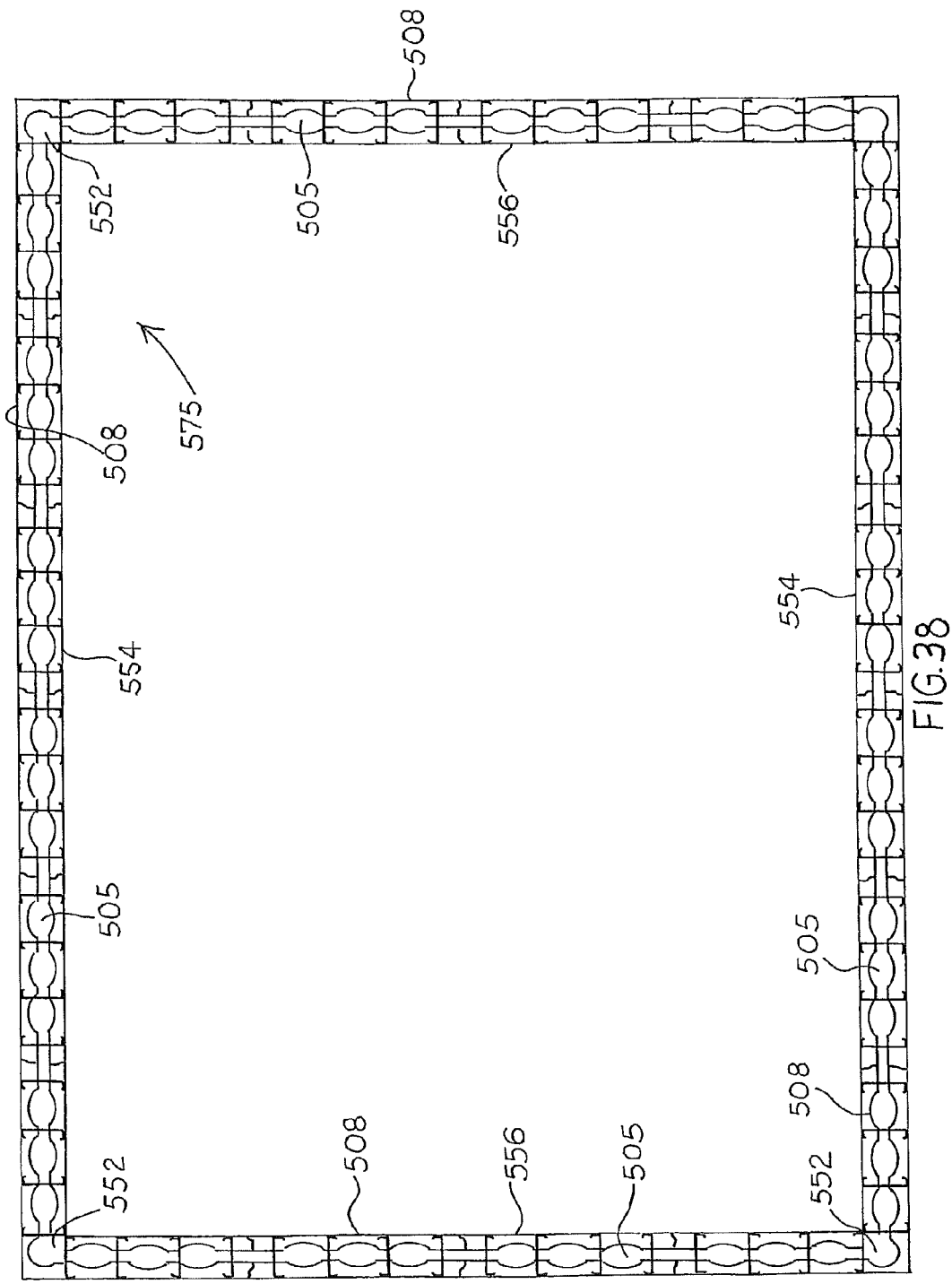
FIG. 38 shows a plan view of an insulated concrete form system according to the invention.

FIG. 38 shows an insulated concrete form system 575 for providing a foundation that includes a plurality of ICF's 508 connected end to end to form ICF system 575. Corner unit 552 is used to interconnect parallel ICF lines 554 and perpendicular ICF lines 556. Concrete is poured into space 505 of ICF wall system 575 and cured to form a completed insulated concrete wall system.

Figure 39:
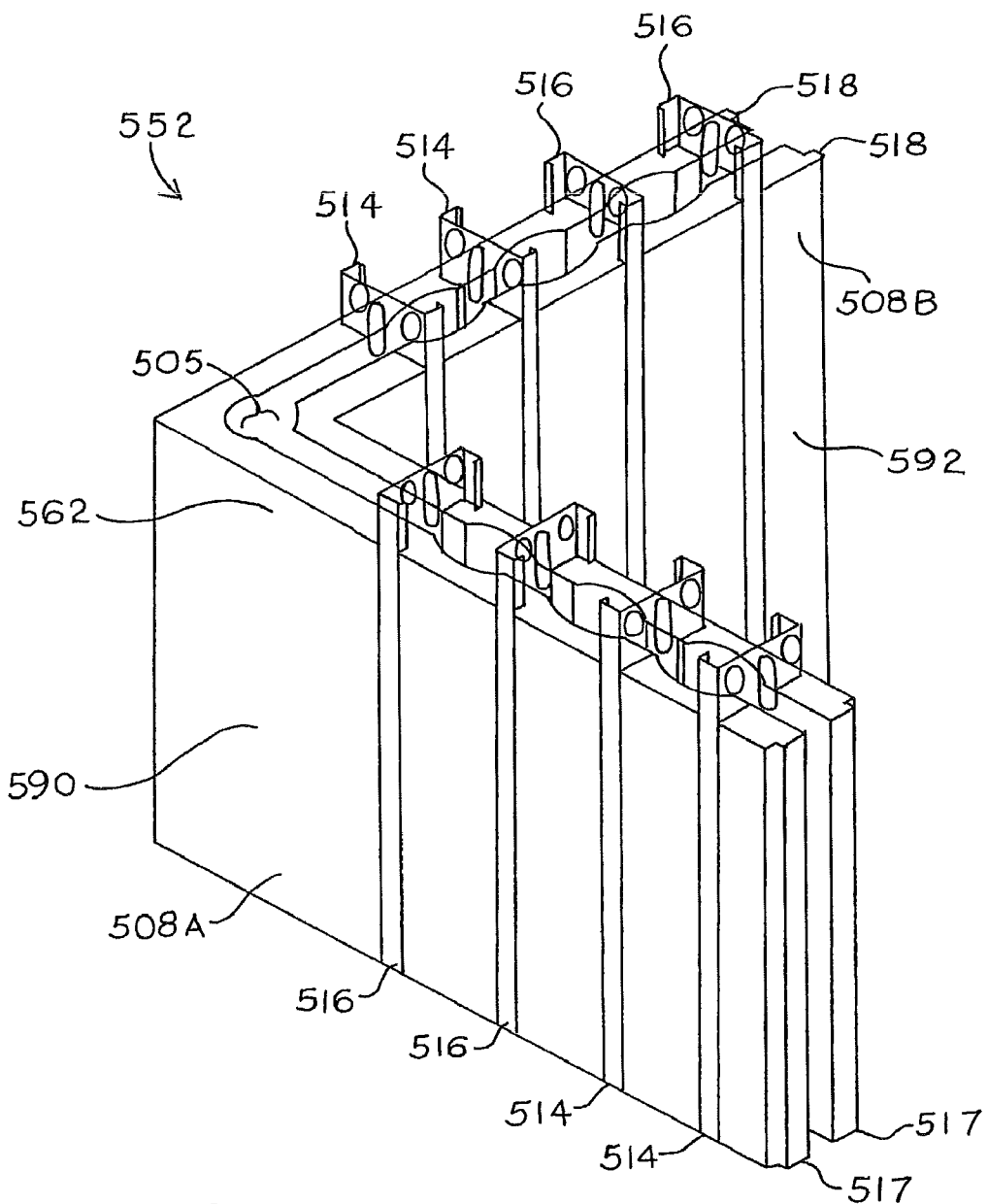
FIG. 39 shows an insulated concrete form corner unit according to the invention.

Corner unit 552, as shown in FIG. 39 essentially includes a first ICF 508A and a second ICF 508B (like features are numbered as above) oriented at an angle to first ICF 508A, where corner section 562 is molded to include first ICF 508A and second ICF 508B to form a continuous first body and second body and providing a continuous space 505 there between.

Referring to FIG. 32, a particular advantages of ICF 509 includes the ability to easily run utilities prior to attaching a finish surface to the exposed ends of the embedded metal studs. The exposed metal studs facilitate field structural framing changes and additions and leave the structural portions of the assembly exposed for local building officials to inspect the framing.

A utility space defined by outer surface 525 of expanded polymer body 512 and exposed ends 536 and 538 can be adapted for accommodating utilities. Typically, exposed ends 536 and 538 have a finish surface attached to them, a side of which further defines the utility space.

In an embodiment of the invention, the utility space is adapted and dimensioned to receive standard and/or pre-manufactured components, such as windows, doors and medicine cabinets as well as customized cabinets and shelving.

Further, the air space between the outer surface of the expanded polymer body 512 and the finish surface allows for improved air circulation, which can minimize or prevent mildew. Additionally, because the metal studs are not in direct contact with the outside environment, thermal bridging via the highly conductive embedded metal studs is avoided and insulation properties are improved.

The various embodiments described herein contain variations that are not meant as limitations. Any of the relevant variations discussed in the embodiments of ICF, building, floor, ceiling, wall, and/or roof panels can be used in the ICF, building, floor, ceiling, wall, and/or roof panel embodiments described herein without limitation.

In an embodiment of the invention, a lath can be attached to the exposed ends of the metal studs, metal joists or metal members of the ICF of the invention. The lath is capable of supporting a covering layer constituted by a suitable construction material. The lath can include one or more portions extending flush on opposite lateral sides of the construction element, which can be embedded in and anchored also to the concrete used for incorporating and/or joining together one or more adjacent construction elements.

The lath can support one or more covering layers and is typically a stretched metallic lath including a rhomb-shaped mesh having a length-to-height rhomb ratio of about 2:1. The rhomb length can vary between 20 and 60 mm, while the rhomb width can vary between 10 and 30 mm. The stretched metallic lath can have a thickness of from 0.4 to 1.5 mm and, in some cases of from 0.4 to 1.0 mm.

The covering layers can include one or more coating layers of plaster, stucco, cement as it is or, optionally, reinforced with fibers of a suitable material.

In an embodiment of the invention, referring to FIGS. 3 and 38, insulated concrete form system 575 is foundation 130, where level track 128 is attached thereto as described above. Further, the invention provides buildings that include the present insulated concrete form system as a foundation, with an optional level track according to the invention attached thereto, and one or more floor panels, floor systems, wall panels, wall systems, tilt-up walls, storm panels, ceiling and/or roof panels as described herein. In a particular embodiment of the invention, the floor panels, floor systems, wall panels, wall systems, tilt-up walls and/or storm panels can be attached to the insulated concrete form system, optionally using the present level track. Further to this particular embodiment, the present ceiling and/or roof panels can be attached to one or more of the present wall panels, wall systems, tilt-up walls and/or storm panels. Thus a novel building is provided.

The ICF units of the present invention can be made using an apparatus for molding a semi-continuous or continuous foamed plastic element that includes a first mold including:
i) a bottom wall, a pair of opposite side walls and a cover, and
ii) a molding seat, having a shape mating that of the element, defined in the mold between the side walls, the bottom wall and the cover;

a second mold including:
i) a bottom wall, a pair of opposite side walls and a cover, and
ii) a molding seat, having a shape mating that of the element, defined in the mold between the side walls, the bottom wall and the cover;

b) means for displacing the covers and the side walls of the molds towards and away from the bottom wall to longitudinally close and respectively open the mold; and c) first means for positioning in an adjustable manner said covers away from and towards said bottom wall of the mold to control in an adjustable and substantially continuous manner the height of the molding seat.

The apparatus is configured to include the reinforcing members, embedded metal bars, embedded metal studs, embedded metal joists, and embedded metal members configured as discussed above. As a non-limiting example, the methods and apparatus disclosed in U.S. Pat. No. 5,792,481 can be adapted to make the ICF units, of the present invention. The relevant parts of U.S. Pat. No. 5,792,481 are incorporated herein by reference.

The wall units, floor units, and expanded polymer panels of the present invention can be made using batch shape molding techniques. However, this approach can lead to inconsistencies and can be very time intensive and expensive.

In an embodiment of the invention, the wall units, ceiling units, roof units, floor units, and expanded polymer panels of the present invention can be made using an apparatus for molding a semi-continuous or continuous foamed plastic element that includes a) a mold including:
i) a bottom wall, a pair of opposite side walls and a cover, and
ii) a molding seat, having a shape mating that of the element, defined in the mold between the side walls, the bottom wall and the cover;

b) means for displacing the cover and the side walls of the mold towards and away from the bottom wall to longitudinally close and respectively open the mold; and c) first means for positioning in an adjustable manner said cover away from and towards said bottom wall of the mold to control in an adjustable and substantially continuous manner the height of the molding seat.

The apparatus is configured to include the reinforcing members, embedded metal bars, embedded metal studs, embedded metal joists, and embedded metal members configured as discussed above. As a non-limiting example, the methods and apparatus disclosed in U.S. Pat. No. 5,792,481 can be adapted to make the wall units, floor units, and expanded polymer panels of the present invention. The relevant parts of U.S. Pat. No. 5,792,481 are incorporated herein by reference.

In an embodiment of the invention, the reinforcing members, embedded metal studs, embedded metal joists, and/or embedded metal members 220 can be molded into the wall units, floor units, and expanded polymer panels having a formed embedded end 222 and a straight exposed end 224 as shown in FIG. 26. Subsequently, the straight exposed end can be formed, worked and/or modified to provide a shaped end 228A as shown in shaped member 226A in FIG. 27 or a shaped end 228B as shown in shaped member 226B FIG. 28. Embedded ends 226A and 226B can remain unchanged from embedded end 222. Equipment and machinery for subsequently bending, working, forming or modifying the exposed end are well known in the art.

In an embodiment of the invention, the inner surface, bottom surface, or inner face of the wall units, floor units, and expanded polymer panels described above can have a grooved surface, either molded in or applied mechanically to improve air flow through the annular space between the expanded plastic and any materials attached to the exposed ends of the metal studs, metal joists or metal members of the wall units, floor units and expanded polymer panels described above.

The present invention is directed to a method of constructing a building in a first embodiment including:

providing a foundation having a series of walls having top surfaces, which can include the present insulated concrete form system;

positioning and securing the composite building panels described above, adapted for use as a floor unit, and/or floor panels or floor systems as described herein, such that the floor unit, panel and/or system spans at least a portion of the top surfaces of the foundation walls;

positioning and securing any of the wall systems described above to the floor unit or system; and positioning and securing a roof system as described above to a top surface of the wall system.

Another embodiment of the invention provides a method of constructing a building that includes:

providing a foundation having a series of foundation walls having top surfaces, which can include the present insulated concrete form system;

positioning and securing the composite building panels described above, adapted for use as a floor unit, and/or floor panels or floor systems as described herein, such that the floor unit, panel and/or system spans at least a portion of the top surfaces of the foundation walls;

positioning and securing two or more of the composite building panels and/or storm panels described above, adapted for use as a wall unit, to at least part of a top surface of the floor unit, wherein a bottom track and a top slip track are attached to a bottom end and a top end respectively of the composite building panels; and positioning and securing the composite building panels described above, adapted for use as a roof unit, to at least some of the top slip track of the wall units.

Further to this embodiment, a method of constructing a multi-story building is provides that further includes:

positioning and securing the composite building panels described above, adapted for use as a second floor unit or system, to at least a portion of the top slip track of the wall units; and positioning and securing two or more of the composite building panels and/or storm panels described above, adapted for use as a second wall unit, to at least part of a top surface of the second floor unit, wherein a bottom track and a top slip track are attached to a bottom end and a top end respectively of the composite building panels;

where the roof unit is secured to at least some of the top slip track of the second wall units.

Thus, the present invention also provides a building that contains one or more of the floor units, wall systems and roof systems described above.

The wall units, floor units and expanded polymer panels of the present invention provide a number of advantages. For example, they typically eliminate the need for house wrap. The expanded polymers used in the present invention typically have at least an equivalent rating as required by local building codes for house wraps.

Also, no insulation subcontractors are required during construction as the wall units, floor units and expanded polymer panels of the invention already include adequate insulation. The materials of construction also effectively blocks low frequency sound waves resulting from exterior noise.

The acoustical properties of the construction panels, wall units, floor units and expanded polymer panels according to the invention are particularly advantageous. Typically, metal studded structures have major acoustical or sound transmission problems. The metal studs will generally amplify sound through their ability to vibrate. When the metal studs are encapsulated in the polymer matrix, vibration is reduced, which results in reduced vibration and desirable acoustical and sound transmission properties.

Further, less framing is required on a job site because of the prefabricated nature of the present wall units, floor units and expanded polymer panels.

The generally faster construction time resulting from using the present wall units, floor units and expanded polymer panels allows for earlier enclosure and protection from the elements leading to less water damage during construction.

Additionally, the provided holes, openings, conduits, chases and spaces in the present wall units, floor units and expanded polymer panels results in faster wiring and plumbing and less job site scrap.

The present invention also relates to a method of doing business that allows an architectural design layout to be accessed by the apparatus for molding a semi-continuous or continuous foamed plastic element in order to customize the size, shape and dimensions of the various elements of the construction panels, wall units, floor units, and expanded polymer panels of the invention. The architectural design layout can be provided via software from a disk or via an Internet connection. For those customers with Internet capabilities, access to the present method is convenient and provides an efficient and time saving method to design and manufacture building and/or housing units.

In a non-limiting exemplary embodiment, a customer selects an architectural design for a building. The architectural design includes the unique features of each composite building panel to be used in the building. The architectural design is loaded into a processing unit that translates the design into instructions for the apparatus for molding a semi-continuous or continuous foamed plastic element. The instructions direct the apparatus to continuously or semi-continuously mold panels as described above and what customizing features to include in each panel.

The architectural design can include, as non-limiting examples the dimensions of and the location of openings and holes required in each reinforcing embedded stud as well as any indentations in each composite building panel needed to build the building; the dimensions of each composite building panel to include thickness, width, height, spacing between embedded studs, dimensions and shape for each embedded stud, any channels that need to be cut into or formed in the central body of each composite building panel, any of the design features described above, any other unique features for each composite building panel, as well as gable ends accommodating any roof pitch or slope, bay window floor cuts and other design specified architectural features.

The processing unit can be any computer or device capable of reading instructions and translating them into instructions for the apparatus for molding a semi-continuous or continuous foamed plastic element.

The customizing features can include any of the architectural design features described above. As a non-limiting example, the customizing features can include forming a straight exposed end as shown in FIG. 26 to a shaped end as shown in either of FIGS. 27 and 28.

In another embodiment of the invention, an interactive computer program can be used to provide the architectural designs described above. In an embodiment of the invention, the architectural design can be inputted using a series of computer screen menus, where a user selects choices made available on a computer screen. When the design button is selected, a screen appears for additional choices for modifying the central body, the embedded framing studs or embedded floor joists, and/or the spatial relationship between the two. Selecting any of the menus directs to another screen where specific architectural design features as described above can be inputted as well as the number of panels required that have those features. Upon selection, additional customized panels can be inputted. The user then verifies the order by selecting an "order panels" button. The instructions are then relayed to the apparatus for molding a semi-continuous or continuous foamed plastic element and each of the requested number of panels having each of the architectural design features are molded and cut to the order specifications. In an embodiment of the invention, all panels are automatically labeled and marked for placement in their proper position.

In a further embodiment, the customer requests access to an interactive program that steps the customer through the design process. Once the design is complete, the customer can save the design for future use. The customer may also choose to submit the design for an order.

The use of a design program on an Internet site benefits the manufacturer in a variety of ways including a method of gathering customer profiles that can later be used for mailings, etc. In addition, an Internet site that includes this unique method of doing business reaches worldwide and generates name recognition for the manufacturer, particularly where the construction panel manufacturer is the is the only manufacturer to offer an accessible and convenient method of designing and ordering composite construction panels.

The design program of the invention provides an advantage for the user in his or her own business in that it raises the level of professionalism of the user by allowing prompt and on-the-spot service for his or her own customers. For example, a customer may bring a sketch or layout for an architectural design a composite construction panel shop requesting construction panels to use in the layout or design. In response, the panel shop owner, i.e., user, can utilize the design program to build a series of composite construction panels on a computer screen with the customer by his side, and explain to the customer the benefits of the custom composite construction panels. This process provides a first rate service to the customer, eliminates guessing, increases interaction between the panel shop and the end customer, and enhances business reputation in the field.

Figure 40:
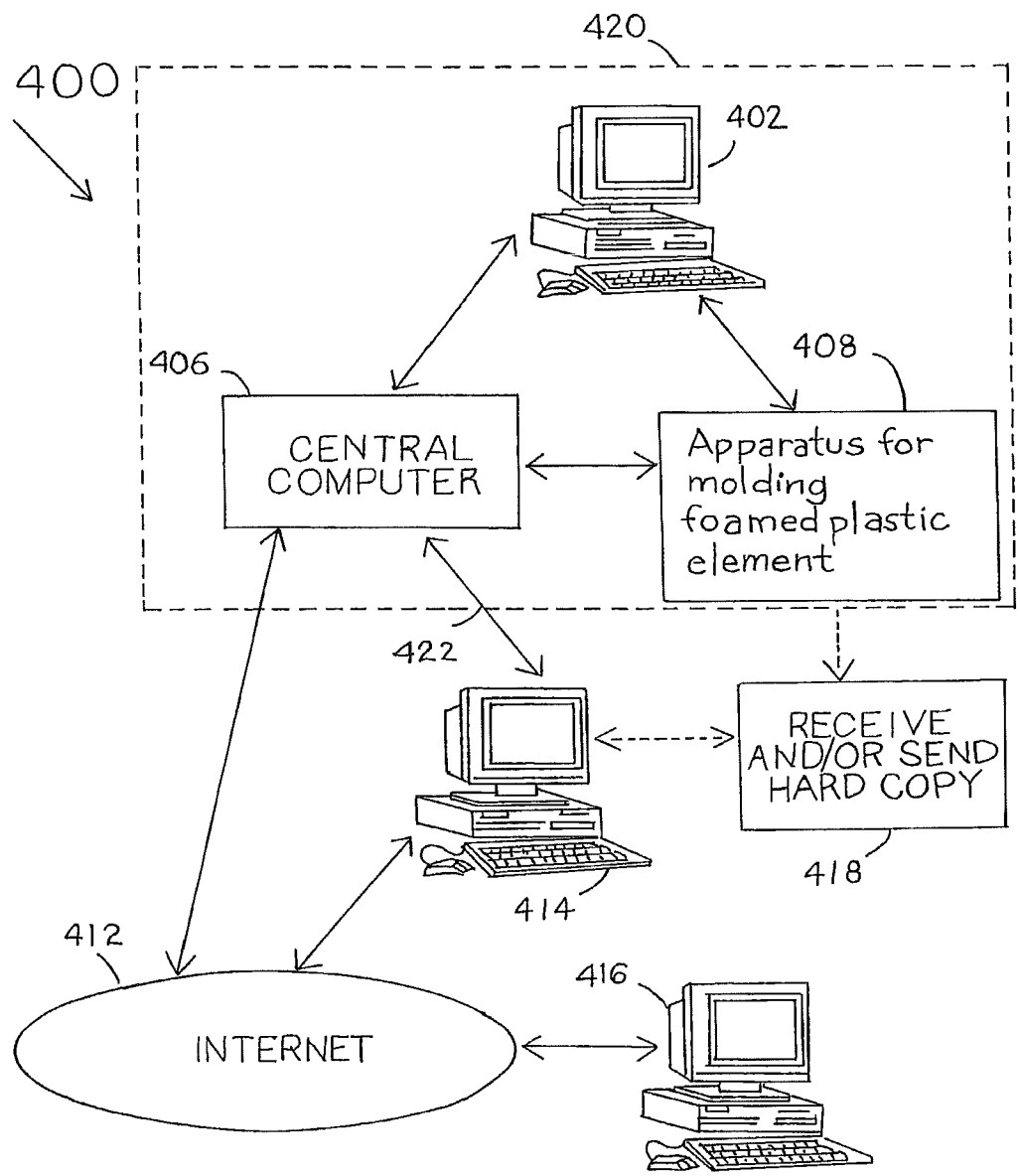
FIG. 40 illustrates a manufacturer/customer method of designing custom composite building panels according to the invention.

FIG. 40 illustrates a method of doing business 400 between a composite construction panel manufacturer 420 and a customer 414, 416 requiring the manufacture of custom composite construction panels. A composite construction panel design program is provided to a customer 414, 416 via a hard copy 418, e.g., a disk containing a copy of the program, or via electronic access, e.g., the Internet or e-mail. The composite construction panel design software is utilized by a customer on the customer's personal computer 414, 416. The customer designs one or more composite construction panels and delivers the completed design to the manufacturer 420. The design can be printed to provide a hard copy 418 to the manufacturer 420. In a particular embodiment of the present invention, the finished design is uploaded to a central computer 406 located at the manufacturer 420. In another particular embodiment, compatibility between the design program software and the software of the apparatus for molding a semi-continuous or continuous foamed plastic element 408 allows the finished design specifications to be entered into the apparatus 408 directly through a connection to the central computer. In another embodiment, the design specifications are entered manually by an apparatus operator. The design software stores and sorts the data based on particular panel design types, and identifies the most efficient sequence for making panels. Thus, the software is usable as a management tool to simplify the work of the apparatus operator, including specifying what order to make the panels and how to maneuver parts of the apparatus to change from one panel design to the next. The method of doing business as illustrated in FIG. 40 reduces the time and cost to design and manufacture custom construction panels.

The present invention has been described with reference to specific details of particular embodiments thereof. It is not intended that such details be regarded as limitations upon the scope of the invention except insofar as and to the extent that they are included in the accompanying claims.

I claim:

1. A composite wall panel comprising:
   a central body, substantially parallelepipedic in shape, comprised of an expanded polymer matrix, having opposite faces, a top surface, an opposing bottom surface, a male end and a female end; and
   two or more reinforcing embedded members transversely extending across the central body between said opposite faces, having a central portion embedded in the expanded polymer matrix, a first exposed end extending from the central portion and the top surface, and a second exposed end extending from the central portion and the bottom surface,
   wherein the reinforcing embedded members include one or more expansion holes located in the central portion of the embedded members and one or more utility holes located in the first exposed end and the second exposed end;
   a first concrete layer placed over the top surface encasing the first exposed end of the reinforcing embedded members; and
   a second concrete layer placed over the bottom surface encasing the second exposed end of the reinforcing embedded members;
   wherein the central body comprises a polymer matrix that expands through the expansion holes;
   wherein the set and hardened concrete of the first concrete layer fuses through the utility holes in the first exposed end;
   wherein the set and hardened concrete of the second concrete layer fuses through the utility holes in the second exposed end; and
   wherein the reinforcing embedded members comprise an epoxy resin reinforced with one or more fibers selected from the group consisting of carbon fibers, aramid fibers, glass fibers, metal fibers, and combinations thereof.

2. The composite wall panel according to claim 1, wherein the central body comprises a male end and a female end.

3. The composite wall panel according to claim 1, wherein the reinforcing embedded members are longitudinally extending within the central body along substantially the entire length thereof.

4. The composite wall panel according to claim 1, wherein the reinforcing embedded members have a thickness of form 0.4 to 10 mm.

5. The composite wall panel according to claim 1 comprising two or more reinforcing embedded members, wherein the distance between the reinforcing embedded members is from 10 cm to 110 cm.

6. The composite wall panel according to claim 1, wherein the expanded polymer matrix comprises one or more polymers selected from the group consisting of homopolymers of vinyl aromatic monomers; copolymers of at least one vinyl aromatic monomer with one or more of divinylbenzene, conjugated dienes, alkyl methacrylates, alkyl acrylates, acrylonitrile, and/or maleic anhydride; polyolefins;
   polycarbonates; and combinations thereof.

7. The composite wall panel according to claim 2, wherein the male end of the central body comprises a tongue edge and the female end of the central body comprises a female groove edge that facilitates a tongue and groove union between a first central body and a second central body to form one or more combined composite wall panels, wherein the first and second concrete layers are continuous over at least a portion of the top surface and bottom surface.

8. The composite wall panel according to claim 1, wherein the central body has a thickness measured as the distance between the first surface and the second surface of from 2 cm to 50 cm.

9. The composite wall panel according to claim 1, wherein the central body comprises openings extending along the length of the central body.

10. The composite wall panel according to claim 9, wherein the openings have a cross-sectional shape selected from the group consisting of round, oval, elliptical, square, rectangular, triangular, hexagonal and octagonal and a cross-sectional area of from 1 $cm^2$ to 130 $cm^2$.

11. The composite wall panel according to claim 1, wherein the polymer matrix comprises an interpolymer of a polyolefin and in situ polymerized vinyl aromatic monomers.

12. The composite wall panel according to claim 1, wherein the polymer matrix comprises carbon black, graphite or a combination thereof.

13. The composite wall panel according to claim 1, wherein the central body with at least one reinforcing embedded member is made by continuously or semi-continuously molding a foamed plastic central body with one or more reinforcing embedded members partially embedded therein.

14. The composite wall panel according to claim 1, wherein the concrete is light weight concrete.

15. A wall comprising one or more composite wall panels according to claim 1.

16. A method of constructing a building comprising:
assembling the composite wall panel according to claim 1 on a generally flat surface, and
lifting a first end of the composite wall panel while a second end remains stationary resulting in orienting the wall panel to form a wall of the building.

17. A building constructed according to the method of claim 16.

18. The composite wall panel according to claim 1, wherein the reinforcing embedded members comprise one or more other additives selected from the group consisting of ultraviolet (UV) stabilizers, heat stabilizers, flame retardants, biocides, and combinations thereof.

* * * * *